US005148376A

United States Patent [19]

Sato

[11] Patent Number: 5,148,376

[45] Date of Patent: Sep. 15, 1992

[54] PRESSURE INSTRUMENT WITH DEPTH/ALTITUDE AND TIME DISPLAY

[75] Inventor: Hiroshi Sato, Fussa, Japan

[73] Assignee: Casio Computer Co., Ltd., Tokyo, Japan

[21] Appl. No.: 551,134

[22] Filed: Jul. 10, 1990

[30] Foreign Application Priority Data

Jul. 12, 1989 [JP] Japan .................................. 1-178154
Dec. 19, 1989 [JP] Japan ............................ 1-145382[U]
Mar. 15, 1990 [JP] Japan .................................... 2-65708

[51] Int. Cl.[5] ...................... G04B 47/06; G01F 23/14; G01N 7/00

[52] U.S. Cl. ..................................... 364/558; 73/291; 73/387; 73/865.1; 364/413.31; 364/569; 368/11; 368/89; 368/111

[58] Field of Search ................ 364/413.3, 413.31, 558, 364/561, 569, 550, 551.01; 368/10, 11, 89, 111, 327; 73/865.1, 384, 386, 387, 1 R, 709, 712, 290 R, 291

[56] References Cited

U.S. PATENT DOCUMENTS

| | | | |
|---|---|---|---|
| 4,005,282 | 1/1977 | Jennings | 364/413.31 |
| 4,107,995 | 8/1978 | Ligman et al. | 364/413.31 X |
| 4,109,140 | 8/1978 | Etra | 364/413.31 X |
| 4,533,256 | 8/1985 | Ostendorf | 368/10 X |
| 4,694,694 | 9/1987 | Vlakancic et al. | 368/11 X |
| 4,783.772 | 11/1988 | Umemoto et al. | 368/11 |
| 4,835,716 | 5/1989 | Tamaki et al. | 364/558 |
| 4,882,678 | 11/1989 | Hollis et al. | 364/413.31 |
| 4,949,072 | 8/1990 | Comerford et al. | 364/413.31 X |
| 5,031,160 | 7/1991 | Koizumi et al. | 368/10 |

FOREIGN PATENT DOCUMENTS 59-159084 9/1984 Japan .................................... 368/10

*Primary Examiner*—Parshotam S. Lall
*Assistant Examiner*—Edward J. Pipala
*Attorney, Agent, or Firm*—Frishauf, Holtz, Goodman & Woodward

[57] ABSTRACT

In a pressure instrument with depth/altitude and time display, a measurement time period from a starting instant up to a stopping instant of the time measurement is measured by measurement-time counting means, and also another measurement data is acquired by detecting pressures from the starting instant up to the stopping instant of the pressure measurement. After the measurements are taken and when a measurement stop signal is outputted, a determination is made whether or not the measured time periods are longer than a predetermined time period. If the measured time period is longer than a predetermined time period, this dive is regarded as one for which it is required to store a record, and then the measurement data acquired between the starting instant and the stopping instant of the measurement are stored in a memory. If, however, the measured time period is shorter than a predetermined time period, this dive is regarded as one for which it is not required to store a record, and then no measurement data is stored. Thus, although the measurement data acquired by SCUBA (self-contained under water breathing apparatus) diving are stored in the memory, the measurement data acquired by non-SCUBA diving with a diving time of 2 to 3 minutes are not stored in this pressure instrument, so that the memory can be more effectively utilized.

35 Claims, 33 Drawing Sheets

PRESSURE INSTRUMENT WITH DEPTH/ALTITUDE AND TIME DISPLAY

BACKGROUND OF THE INVENTION (1) Field of the Invention

The present invention relates to a pressure instrument for measuring pressures such as water pressure, air pressure and the like.

(2) Description of the Prior Art

A pressure detecting instrument employing a semiconductor pressure sensor is well known which calculates water depth data and altitude data from the pressure data detected with the pressure sensor. For example, in U.S. Pat. No. 4,835,716 there is disclosed an electronic wrist watch embodying such a pressure detecting instrument.

In U.S. Pat. No. 4,783,772 there is disclosed an electronic wrist watch provided with functions of measuring and storing water depth data.

More specifically, the electronic wrist watch disclosed in U.S. Pat. No. 4,783,772 calculates and stores in a memory a maximum water depth data and diving time data in addition to water depth data while the user is diving. After diving, with use of the electronic wrist watch, the user can compare the maximum water depth data and diving time data with those previously obtained, respectively.

The electronic wrist watch disclosed in U.S. Pat. No. 4,783,772, however stores only data for one-time dive. Therefore, the user has to make notes of data stored in the memory before he dives next time.

As a consequence, consideration has been given to installation of a plurality of memories in the wrist watch for storing the maximum water depth data and diving time data for several-time dives. However, when a diver dives, he needs not only the maximum water depth data and dive time data but also the other conditions such as water temperature, ocean current, ebb tide and flood tide. Accordingly, a wrist watch may be constructed which is provided with memories sufficient for storing these data, however such wrist watch will need a large number of keys for entering these data, resulting in inconvenient bulk or size and troublesome manipulation of these keys.

Further, even though the wrist watch is installed with a plurality of memories, it stores such data as obtained even when the diver dives by skin diving (breath hold diving) for a short time, resulting in short in the memory.

SUMMARY OF THE INVENTION

An object of the present invention is to provide a pressure instrument having a pressure sensor, which instrument not only stores measured data obtained from pressure data detected with said pressure sensor but also obtains environmental conditions of the time when measurement is made.

Another object of the present invention is to provide a pressure instrument which stores only such important measured data as will be used later as reference data and as a result memories of which are used efficiently.

To achieve the above mentioned objects, according to the present invention, there is provided a pressure instrument which comprises time counting means for counting reference clock signal to obtain present time data and date data, pressure detecting means for detecting external pressure, water-depth data generating means for generating water-depth data corresponding to pressure detected by said pressure detecting means, memory means having a plurality of memory areas for storing time data, date data and water-depth data, the time data and date data are obtained by said time counting means, the water-depth data generated by said water-depth data generating means, and data display means for displaying the time data, date data and water-depth data stored in the plurality of memory areas of said memory means.

Since the pressure instrument is constructed such that it stores date, starting and ending time for a measurement of pressure as well as measured data, from these stored data a user of the pressure instrument can review later the conditions on which measurement was made, such as water temperature, ocean current, ebb tide and flood tide.

BRIEF DESCRIPTION OF THE DRAWINGS

The present invention will be more apparent from the following detailed description of preferred embodiments illustrated by way of example in the drawings, in which.

DESCRIPTION OF THE PREFERRED EMBODIMENTS

(1) First Embodiment

(1-1) Construction of the first embodiment

Figure 1:
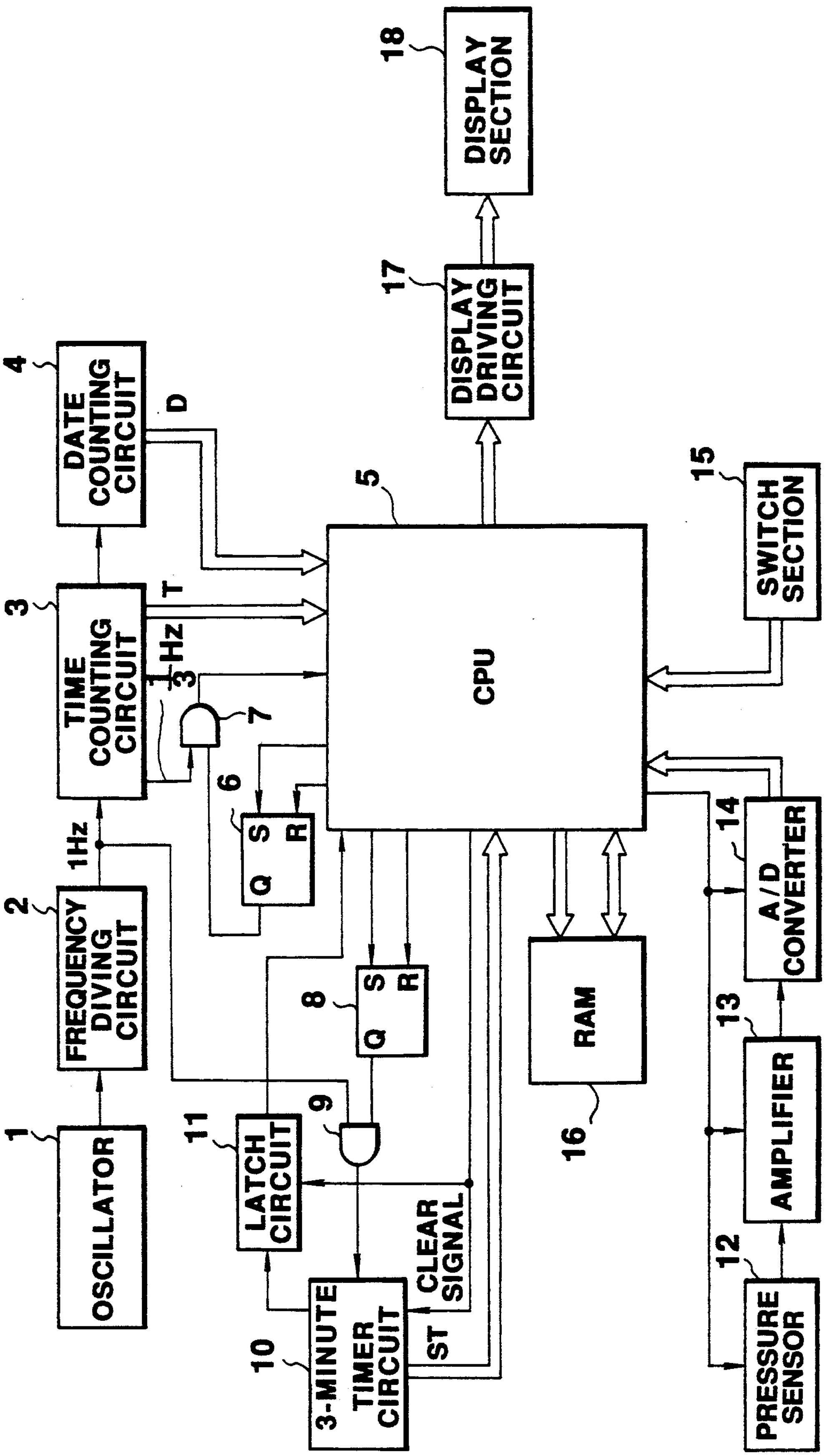
FIG. 1 is a block diagram of a first embodiment of a pressure instrument according to the present invention.

FIGS. 1 through 10 are views showing the first embodiment of the pressure instrument according to the present invention. In the block diagram of FIG. 1, an oscillator 1 serves to generate a clock signal of a predetermined period and supplies it to a frequency dividing circuit 2. The frequency dividing circuit 2 divides the clock signal to generate a signal, for example, of 1 Hz and supplies the signal to a time counting circuit 3 and also to AND gate 9 as will be described later.

The time counting circuit 3 serves to count the signal of 1 Hz to count a present time. The time counting circuit 3 supplies the obtained present time data T to CPU 5 and also supplies a day-carry signal to a date counting circuit 4 when it has counted 24 hours. The time counting circuit 3 generates a measurement-timing signal of ⅓ Hz, which is delivered to AND gate 7.

The date counting circuit 4 serves to count the above day-carry signal to count date and supplies obtained date data to CPU 5.

CPU 5 is a central processing unit for controlling overall circuit, which, for example, renews the present time and date on the basis of time data and date data delivered from the time counting circuit 3 and the date counting circuit 4 respectively, and which, as will be described later, drives a pressure sensor 12 every 3 seconds on the basis of the measurement timing signal of ⅓ Hz delivered from the time counting circuit 3 to make measurement of water depth.

A flip-flop circuit 6 serves to store whether or not a water-depth measurement mode has been set, and is set or reset by a signal from CPU 5 in accordance with operation of a mode switch SM (not shown). For example, when switched to the water-depth measurement mode by operation of the switch SM, the flip-flop circuit 6 is set to a set state in response to the signal from CPU 5 and its Q-output signal goes high, thereby opening AND gate 7. Then, the measurement-timing signal of ⅓ Hz of the time counting circuit 3 is delivered to CPU 5 through AND gate 7 and CPU 5 gives an instruction of starting of water-depth measurement on the basis of the measurement-timing signal.

A flip-flop circuit 8 serves to store whether or not a water depth is 1 m and more. The flip-flop circuit 8 is set by the signal from CPU 5 when water depth is 1 m and more, and is reset when water depth is less than 1 m. When the flip-flop circuit 8 is set to a set state, AND gate 9 is open, allowing the signal of 1 Hz from the frequency dividing circuit 2 to be delivered to a timer circuit 10.

The timer circuit 10 serves to count the signal (time-count signal) of 1 Hz delivered from the frequency dividing circuit 2 to obtain diving times. The timer circuit 10 supplies obtained diving times ST to CPU 5 and also supplies 3-minute carry signal to a latch circuit 11 when the circuit 10 has counted 3 minutes after the diver started diving.

The latch circuit 11 serves to store whether or not the diving time is 3 minutes and more. When the diving time exceeds 3 minutes and 3-minute carry signal is generated by the timer circuit 10, then the latch circuit 11 latches the 3-minute carry signal and gives CPU 5 notice that the diving time is 3 minutes and more.

The timer circuit 10 and the latch circuit 11 are supplied with a clear signal from CPU 5 when a measurement starts, thereby being initialized, respectively.

The pressure sensor 12 serves to detect pressure at a diving spot and supplies an analog pressure signal corresponding to detected pressure to an amplifier 13. The amplifier 13 amplifies the analog pressure signal to a predetermined level and supplies the same to an A/D converter 14. The A/D converter 14 serves to convert the analog pressure signal into a digital pressure signal, and supplies the converted pressure signal to CPU 5.

The pressure sensor 12, amplifier 13 and A/D converter 14 operate in accordance with driving signal of 3-second period delivered from CPU 5, thereby making measurement of water depth.

A switch section 15 comprises a switch SM for switching operation modes, a switch SP for successively reading stored data in a dive-data reading mode and a time correction switch which is operated for correcting time, and supplies operation signals of these switches to CPU 5.

RAM 16 is a memory in which data is written or read under control of CPU 5 and has various registers for storing measured dive data.

Figure 2:
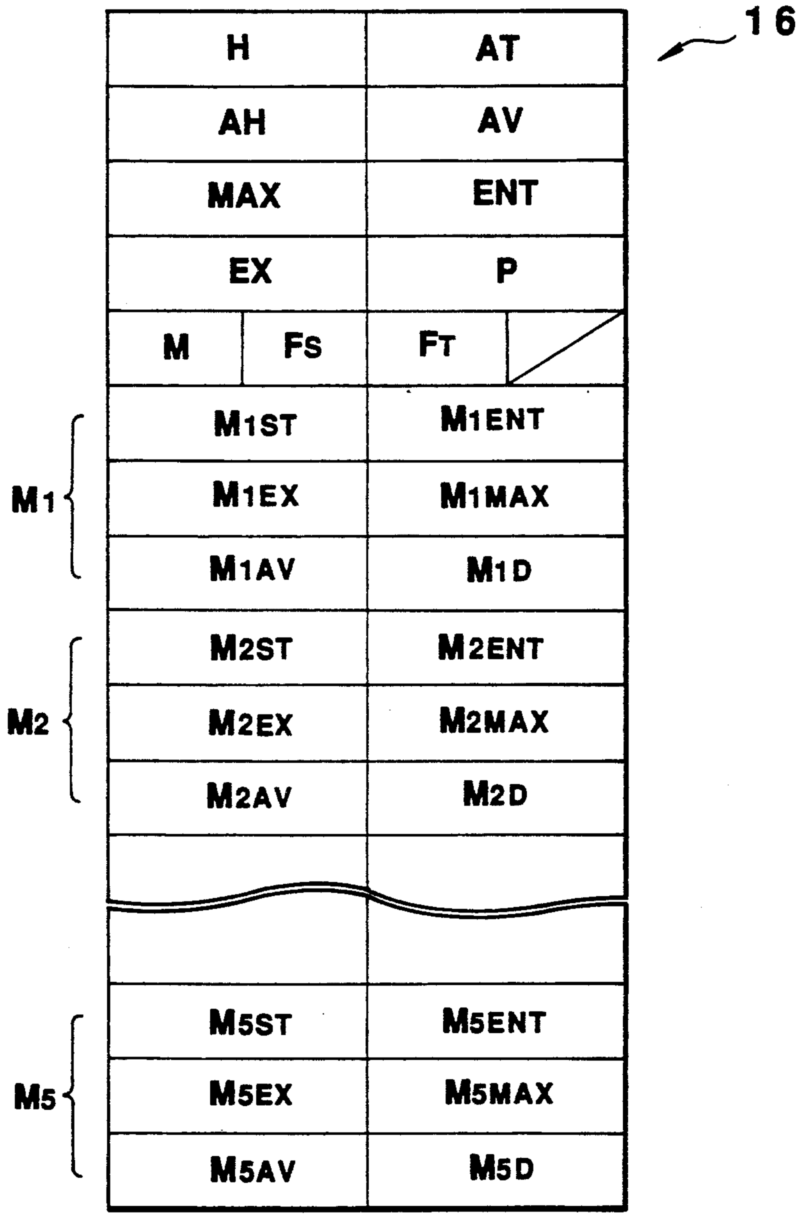
FIG. 2 is a view showing a detailed construction of RAM of FIG. 1.

FIG. 2 is a view showing construction of the above mentioned RAM 16. In FIG. 2, a register H serves to store measured water-depth data, a register AT serves to store data representing number of water-depth measurements, and a register AH serves to store accumulated value of measured water-depth data.

A register AV serves to store average water-depth data for one time dive, a register MAX serves to store a maximum water-depth data, a register ENT serves to store data representing the time when the diver starts diving and a register EX serves to store data representing the time when the diver finishes diving.

A register M serves to store numerical data representing an operation mode. For example, the register M stores M=0 for a watch mode, M=1 for a water-depth measurement mode and M=2 for a dive-data read mode.

A register FS is set to a value "1" when water depth reaches 1 m and more. A register FR is set to a value "1" when water depth reaches 1 m and more and reset to a value "0" when water depth becomes less than 1 m.

For example, when the diver wearing the pressure instrument dives 1 m and more deep, the above registers FS and FR are set. Once these registers FS and FR are set, a measurement of water depth and counting of diving time start in a measurement process as will be described later. When the diver comes up less than 1 m deep, and thereby the register FR is reset, counting of diving time is ceased while measurement of water depth is continued.

Further, RAM 16 includes five memories M1 to M5 for storing dive data. The first memory M1 stores the latest dive data and the memories M2 to M5 store later dive data, late dive data and so on, respectively. When dive data are written in all of the memories, the oldest dive data stored in the memory M5 is removed and dive data stored in the memories M1 to M4 are shifted to the following memories M2 to M5 and thereby the memory M1 is ready for storing new dive data which will be obtained in the following measurement.

Registers $M_{1ST}$, $M_{2ST}$ to $M_{5ST}$ of the memories M1, M2 to M5 serve to store diving time data, respectively. Registers $M_{1ENT}$, $M_{2ENT}$ to $M_{5ENT}$ are for storing data representing the times when the diver starts diving, respectively. Registers $M_{1EX}$, $M_{2EX}$ and $M_{5EX}$ are for storing data representing the times when the diver finishes diving, respectively. Registers $M_{1MAX}$, $M_{2MAX}$ to $M_{5MAX}$ are for storing the maximum water-depth data in each diving. Registers $M_{1AV}$, $M_{2AV}$ to $M_{5AV}$ are for storing average water-depth data in each diving. Registers $M_{1d}$, $M_{2D}$ to $M_{5D}$ are for storing data each representing date on which the diver dives.

A register P is a pointer which designates one of five memories M1 to M5 and which is incremented every time when the read switch SP is operated.

Returning to FIG. 1, a display driving circuit 17 serves to converts dive data from CPU 5 into a display signal, which drives display elements of display section 18. The display section 18 comprises, for example, a liquid crystal display device and displays the present time, water depth and diving time in accordance with the drive signal from the display driving circuit 17.

Figure 3:
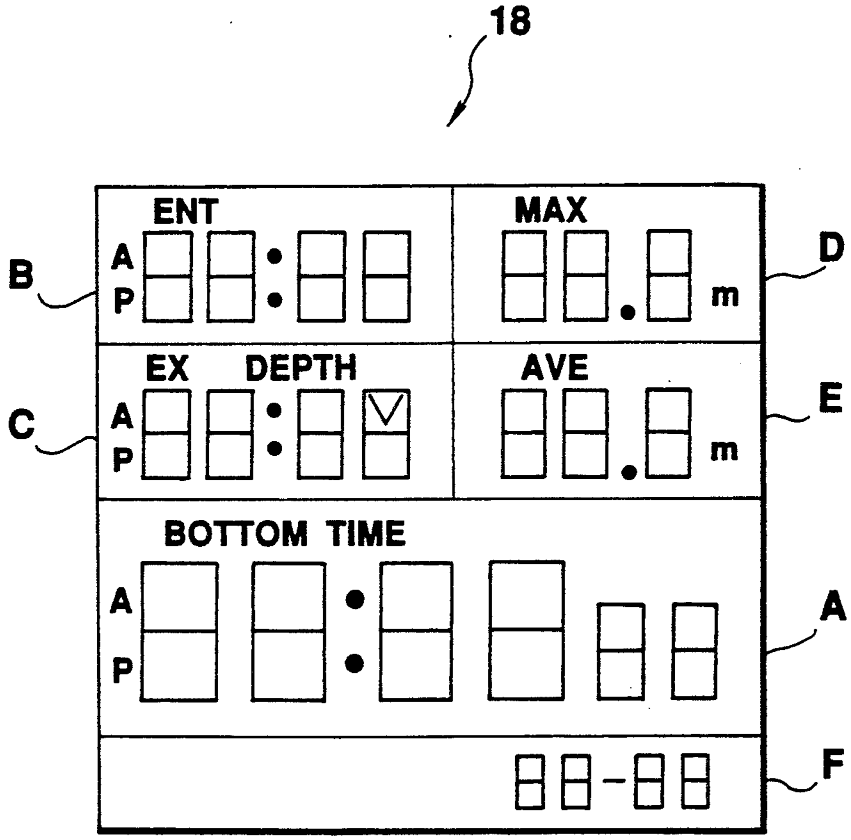
FIG. 3 is a view showing a detailed construction of a display section of FIG. 1.

FIG. 3 is a view showing a construction of the display section 18. As shown in FIG. 3, the display section 18 comprises six segment display portions A through F.

On the segment display portion B on the left side of the upper portion of the display section 18, the time when the diver starts diving is displayed and on the segment display portion D on the right side, the maximum water depth is displayed.

On the segment display portion C on the left side of the central portion of the display section 18, water depth at a diving spot is displayed together with characters "DEPTH" while the diver is diving and the time when the diver finishes diving is displayed together with character with characters "EX" when the diver finishes diving.

On the segment display portion E on the right, an average water depth is displayed.

On the segment display portion A at the lower portion of the display section 18, characters "BOTTOM TIME" are displayed together with diving time when the pressure instrument is set to the water-depth measurement mode and the present time is displayed when the instrument is set to the watch mode.

On the segment display portion A at the bottom, the date of the day is displayed in the watch mode and water-depth measurement mode and date for dive data to be displayed is displayed in the read mode.

(1-2) Operation of the first embodiment

Operation of the first embodiment having the above described construction will be described with reference to flow charts illustrated in FIGS. 4 to 7.

Figure 4:
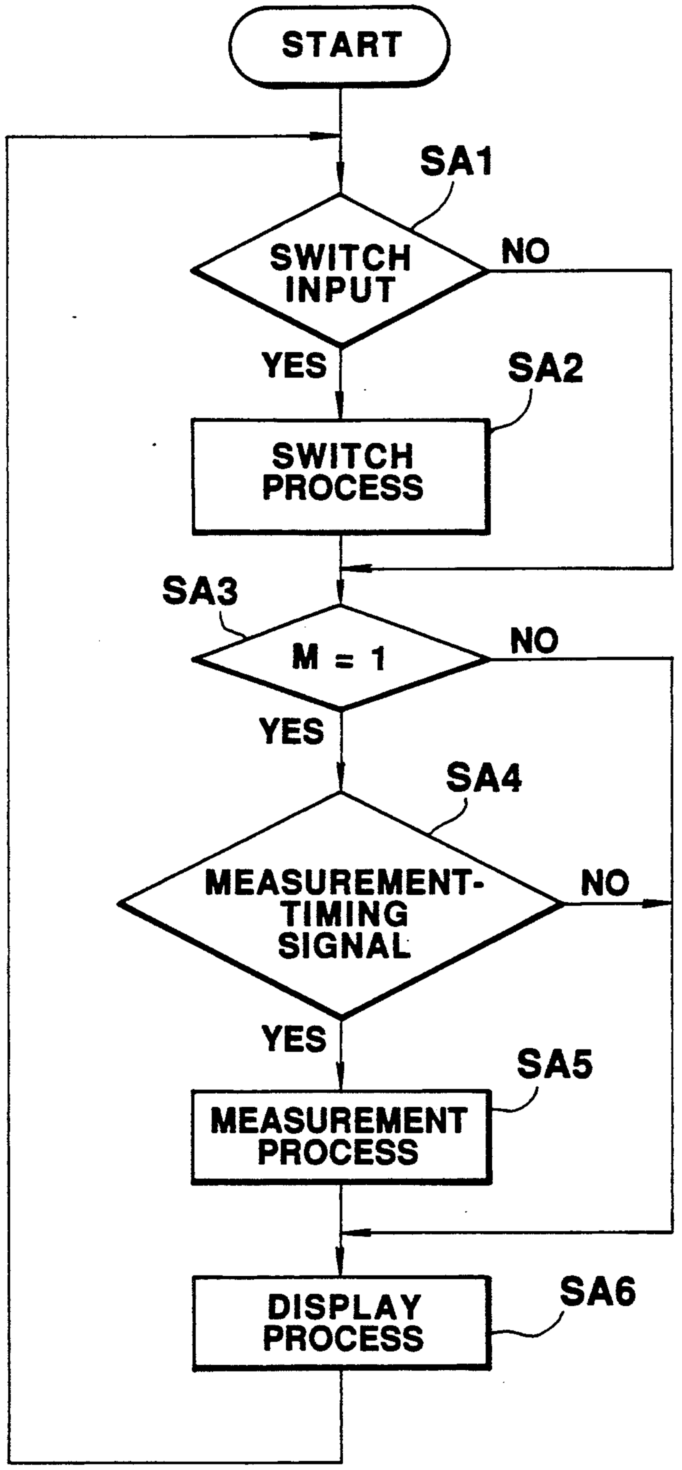
FIG. 4 is a brief flow chart showing overall operation of the pressure instrument of FIG. 1.

FIG. 4 is a flow chart showing overall operation of the first embodiment. In FIG. 4, it is judged in Step SA1 if any of switches h as been operated. When it is judged that one of switches has been operated, a switching process is executed in the following Step SA2.

The switching process will be described hereafter with reference to the flow chart of FIG. 5.

Figure 5:
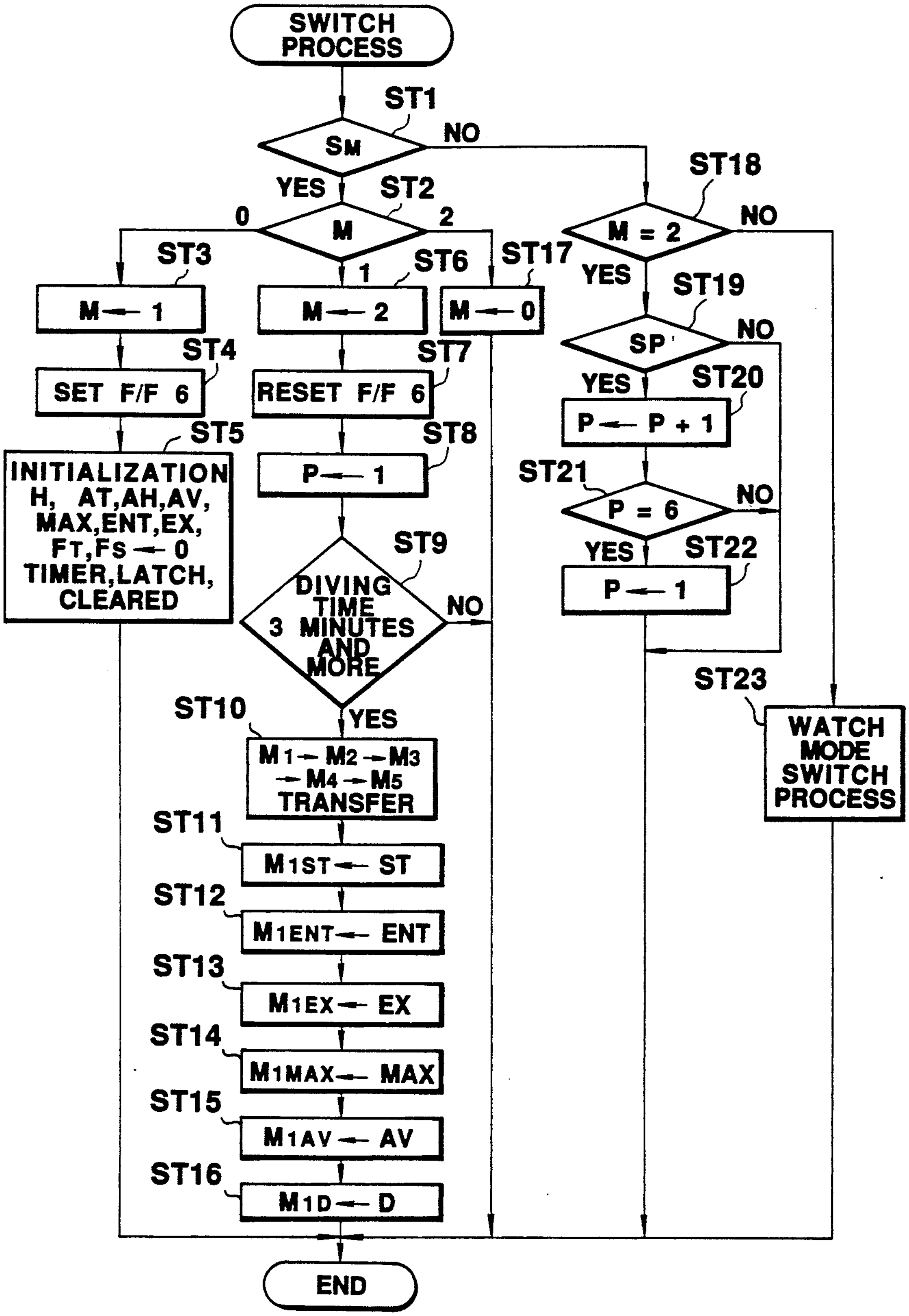
FIG. 5 is a flow chart showing a switching process of FIG. 4.

In FIG. 5, it is judged in Step ST1 if the mode switch SM has been operated. When it is judged that the mode switch SM has been operated, it is judged in Step ST2 whether the mode register M has been set to a value "0", "1" or "2".

When M=0 is true, that is, when the mode switch SM has been operated in the watch mode, the process goes to Step ST3, where the mode register M is set to a value "1" and thereby the watch mode is switched to the water-depth measurement mode. In the following Step ST4, the flip-flop circuit 6 is set, thereby allowing the measurement-timing signal of 3 second period to be transferred to CPU 5.

In Step ST5, the registers H, AT, MAX, ENT, EX, FS and FR of RAM 16 are cleared and further the timer circuit 10 and latch circuit 11 are cleared.

In this way, when the pressure instrument is set to the water-depth measurement mode, all of the registers for storing measured water-depth, counted number of divings and average water-depth are cleared and the pressure sensor 12 is ready for starting measurement of water-depth.

Meanwhile, when it is judged in Step ST2 that M=1 is true, that is, when the switch SM is operated in the water-depth measurement mode, the process advances to Step ST6, where the mode register M is set to a value "2" and thereby the mode of the pressure instrument is switched into the read mode. Then, in Step ST7 the flip-flop circuit 6 is reset to cease the water-depth measurement.

In Step ST8, the pointer P is set to a value "1" to designate the first memory M1.

Then, it is judged in Step ST9 if the present diving time counted by the timer circuit 10 has reached 3 minutes and more.

When it is judged in Step ST9 that the diving time is 3 minutes and more, dive data stored in the memory M5 is removed and dive data stored in the memory M4 is transferred to the memory M5, dive data stored in the memory M3 is transferred to the memory M4 and so on.

In this manner, dive data stored in the memories M1 through M4 are transferred and stored in the memories M2 through M5, respectively and the leading memory M1 is ready for storing new dive data.

In Step ST11, the present diving time ST stored in the timer circuit 10 is transferred and stored in the register $M_{1ST}$.

In step ST12, data representing the time when the diver starts diving stored in the register ENT is transferred to be stored in the register $M_{1ENT}$. In Step ST13, data representing the time when the diver finishes diving stored in the register EX is transferred to be stored in the register $M_{1EX}$.

Further, in Step ST14, the maximum water-depth data stored in the register MAX is transferred to be stored in the register $M_{1MAX}$ and in Step ST15 average water-depth data stored in the register AV is transferred to be stored in the register $M_{1AV}$.

In Step ST16, data representing date D on which the diver dives is stored in the register $M_{1D}$ as diving date data.

In the meantime, when it is judged in Step ST9 that the diving time ST has not exceeded 3 minutes, the dive data obtained in this case is not stored in the memory M1. More specifically, when the diving time for one diving is 3 minutes and more, respective dive data stored in the registers ST, ENT and EX are transferred and stored in the first memory M1 at the time when the water-depth measurement mode is switched to the read mode. Meanwhile, when the diving time is less than 3 minutes, the dive data obtained at that time are not stored in the memory M1.

Accordingly, dive data obtained while a diver dives by skin diving for a short time are not stored in the memory M1, thereby preventing the dive data from being removed which are to be noted as a dive record.

In the meantime, when it is judged in Step ST2 that M=2 is true, that is, when the switch SM is operated in the read mode, the process advances to Step ST17, where the mode register M is set to a value "0" and the operation mode of the pressure instrument is switched to the watch mode, thereby finishing the switching process.

Figure 8:
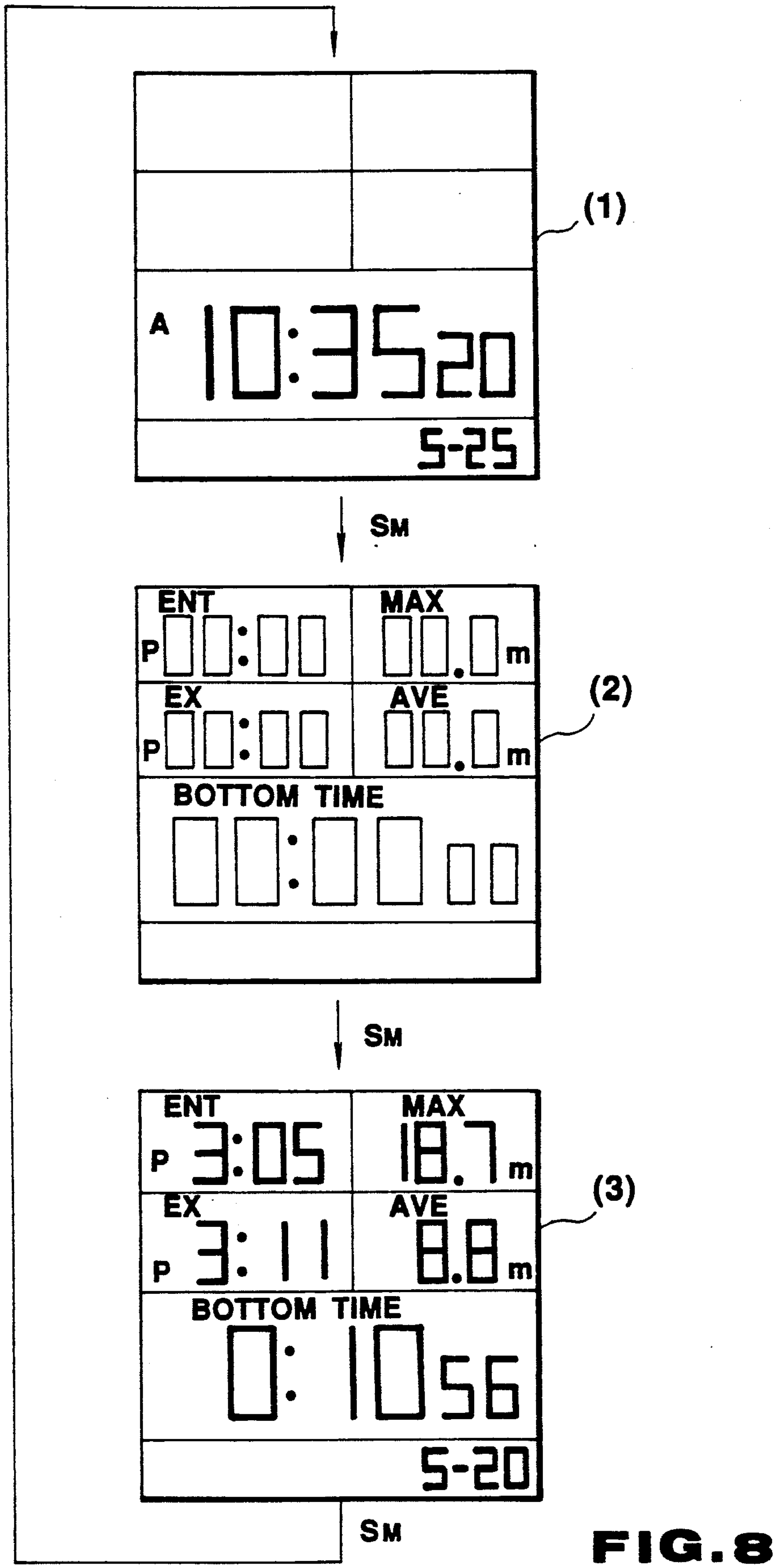
FIG. 8 is a view showing display states when a mode of the pressure instrument of FIG. 1 is switched.

FIG. 8 is a view showing an example of display states at the time when the operation mode is switched by operation of the switch SM.

When the switch SM is operated in the watch mode(M=0) shown in FIG. 8(1), the operation mode is switched to the water-depth measurement mode and as shown in FIG. 8(2) each register is initialized, thereby displaying "0" on the display portions A through F as the initial state.

When the switch SM is operated in the water-depth measurement mode again, the operation mode is switched to the read mode for reading dive data as shown in FIG. 8(3), wherein the latest dive data stored in the first memory M1 is displayed.

In this case, the latest dive data is data that was obtained on the day, May 2 when the diver dived. This dive data indicates that the diving time is "10 minutes and 56 seconds", the maximum water-depth is "18.7 m" and the average water-depth is "8.8 m".

In FIG. 5, when it is judged in Step ST1 that the operated switch is not the switch SM, the process advances to Step ST18, where it is judged if the mode register M has been set to a value "2".

When M=2 is true, it is judged in Step ST19 if the read switch SP is operated. When the switch SP is operated, in Step ST20 the pointer P is incremented and reading address for the memory M1 is advanced to the next one.

Thereafter, it is judged in Step ST21 if the pointer has reached a value "6". When P=6 is true, then "P=6" means that the pointer is advances to the next, after dive data stored in the fifth memory M5 has been read. In the following Step ST22 the pointer P is set to a value "1" and the reading address is returned to the initial value.

When P is less than 6, then the process terminates.

In this manner, each operation of the switch SP successively advances the pointer P and thereby dive data stored in the memories M1 through M5 are successively displayed in the display process, as will be described later.

Figure 9:
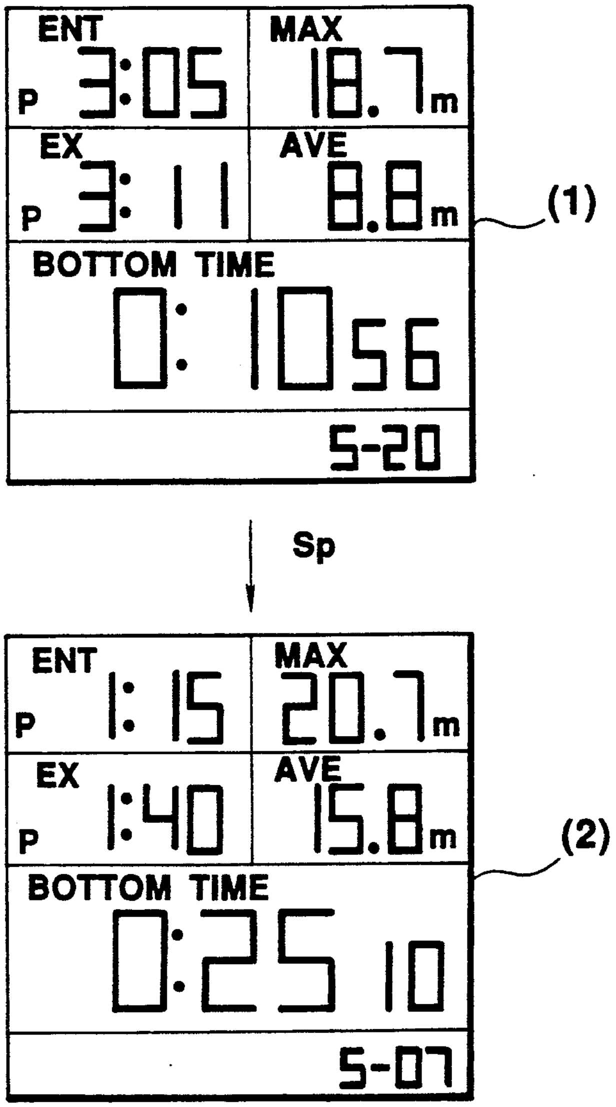
FIG. 9 is a view showing a display state in a reading mode of the pressure instrument of FIG. 1.

FIG. 9 is a view showing an example of display states at the time when the above switch SP is operated.

When the operation mode is switched to the read mode, the latest dive data, "May 20", stored in the first memory M1 is displayed as shown in FIG. 9(1).

When the switch SP is operated in this state, the Pointer P is advanced and the dive data "May 7" stored in the second memory M2 is read and displayed on the display section 18 as shown in FIG. 9(2). Thereafter, every operation of the switch SP causes dive data stored in the memories M3, M4 and M5 to be successively read and displayed on the display section 18. After the dive data stored in the memory M5 is read and displayed, the dive data stored in the first memory M1 is read and displayed again.

When it is judged in Step ST18 of FIG. 5 that M=2 is not true, which means that a switch other than the switch SP has been operated, the process advances to Step 23 where appropriate switching process is executed.

When the switching process is finished as described above, the process advances to Step SA3 of FIG. 4, where it is judged if the mode register M has been set to a value "1".

When the operation mode is set to the water-depth measurement mode (M=1), it is judged in Step SA4 if a measurement-timing signal has been received and further it is judged if the signal is the measurement-timing signal of 3 second period.

When the measurement-timing signal is received, a measurement process will be executed in Step SA5.

The measurement process will be described hereafter with reference to the flow chart of FIG. 6.

Figure 6:
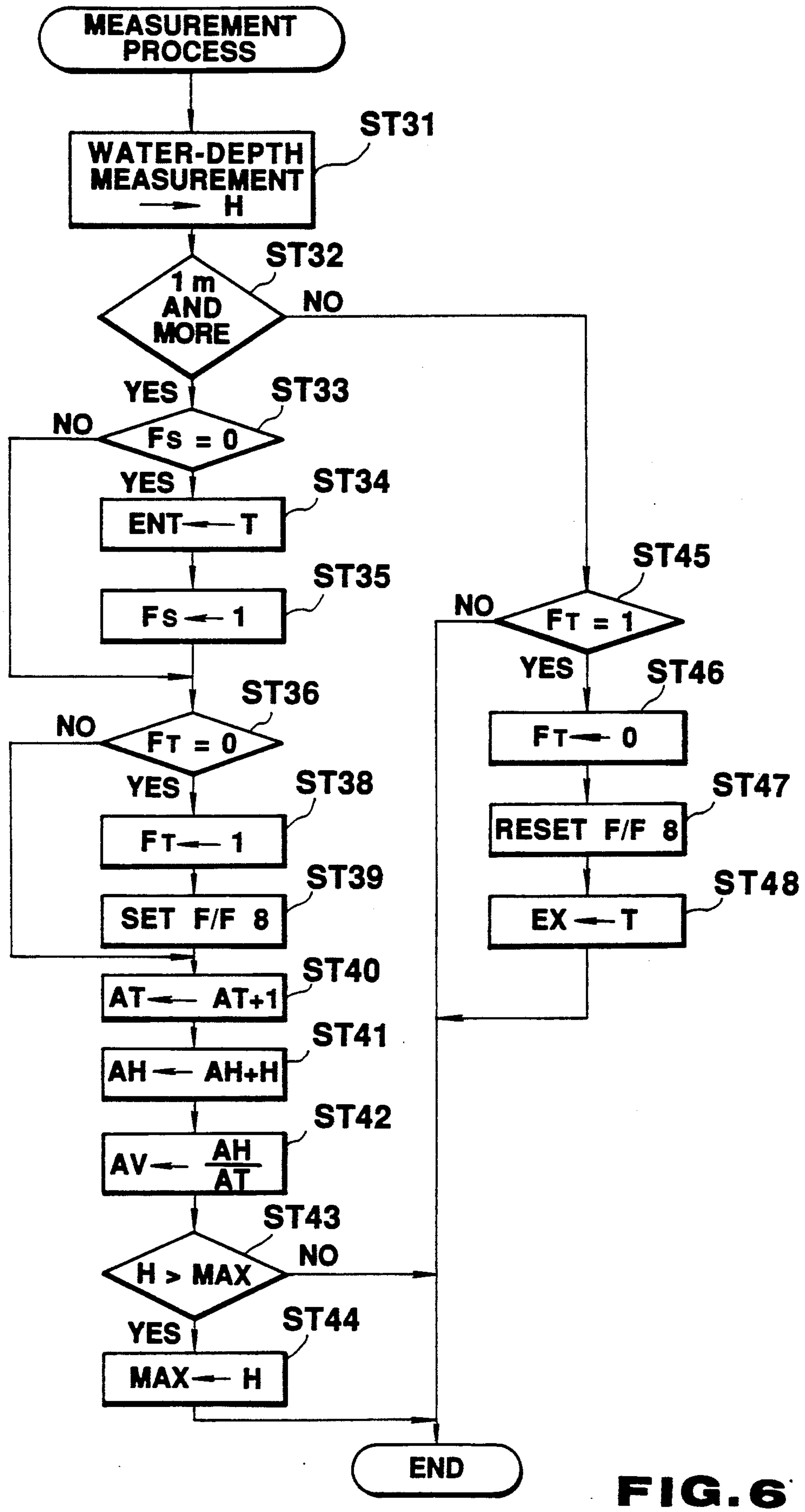
FIG. 6 is a flow chart showing a measurement process of FIG. 4.

In Step ST31 of FIG. 6, the pressure sensor 12 and A/D converter 14 are driven and obtained water-depth data is stored in the register H of RAM 16.

Then, it is judged in Step ST32 if the water depth is 1 m and more which is calculated from pressure measured by the pressure sensor 12.

When the water depth is 1 m and more, it is judged in Step ST33 if the register FS has been set to a value "0".

When the water depth is 1 m and more and FS=0 is true, which means that the diver has dived as deep as 1 m for the first time, then the process advances to Step ST34, where the present time T is stored in the register ENT as the time when the diver starts diving and the register FS is set to a value "1" for memorizing that water depth is 1 m and more.

It is judged in Step ST36 if the register FR has been set to a value "0". When the diver has dived as deep as 1 m for the first time, the process advances to Step ST38 since the register FR has been set to a value "0". In Step ST38, the register FR is set to a value "1" for memorizing that the diver has dived as deep as 1 m and more.

Further, the flip-flop circuit 8 is set in Step ST38, thereby causing the timer circuit 10 to start measurement of diving time and then the process advances to Step ST40.

Meanwhile, when the diver has dived as deep as 1 m and more, the process advances to Step ST40 through Step 33 and Step 36 at every input of the measurement-timing signal of 3 second period, since the registers FS and FR have been set to a value "1".

In Step ST40, for memorizing that water-depth measurement has been effected for one time, the register AT is incremented and the result is stored in the register AT.

In Step ST41, water-depth data measured this time and stored in the register H is added to an accumulated value of water-depth data stored in the register AH, and the result of the addition is stored in the register AH as a new accumulated value of water-depth data.

In Step ST42, an average water-depth is obtained by dividing the accumulated value of water-depth data stored in the register AH by number of divings stored in the register AT and the result of the division, i.e., the quotient is stored in the register AV as an average water-depth data.

Further in Step ST43, water-depth data of the register H is compared with the maximum water-depth data of the register MAX in order to judge whether the water-depth data H measured this time is larger than the maximum value MAX of water-depth data which have been measured.

When it is judged in Step ST43 that the water-depth data H measured this time is larger than the maximum value MAX which has been stored in the register MAX, then the water-depth data H measured this time is stored in the register MAX as the maximum water-depth data. When the water-depth data H measured this time is smaller than the maximum value MAX which has been stored in the register MAX, then the above maximum value MAX is not re-written.

In the meanwhile, when it is judged in Step ST32 that water depth is less than 1 m, the process advances to Step ST45, where it is judged if the register FR has been set to a value "1".

When FR=0 is true, which "FR=0" means that the diver has not dived as deep as 1 m, the process is ceased and water-depth measurement is continued.

When FR=1 is true, which "FR=1" means that the diver has dived as deep as 1 m and more and then come up as deep as less than 1 m again, the register FR is reset to a value "0" in Step ST46.

In Step 47, the flip-flop circuit 8 is reset, thereby causing the timer circuit 10 to cease counting of diving time.

Further in Step ST48, the present time T is stored in the register EX as data representing the time when the diver finishes diving.

In these processes, when the operation mode is switched to the water-depth measurement mode, water-depth measurement starts and when measured water depth has reached 1 m and more, the registers FS and FR are set to a value "1" and counting of diving time starts automatically. Thereafter, when water-depth becomes less than 1 m, the register FR is reset to a value "0" and counting of diving time is ceased.

At this time, data stored in the registers AT, AH and MAX are reserved as they are. Then, as described above the operation mode is switched from the water-depth measurement mode to the read mode. When the diving time has reached 3 minutes and more, data stored in respective registers are transferred and stored in the first memory M1. Meanwhile, in the water-depth measurement mode, when the diver dives as deep as 1 m and more again, then counting of diving time starts again and water-depth data measured thereafter are stored in the above respective registers.

When the measurement process has been finished as have been described above, then the display process will be executed in Step SA6 of FIG. 4.

The display process will be described hereafter with reference to the flow chart of FIG. 7.

Figure 7:
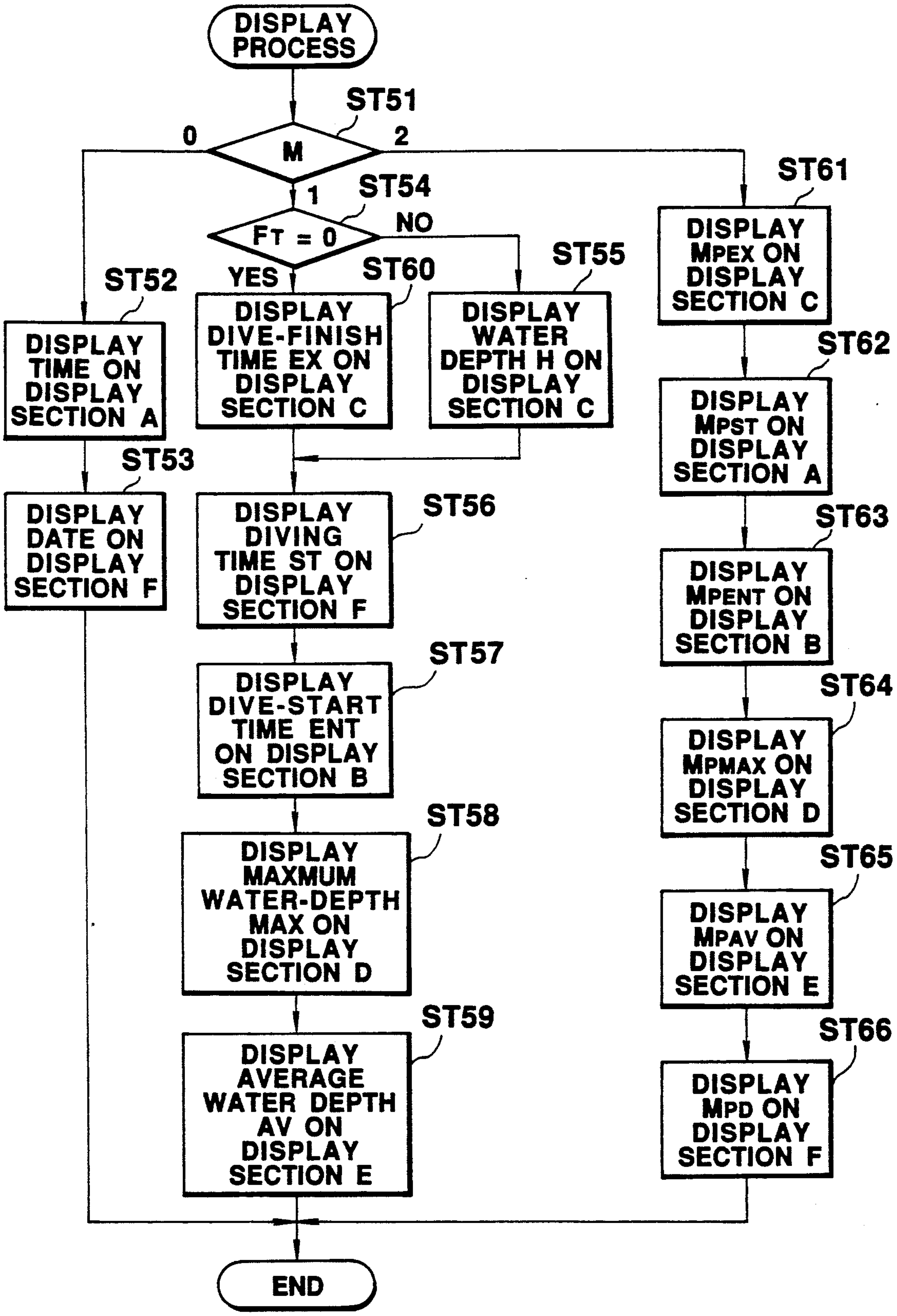
FIG. 7 is a flow chart showing a display process of FIG. 4.

In FIG. 7, it is judged in Step ST51 which values; "0", "1" and "2" the mode register M has been set to.

When M=0 is true, i.e., when the watch mode has been set, the process advances to Step ST52, where the present time data T form the time counting circuit 3 is displayed on the display portion A. Further in the following Step ST53, date data D from the date counting circuit 4 is displayed on the display portion F.

Meanwhile, when it is judged in Step ST51 that the water-depth measurement mode, M=1 has been set, the process advances to Step ST54, where it is judged if the register FR has been set to a value "0".

When FR=1 is true, i.e., when water depth is 1 m and more, the process advances to Step ST55, where water-depth data of the register H is displayed on the display portion C for indicating the water depth at which the diver is now diving.

In Step ST56, diving time ST counted by the timer circuit 10 is displayed on the display portion A as the diving time of the diving.

In Step ST57, the data stored in the register ENT is displayed on the display portion B for indicating the time when the diver started diving.

Further, in Step ST58, the maximum water depth stored in the register MAX is displayed on the display portion D.

In step ST59, an average water depth stored in the register AV is displayed on the display portion E.

While the diver is diving, from these displayed data he can learn, how deep (water depth at the present spot) he is now diving, how long (diving time) he has been in water, the maximum water depth that he has reached and an average water depth of his diving.

When it is judged in Step ST54 that FT=0 is true, i.e., water depth is less than 1 m, which "FR=0" means that the diver has finished diving or that the diver has not yet dived as deep as 1 m, the process goes to Step ST60, where the data stored in the register EX is displayed on the display portion C for indicating the time when the diver finished diving.

At this time, when the diver has finished and come up as deep as less than 1 m, the data stored in the register EX for indicating the time when the diver finished diving is displayed. When the diver has started diving but has not dived as deep as 1 m, a value "0" is displayed on the display portion C, since the register EX has been cleared and set to a value "0".

After execution of process in Step ST60, the processes in Step ST56 through Step ST56 are executed, wherein diving time, dive-starting time, maximum water depth and average water depth stored in the registers ST, ENT, MAX and AV are displayed.

In this case, when the diver has finished diving and has come up, dive data which have been measured and calculated are displayed on the display portions C, A, B, D and E, respectively, since these data have been stored in respective registers.

When the diver has started diving and has not yet dived as deep as 1 m, a value "0" is displayed on respective display portions, since these registers have been kept cleared and reserve a value "0".

Meanwhile, when it is judged in Step ST51 that M=2 is true, i.e., that the read mode for reading dive data has been set, the process advances to Step ST61, where data which has been stored in a register $M_{pex}$ designated by the pointer P is displayed on the display portion C for indicating the time when the diver finished diving.

In a similar manner, in Step ST62 diving time which has been stored in a register $M_{psx}$ designated by the pointer P is displayed on the display portion A.

In Step ST63, data stored in a register $M_{pent}$ is displayed on the display portion B for indicating the time when the diver started diving.

In Step ST64, maximum water depth stored in a register $M_{pmax}$ is displayed on the display portion B.

In Step ST65, average water depth stored in a register $M_{pav}$ is displayed on the display portion E.

Further, in Step ST66, dive-date stored in a register $M_{pd}$ is displayed on the display portion F.

In this manner, in the read mode, dive data stored in the memory $M_p$ designated by the pointer P are displayed on appropriate display portions.

Figure 10:
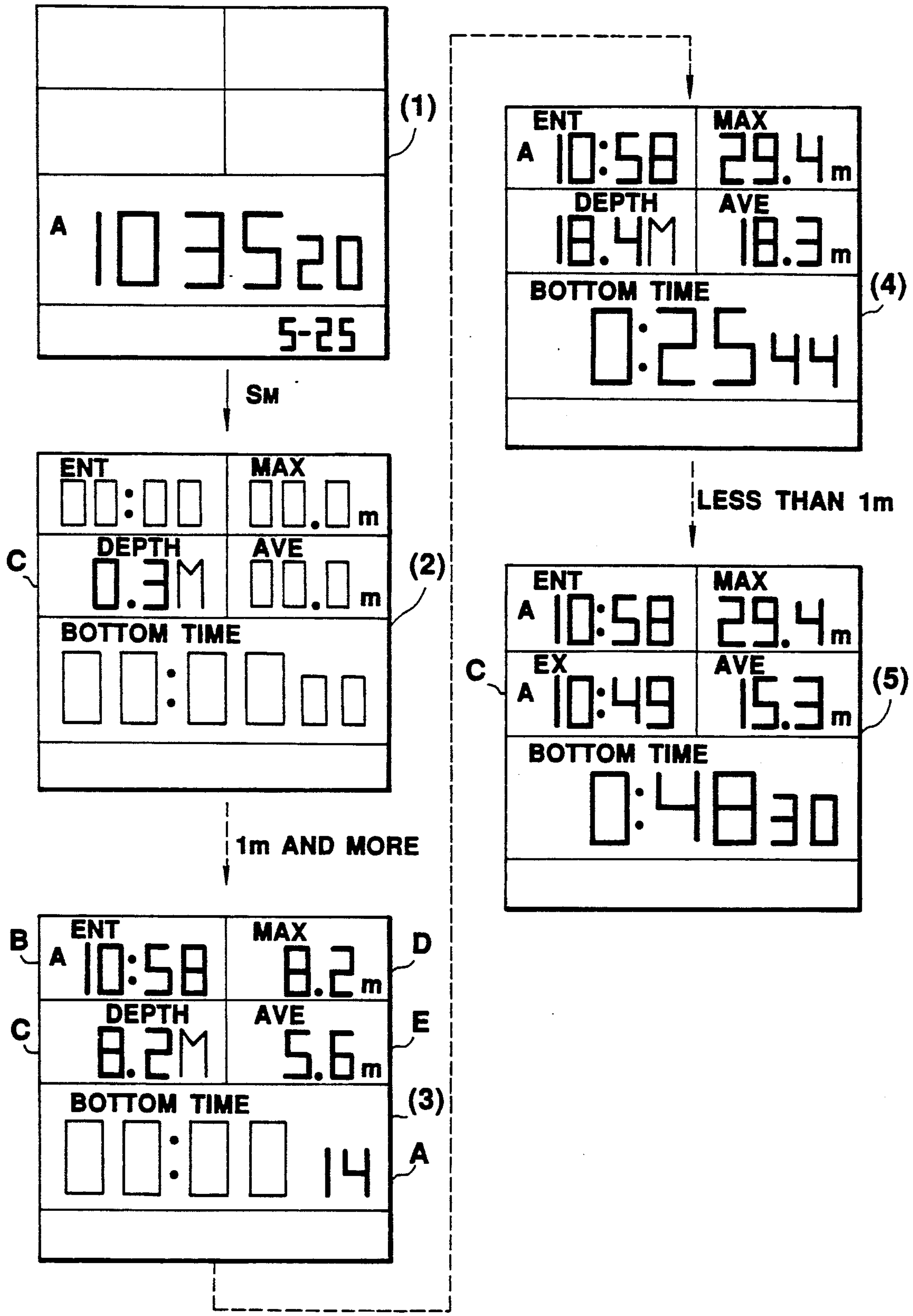
FIG. 10 is a view showing a display state when an electronic water depth meter of FIG. 1 is used to measure a water depth.

FIG. 10 is a view showing an example of display states in the watch mode and in the water-depth measurement mode.

When the operation mode is switched from the watch mode shown in FIG. 10(1) to the water-depth measurement mode, the water-depth measurement starts and water depth measure at that time is displayed.

If the water depth measured at that time is less than 1 m, counting of diving time does not start but only the above measured water depth is displayed on the display portion C as shown in FIG. 10(2).

Thereafter, when the diver has dived as deep as 1 m and more, then the time when the diver has dived as deep as 1 m and more is stored in the register ENT as data representing the time when the diver starts diving.

Further, the flip-flop circuit 8 is set and thereby counting of diving time starts.

FIG. 10(3) is a view showing a display state at water depth of 8.2 m, and a dive-start time "58 minutes past 10 o'clock" is displayed on the display portion B, and the maximum water depth "8.2 m", which has been ever measured, water depth "8.2 m" measured at that time, an average water depth "5.6 m" and diving time "14 seconds" are displayed on the display portions D, C, E and A, respectively.

When the diver dived as deep as 18.4 m and has come up as deep as less than 1 m as shown in FIG. 10(4), on the display portion C the time when the diver comes up or he finishes diving, for example "45 minutes past 10 o'clock" is displayed in place of the water depth previously displayed thereon.

In the above described embodiment, measured dive data are stored in the memory only when the diving time exceeds a predetermined time. Therefore, dive data obtained during scuba diving which are previously stored in the memory are not replaced by dive data newly obtained during skin diving of a short diving time, thereby preventing the dive data which are necessary to make a note of a dive record from being removed.

Note that a pressure instrument according to the present invention which is applied to a water-depth meter has been described in the first embodiment but it will be apparent to those skilled in the art that the present pressure instrument may be applied to an altimeter. More specifically, the pressure instrument may be applied to the altimeter such that altitude data is calculated from pressure data detected by the pressure sensor in accordance with a calculation method disclosed in U.S. Pat. No. 4,835,716 assigned to the present applicant, and an externally operated switch is provided for indication of start and end of measurement and the time when the externally operated switch is operated is memorized as data representing measurement-start time and/or measurement-end time in place of the data representing the time when the diver starts and/or finishes diving.

It will be also apparent that a maximum altitude data and average altitude data may be calculated from obtained altitude data in the similar process to that for water depth data, since the altitude data is the same distance data in a perpendicular direction as the water depth data.

(1-3) Features of the first embodiment

Since the embodiment of the pressure instrument according to the present invention stores measured data, data representing date on which measurement is made and data representing time at which the measurement is started and/or finished, from these stored data a user of the pressure instrument can learn later environmental conditions such as water temperature, ocean current, ebb tide and flood tide, temperature, weathers, wind speed and wind direction on the day on which the measurement was made.

(2) Second Embodiment (2-1) Construction of the second embodiment

Figure 11:
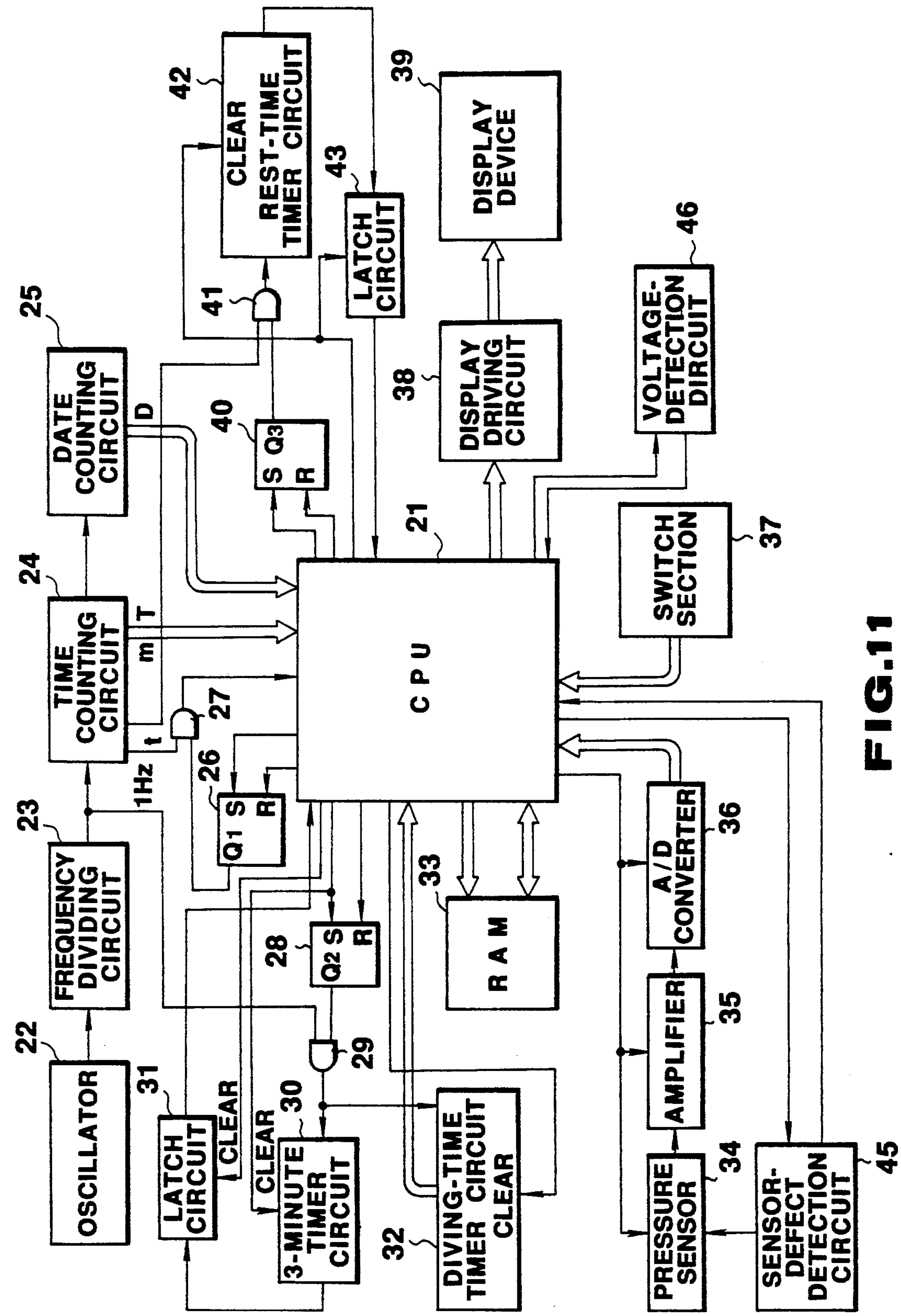
FIG. 11 is a block diagram of a second embodiment of a pressure instrument according to the present invention.

FIGS. 11 through 25 are views showing the second embodiment of the pressure instrument according to the present invention. FIG. 11 is a view showing a block diagram of the second embodiment, in which CPU 21 has various circuits connected thereto.

CPU 21 is a circuit which receives signals or data from these circuits and generates and supplies control signals or data based on the received signals and data.

An oscillator 22 is a circuit which at all times supplies a signal of a predetermined frequency. A frequency dividing circuit 23 serves to divide the signal of a predetermined frequency received from the oscillator 22 to obtain a signal of 1 Hz and to supply the signal of 1 Hz to a time counting circuit 24 and AND gate 29. The time counting circuit 24 serves to count the signal of 1 Hz from the frequency dividing circuit 23 to obtain present time data T including time, minute, second and hour, which is supplied to CPU 21, to supply a day carry signal to a date counting circuit 25 every 12 o'-clock p.m., to supply a measurement-timing signal t of a predetermined period to AND gate 27 and further to supply a signal m of one minute to AND gate 41. The date counting circuit 25 serves to count the day carry signal from the time counting circuit 24 to obtain date data D of the day and supplies the obtained date data D to CPU 21.

RS flip-flop circuit 26 is set or reset in response to a set or reset signal from CPU 21 and serves to supply an output signal Q1 in set state. AND gate 27 is made open at receipt of the output signal Q1 of the RS flip-flop circuit 26, thereby allowing the measurement-timing signal t from the time counting circuit 24 to be transferred to CPU 21.

RS flip-flop circuit 28 is set or reset at receipt of a set or reset signal from CPU 21 and supplies an output signal Q2 when the circuit is in set state. AND circuit 29 is made open by the output signal Q2 from RS flip-flop circuit 28, thereby allowing the signal of 1 Hz from the frequency dividing circuit 23 to be transferred to a 3-minute timer circuit 30 and a diving-time timer circuit 32. The 3-minute timer circuit 30 serves to count the signal of 1 Hz delivered through AND gate 29 to measure 3 minutes and to supply a carry signal to a latch circuit 31 when the circuit 30 measures 3 minutes and further to clear measured time at receipt of signal from CPU 21. The latch circuit 31 serves to hold the carry signal from the 3-minute timer circuit 30 and to supply the output signal to CPU 21 and clear the held carry signal at receipt of the signal from CPU 21.

The diving-time timer circuit 32 serves to count the signal of 1 Hz and supplies the counted time to CPU 21 and to clear the counted time at receipt of the signal from CPU 21. RAM 33 having construction as will be described later is a memory circuit which stores data from CPU 21 and properly supplies the stored data to CPU 21.

A pressure sensor 34 is a semi-conductor sensor which generates an analog electric signal corresponding to environmental pressure under control of control signal from CPU 21. An amplifier 35 serves to amplify the analog electric signal transferred from the pressure sensor 34 under control of control signal from CPU 21. A/D converter 36 serves to convert the analog electric signal amplified by the amplifier 35 into a digital signal under control of control signal of CPU 21 and to supply the digital signal to CPU 21. A sensor-defect detection circuit 45 serves to detect defect (short-circuit or disconnection) of the pressure sensor 34 and to supply a signal to CPU 21 when defect of the sensor 34 has been detected.

Switch section 37 is a circuit which comprises a mode switch SM and other switches and supplies an appropriate switch-operation signal when any of these switches is operated. A voltage-detection circuit 46 judges at receipt of the signal from CPU 21 if a power battery voltage is lower than a predetermined voltage and supplies a signal of H level when the circuit 46 has judged that the power battery voltage is lower than a predetermined voltage.

A display driving circuit 38 receives data from CPU 21 and serves to drive a display device 39 to display data in a digital fashion. The display device 39 comprises a liquid crystal display panel 39*a* to display water depth, present time and the like.

RS flip-flop circuit 40 is set and/or reset at receipt of a set signal and/or reset signal from CPU 21 and supplies an output signal Q3 when it is in set state. AND circuit 41 is made open at receipt of the output signal Q3 from RS flip-flop circuit 40, thereby allowing a signal m of 1 minute from the time counting circuit 24 to be transferred to a rest-time timer circuit 42. The rest-time timer circuit 42 serves to supply a carry signal to a latch circuit 43 when it counts 60 minutes and to clear counted time at receipt of signal from CPU 21. The latch circuit 43 serves to hold the carry signal from the rest-time timer circuit 42 and to supply the held carry signal to CPU 21 and also serves to clear the held carry signal at receipt of the signal from CPU 21.

Figure 12:
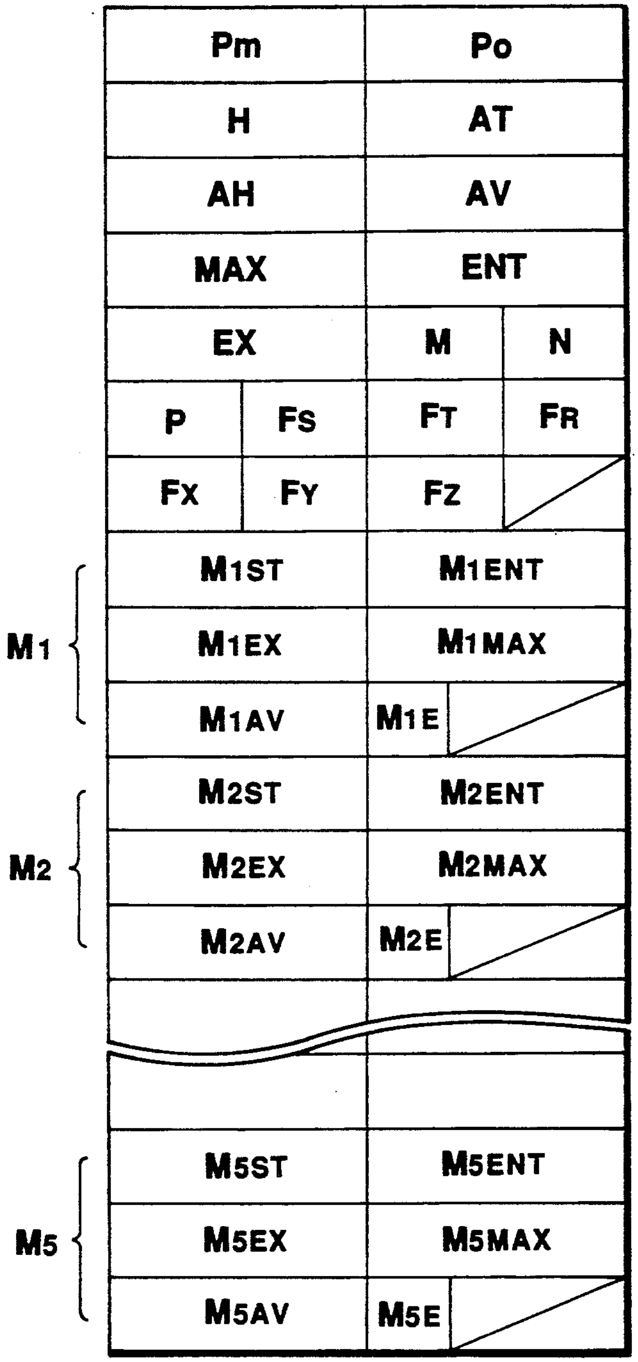
FIG. 12 is a view showing a detailed construction of RAM of FIG. 11.

FIG. 12 is a view showing a construction of the above mentioned RAM 33.

In FIG. 12, a register Pm serves to store pressure data measured with the pressure sensor 34 and a register Po serves to store reference pressure data. A register H serves to store measured water depth data and a register AT serves to store data representing number of water-depth measurements made after the diver starts diving. A register AH serves to store accumulation of measured water depths. A register AV is a register for storing average water-depth data for one diving and a register MAX is for storing maximum water-depth data and a register ENT is for storing data representing the time when the diver starts diving, or dive-start time data. A register EX is for storing data representing the time when the diver finishes diving or dive-finish time data.

Registers M, N are mode registers which store numerical data corresponding to the operation modes, respectively. For example, when the operation mode is set to the watch mode, a value "0" is stored in both the registers M and N, when to the water-depth measurement mode, a value "1" is stored in the register M and a value "0" is stored in the register N, and when to the read mode, a value "0" is stored in the register M and a value "1" is stored in the register N. A register P is a pointer which designates any one of five memories M1 through M5 as described later and is incremented by every operation of the read switch Sp.

A register Fs is set to a value "1" when the diver dives as deep as 1 m and more. A register Ft is set to a value "1" when the diver dives as deep as 1 m and more and is set to a value "0" when the diver comes up as deep as less than 1 m.

A register Fr is set to a value "0" when water depth is 1 m and more and is set to a value "1" when water depth is less than 1 m.

For instance, when the diver dives as deep as 1m and more, a value "1" is set to registers Fs and Ft. Once these registers Fs and Ft are set to a value "1", measurement of water depth and counting of diving time start in a measurement process as will be described later. When the diver comes up as deep as less than 1 m, the register Ft is set to a value "1", wherein the measurement of water depth is continued but counting of diving time is ceased.

A register Fx is set to a value "1", when water depth becomes less than −1 m (for example −3 m) because of a reference value set improperly. A register Fy is set to a value "1", when the sensor-defect detection circuit 45 detects defect of the pressure sensor 34 and a register Fz is set to a value "1", when the voltage-detection circuit 46 detects voltage drop in the power battery.

RAM 33 comprises five memories M1 through M5 for storing dive data. The latest dive data is stored in the first memory M1 and dive data are stored in the memories M5 through M2 in order of time when they are obtained, respectively. Once all of these memories M1 through M5 stores dive data, the oldest dive data stored in the memory M5 is removed and dive data stored in the memories M1 through M4 are transferred to the memories M2 through M5, respectively and memory M1 is ready for storing new dive data when other measurement starts. The memories M1 through M5 have the same construction. Taking the memory M1 for example, a register $M_{1ST}$ is for storing diving time data, a register $M_{1ENT}$ is for storing dive-start time data or data representing the time when the diver starts diving and a register $M_{1EX}$ is for storing dive-finish time data or data representing the time when the diver comes up as deep as a certain water depth or finishes diving. A register $M_{1MAX}$ is for storing maximum water depth data, a register $M_{1AV}$ is for storing average water depth data, and a register $M_{1E}$ is set to a value "1", when dive data stored in said memory M1 was measured incorrectly and an attention mark has to be displayed for indicating to that effect.

Figure 13:
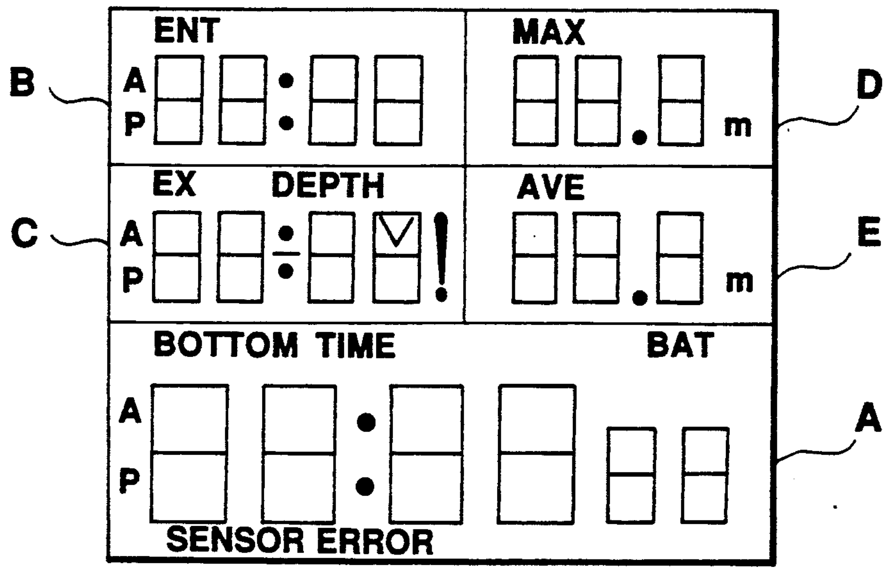
FIG. 13 is a view showing a detailed construction of a display section of FIG. 11.

FIG. 13 is a view showing a construction of the liquid crystal display panel 39a provided in the display device 39. As shown in FIG. 13, the liquid crystal display panel 39a comprises five segment display sections A through E. Data in the watch mode representing date and time when the diver starts diving are displayed on the segment display section B, a maximum water depth is displayed on the segment display section D, which is on the right side to the section B. On the central segment display section C, characters "DEPTH" as well as water depth of a spot where the diver is diving are displayed while the diver is diving, characters "EX" and data representing the time when the diver comes up from diving are displayed when the diver finishes diving and further an attention mark (exclamation mark "!") is displayed when mesurement was made incorrectly. An average water depth is displayed on the segment display section E. On the segment display section A at the bottom, characters "BOTTOM TIME" and diving time are displayed in the water depth measurement mode and the read mode and the present time is displayed in watch mode and further characters "BAT" indication voltage drop in the power battery and characters "SENSOR ERROR" indicating defect of the pressure sensor 34 are displayed.

(2-2) Operation of the second embodiment

Operation of the second embodiment as constructed mentioned above will be described hereafter.

Figure 14:
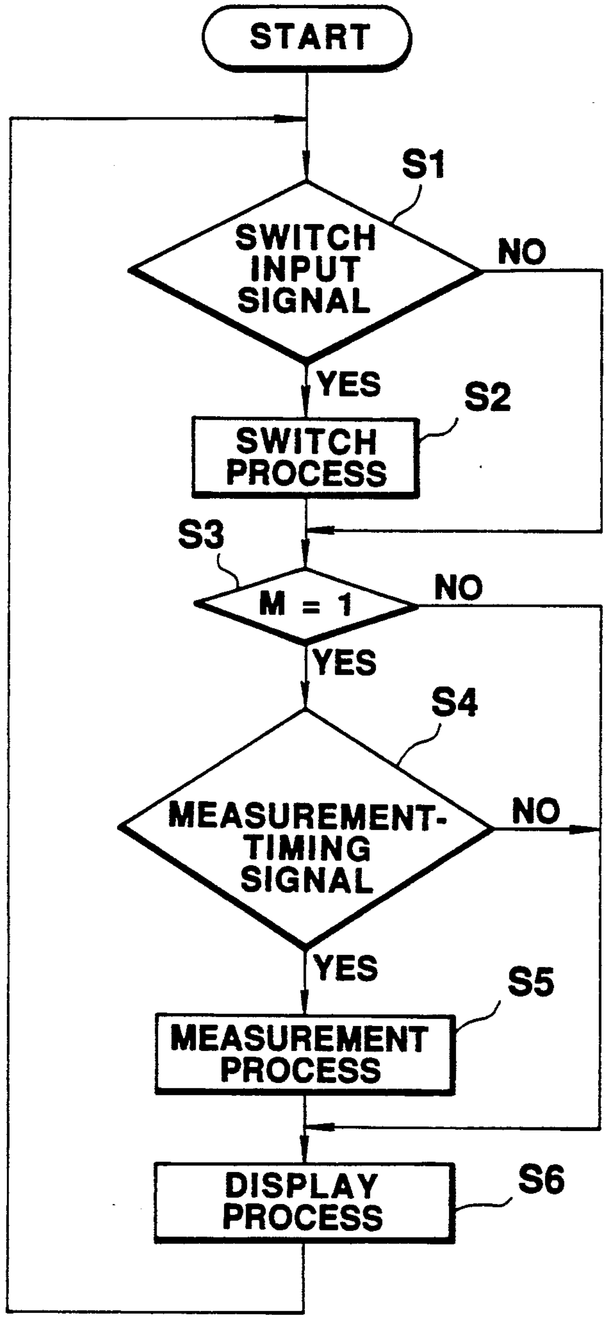
FIG. 14 is a brief flow chart showing overall operation of the pressure instrument of FIG. 11.

FIG. 14 is a general flow chart showing brief operation of the second embodiment. In Step S1 it is judged if the switch has been operated, i.e., if switch input has been received. When the switch input has been received, an appropriate switch process is executed in Step S2. Further, it is judged if the operation mode has been set to the water depth measurement mode. When the operation mode has been set to the water depth measurement mode, it is judged in Step S4 if the measurement timing signal t has been received. When the measurement timing signal t has been received, a measurement process is executed in Step S5 for measuring water depth. Finally, a display process is executed in Step S6 for displaying measured data such as water depth or the present time data on the liquid crystal display panel 39a and the process returns to the process of Step S1.

Figure 15:
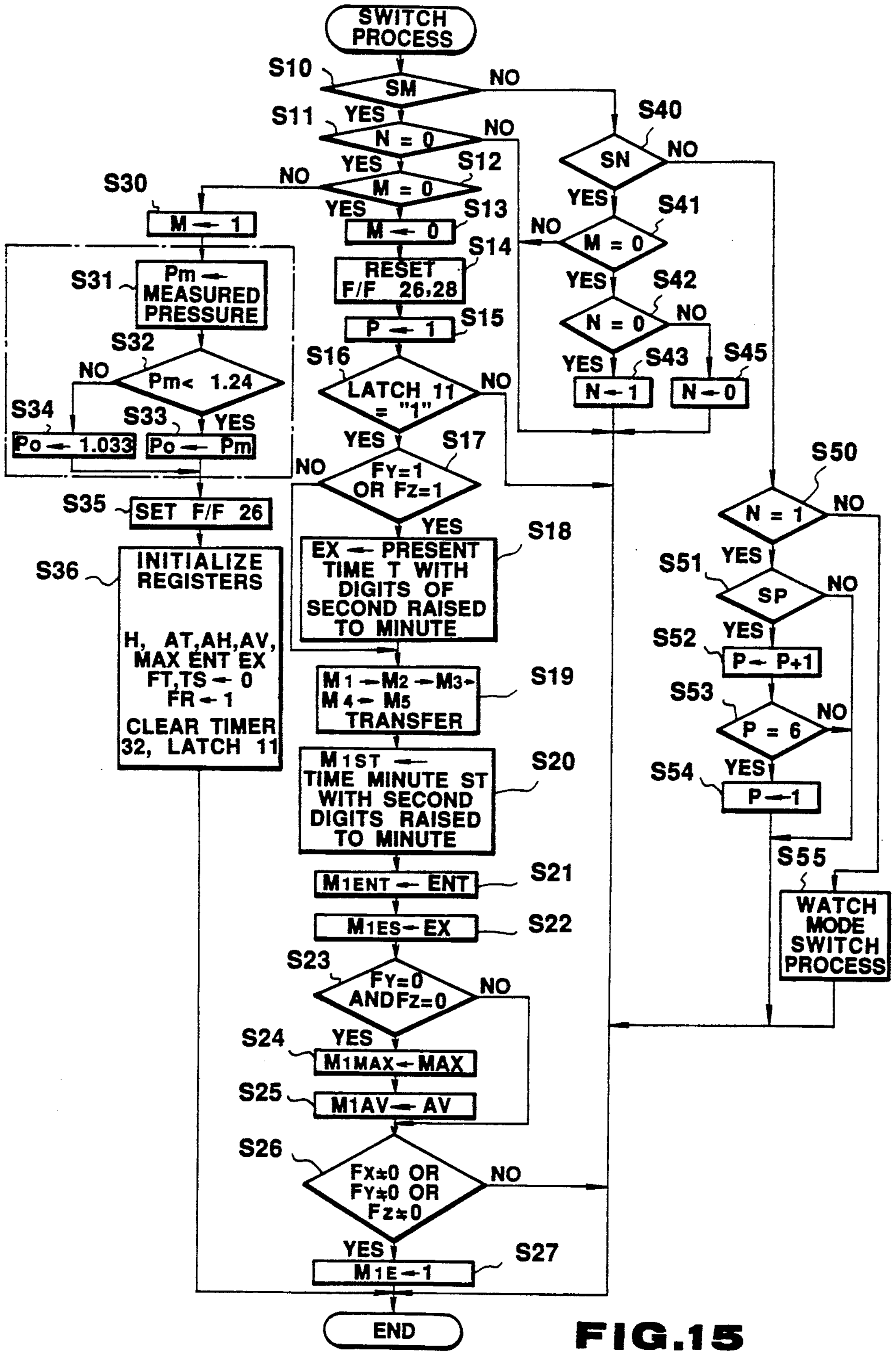
FIG. 15 is a flow chart showing a switching process of FIG. 14.
Figure 16:
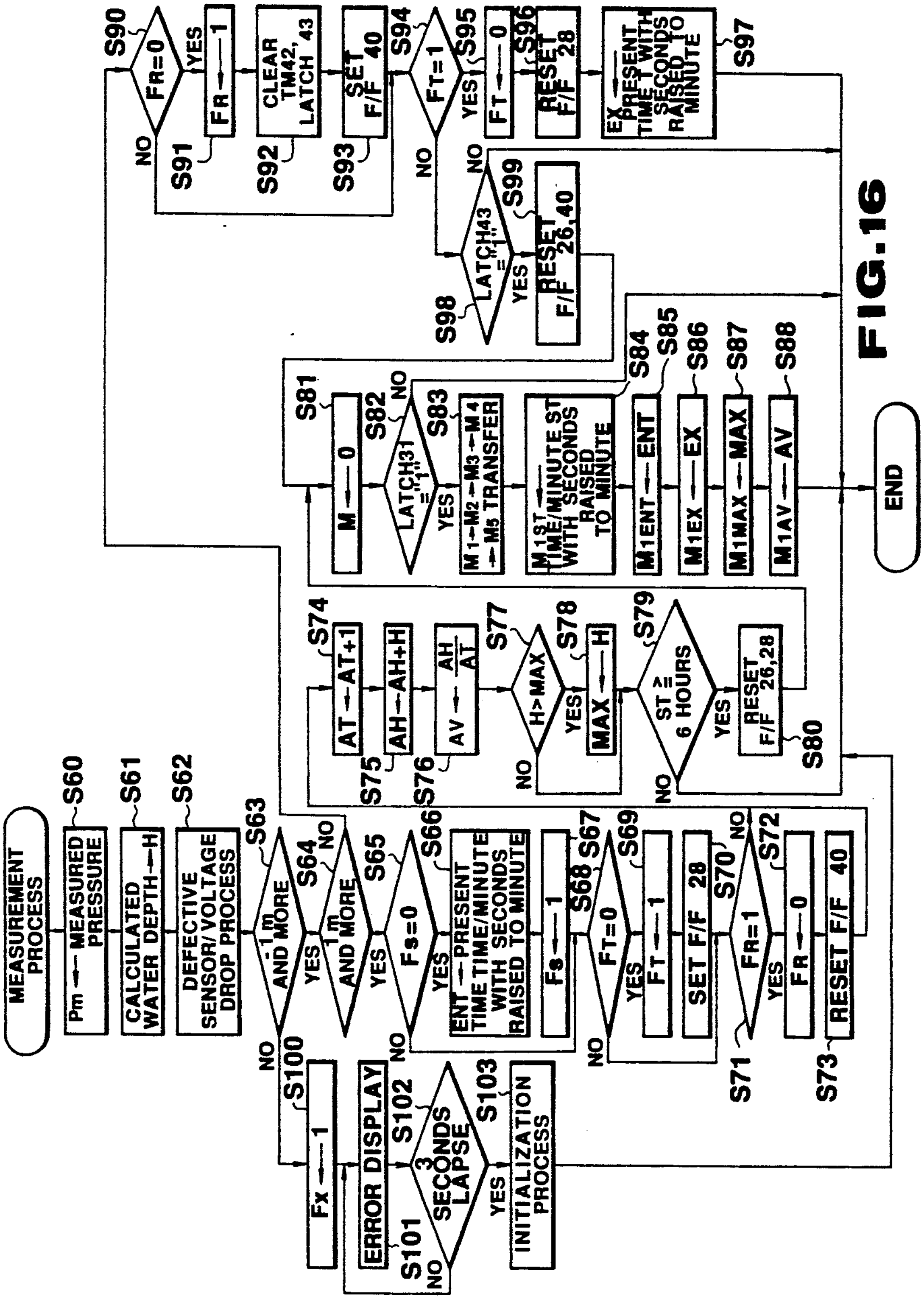
FIG. 16 is a flow chart showing a measurement process of FIG. 14.
Figure 17:
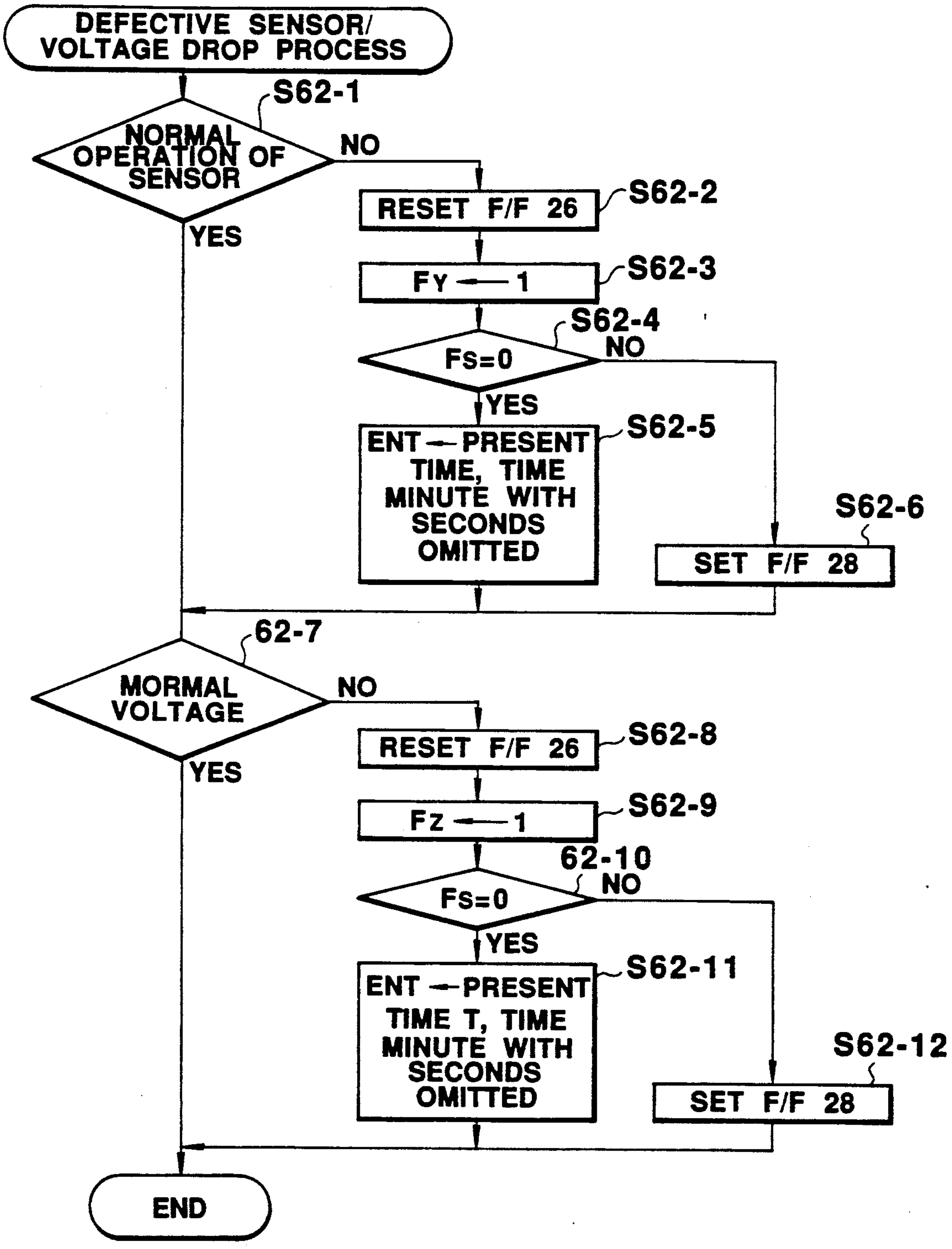
FIG. 17 is a view showing a process to be executed when a pressure sensor is defective or when power voltage is decreased.
Figure 18:
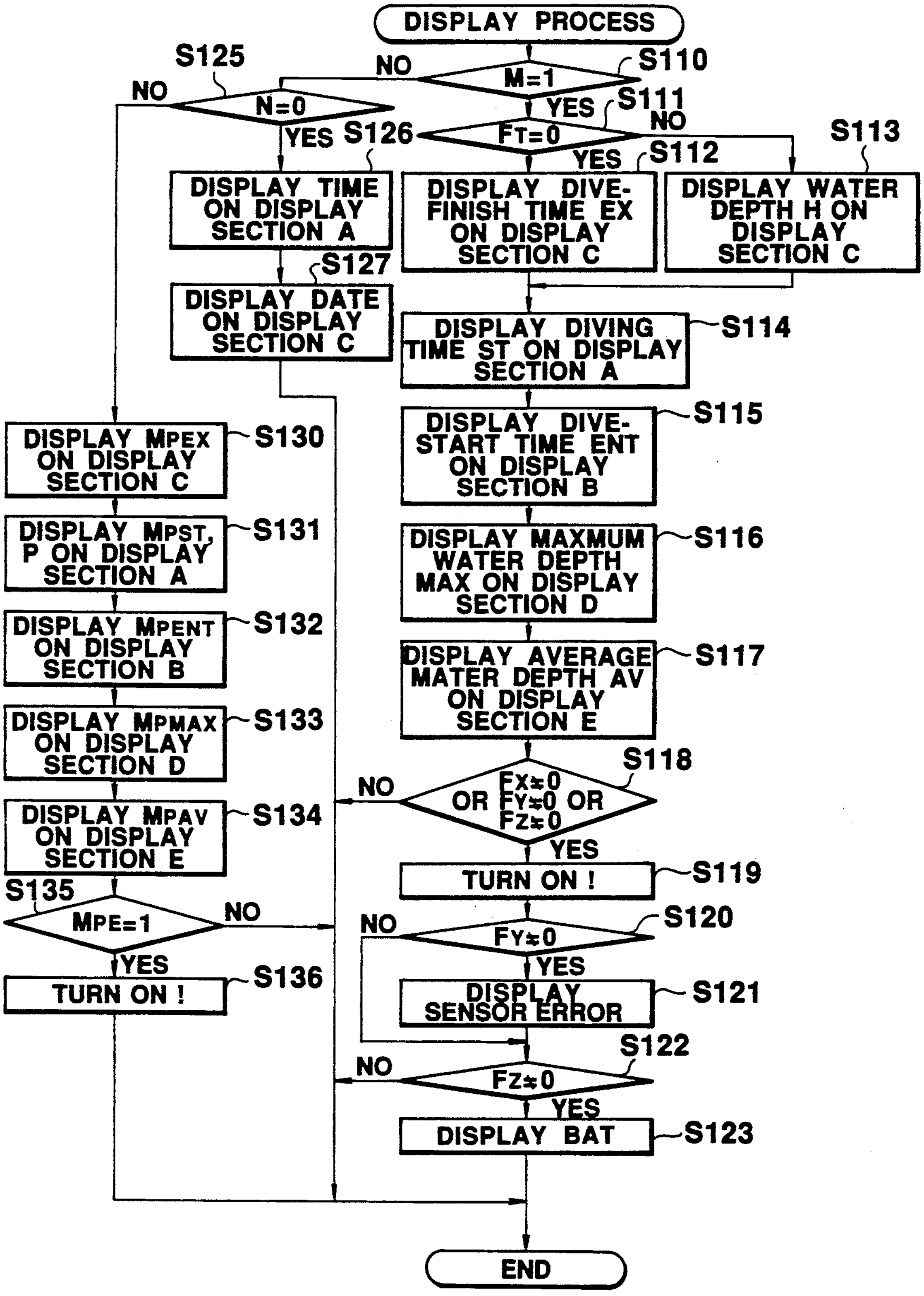
FIG. 18 is a flow chart showing a display process of FIG. 14.
Figure 19:
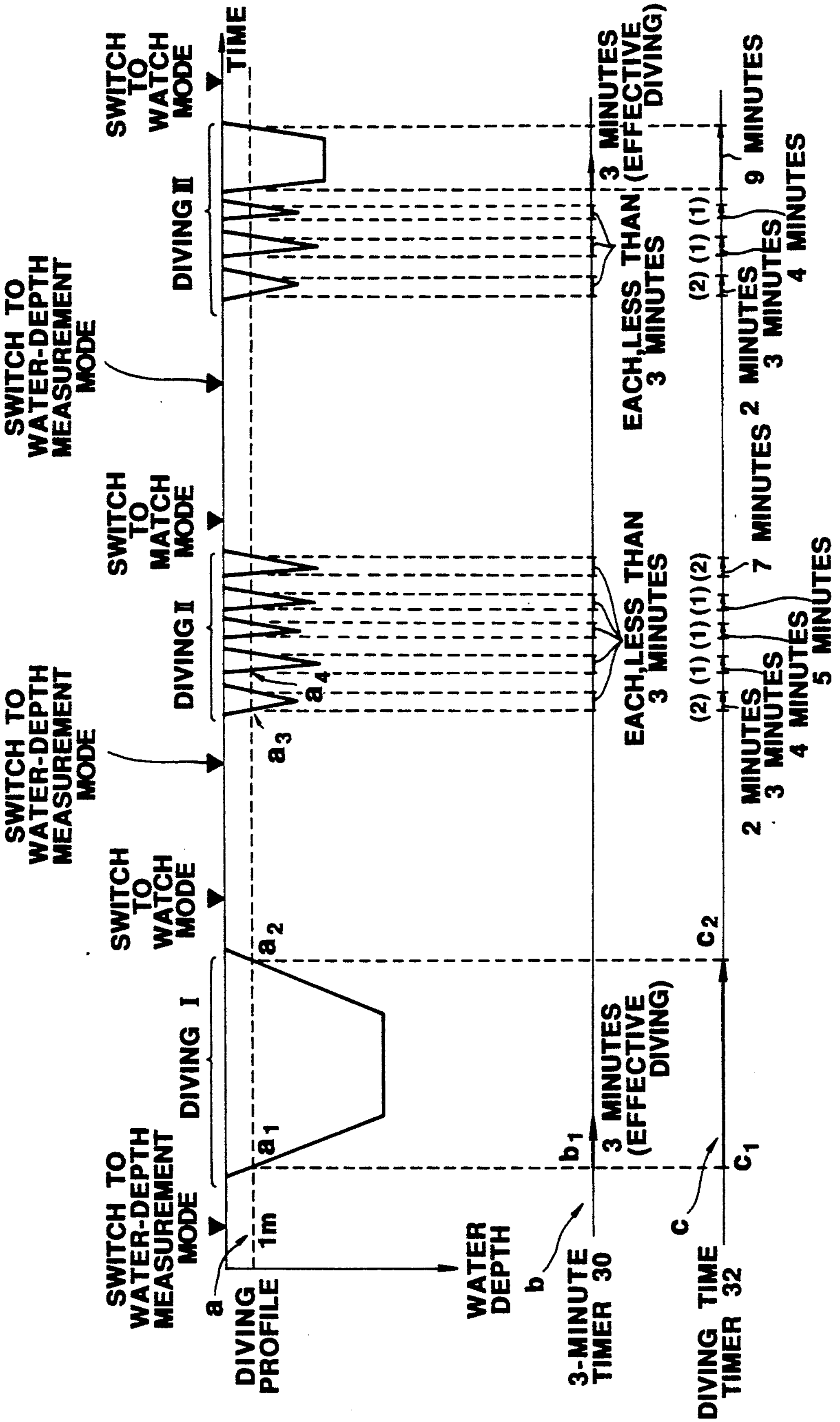
FIG. 19 is a dive profile for explaining an effective dive.
Figure 20:
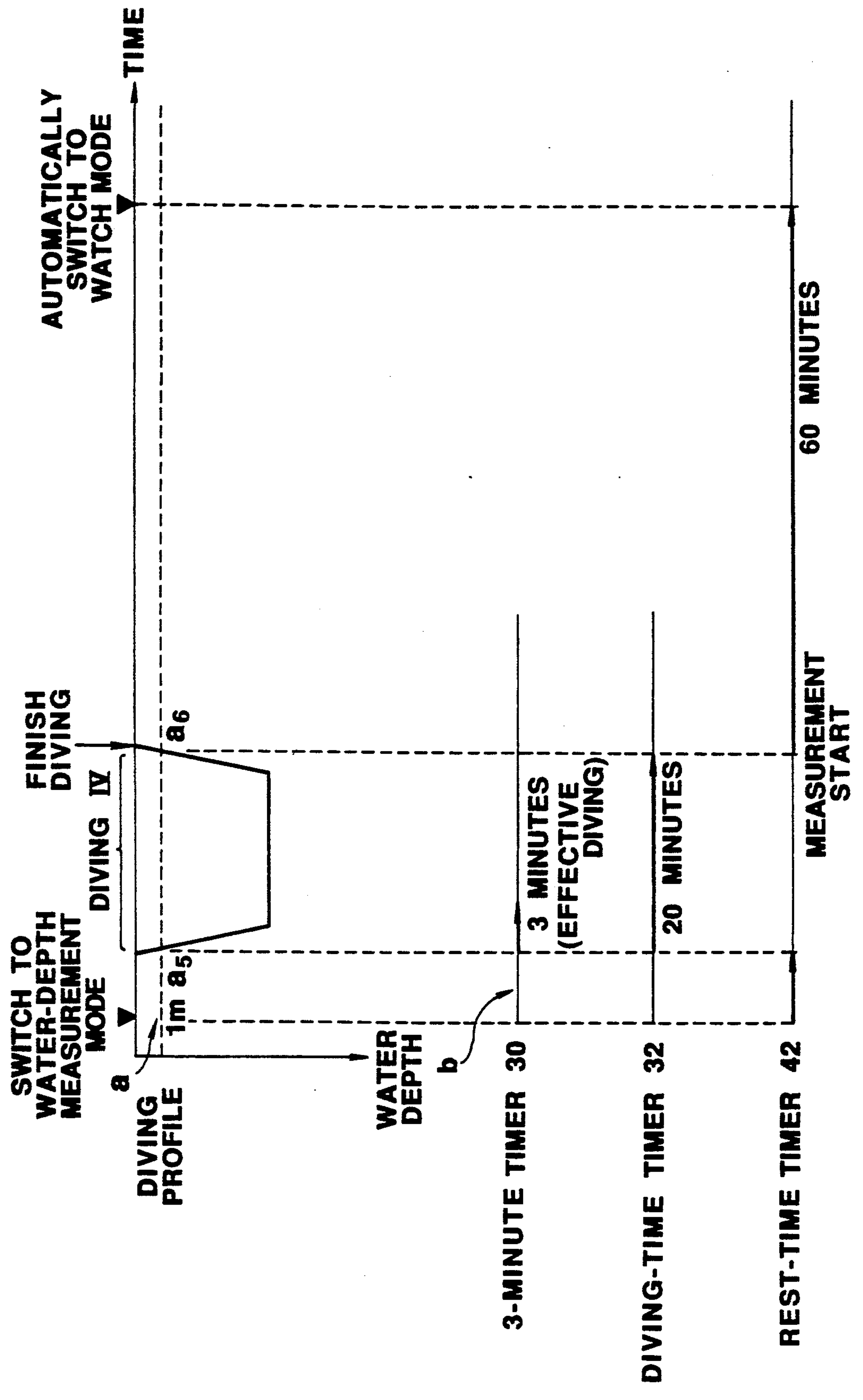
FIG. 20 is a dive profile for explaining automatic mode return from a water depth meter mode to a watch mode.

FIGS. 15 and 16 are views showing the switch process of Step S2 and the measurement process of Step S5 in the general flow chart. FIG. 17 is a detailed flow chart showing a process executed in Step S62 of FIG. 16 when defect of the pressure sensor and/or voltage drop in the power battery have been detected. FIG. 18 is a detailed flow chart showing the display process of Step S6 in the general flow chart. FIGS. 19 and 20 are views showing an example of the dive profile and measurement operation of each timer circuit while the diver is diving. FIGS. 21 through 25 are views showing an example of transition of the display states on the liquid crystal display panel 39a. Various operations of the embodiment will be described hereafter with reference to FIGS. 14 through 25.

(a) Operation for switching the operation mode from the watch mode into the water-depth measurement mode Operation with the pressure sensor 34 working in normal condition and the power battery supplying normal voltage will be described. For example, when the operation mode is set to the watch mode, the display process in Step S6 of the general flow chart shown in FIG. 14, i.e., the process according to the flow chart of FIG. 18 will be repeated, unless the switch is not operated. The process advances through Steps 110 and 125 to Step 126, where CPU 21 receives the present time data T from the time counting circuit 24 and displays the received present time data T on the segment display section A and in the following Step S127 CPU 21 receives date data D from the date counting circuit 25 and displays the received date data on the segment display section C and thereafter the operation mentioned above is repeated. For example, when the present time data is "35 minutes and 20 seconds past 10 o'clock, September 27", then the liquid crystal display panel 39a displays as shown in FIG. 21(1) or FIG. 22(1).

Figure 21:
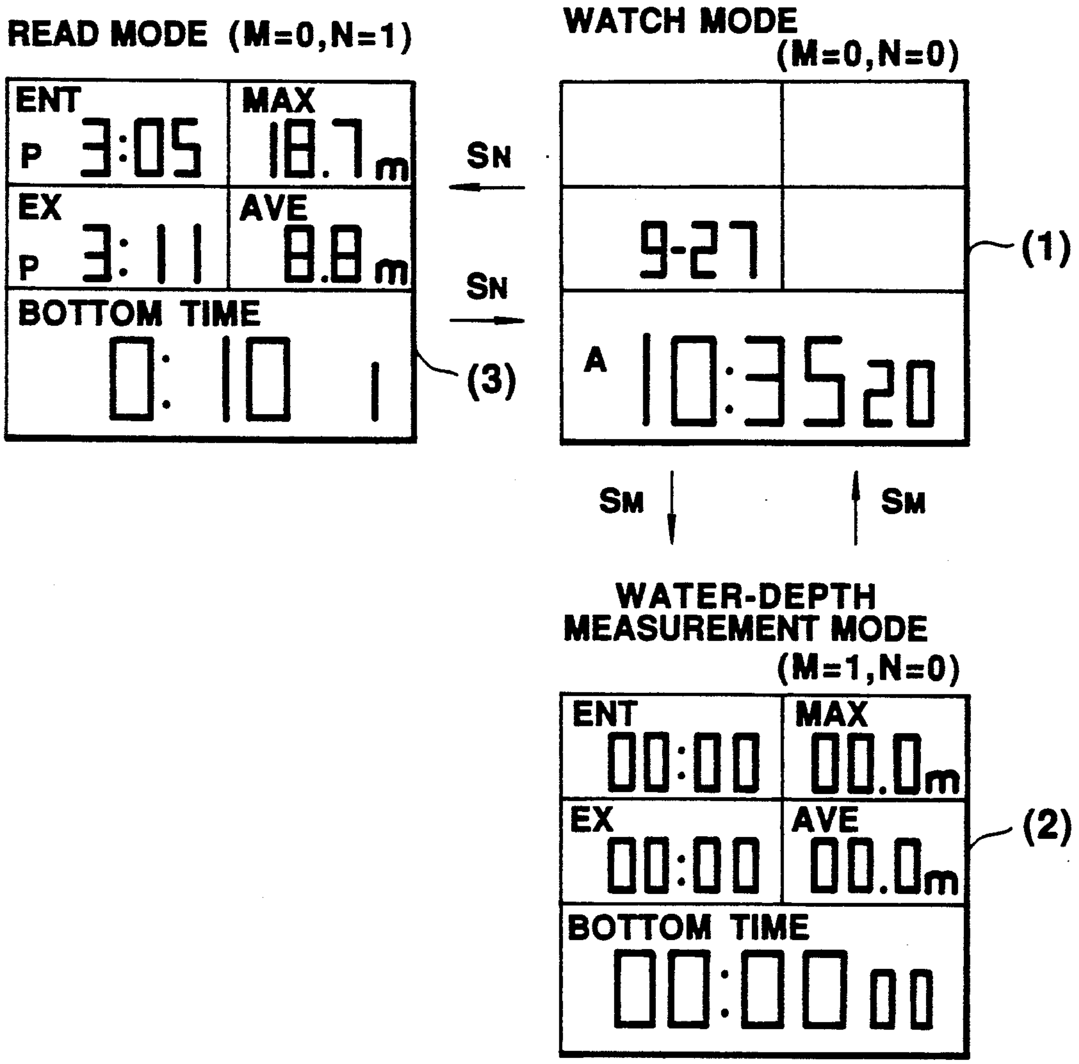
FIG. 21 is a view showing display states when a mode of the pressure instrument of FIG. 11 is switched.
Figure 22:
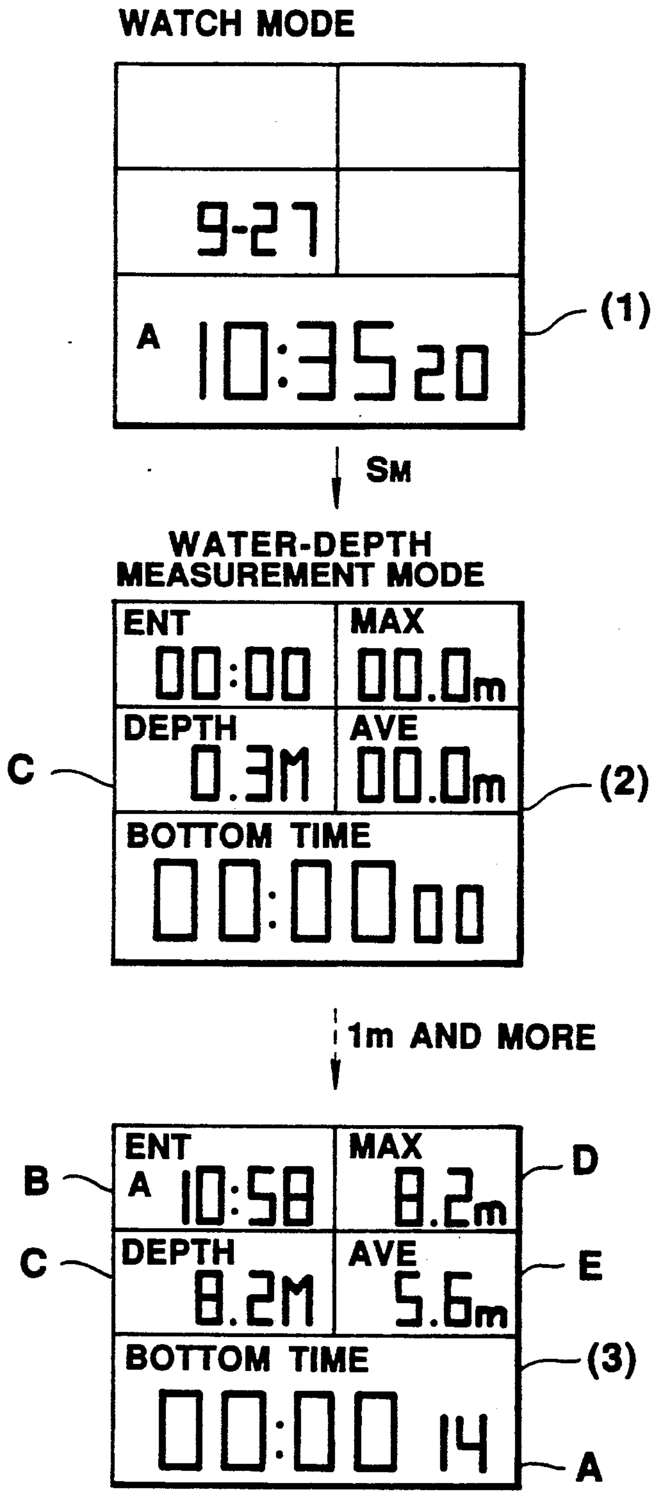
FIG. 22 is a view showing display states when a diver wearing the pressure instrument of FIG. 11 starts diving.

To use the embodiment as a water-depth meter, the mode switch SM is operated to bring the operation mode to the water-depth measurement mode, as shown in FIGS. 21, 22. In this case, the process advances from Step S1 to a switch process of Step S2 of the general flow chart of FIG. 14. In other words, the process is executed in accordance with the flow chart of FIG. 15. In Step S10, it is judged if the mode switch SM has been operated. When it is judged in Steps 11 and 12 that the registers N and M have been set to a value "0", and the operation is still in the watch mode, the register M is set to a value "1" and the operation is brought to the water-depth measurement mode in Step S30. In Step S31, pressure (air pressure) is measured with the pressure sensor 34 and the result of the measurement, i.e., pressure data, is stored in the register Pm. It is judged in Step S32 if the pressure data is not more than 1.24 $Kg/cm^2$ (pressure at water depth of 2 m). When the measured pressure is not more than 1.24 $Kg/cm^2$, then the measured pressure is stored in the register Po as reference pressure data in Step S33. In the meantime, when it is judged in Step S32 that the pressure data of the register Pm is more than 1.24 $Kg/cm^2$, the standard air pressure 1.033 $Kg/cm^2$ is set to the register Po as reference pressure data in Step S34. Then, RS flip-flop circuit 26 is set in Step S35, thereby allowing the measurement timing signal t to be transferred through AND gate 27 to CPU 21. In the following Step S36, the initialization process is executed, and whereby the registers H, AT, AH, AV, MAX, ENT, EX, Ft and Fs are cleared, and the diving-time timer circuit 32 and the latch circuit 31 are also cleared, and then the register Fr is set to a value "1".

The process further advances through Step S3 to Step S4 of the general flow chart of FIG. 14, where it is judged if CPU 21 has received the measurement timing signal t. When CPU 21 has received the signal t, then the process advances to Step S5, where the measurement process is executed in accordance with the flow chart of FIG. 16. In FIG. 16, CPU 21 supplies a signal to the pressure sensor 34 to cause it to measure pressure and the obtained pressure data is set to the register Pm in Step S60. A water-depth calculation process is performed to calculate water depth data from the obtained pressure data and the reference pressure data. The result of the calculation, water-depth data, is stored in the register H (Step S61). More specifically, in Step S61, a difference between the pressure data stored in the register Pm and the reference pressure data stored in the register Po is calculated and water-depth data is obtained by dividing the difference by a pressure increasing rate per sea water-depth 1m, 0.10256 $Kg/cm^2$, and then the obtained water-depth data is set in the register H. Thereafter, the process advances to a sensor-defect-/voltage-drop process of Step S62 of FIG. 16, detail of which is shown in FIG. 17. In Step S62 it is judged if the pressure sensor works normally and the power voltage is also normal. Then the process advances to Step S63, where it is judged if water depth is −1m and more. When it is judged that water depth is −1m and more, it is judged in Step S64 if water depth stored in the register H is not still more than 1m. When water depth is not more than 1m, which means that the diver has not yet started diving, the process advances through Steps 90, 94 and 98 to the display process (Step S6 of FIG. 14, i.e., a process shown in the flow chart of FIG. 18), and the process further advances through S110 and S111 to processes of Step S112 and the following Steps, where dive data are displayed on the appropriate display sections. In these processes, since the diver has not yet started diving, dive data is "0" and therefore the display states on the liquid crystal display panel 39*a* is as shown in FIG. 21(2). Then, it is judged in Step S118 that the pressure sensor 34 works normally and the power voltage is normal, and the process returns to Step S1, again.

Now, operation of the embodiment will be described hereafter, which is to be performed when the pressure sensor 34 does not work normally, or the power voltage is dropped abnormally, resulting in an abnormal work of the pressure sensor 34, at the time when the operation has been switched from the watch mode into the water-depth measurement mode. In the sensor-defect/voltage-drop process of the measurement process (in Step S62 of FIG. 16, detail of which is shown in FIG. 17), if it is judged in Steps S62-1 or S62-7 that the pressure sensor 34 does not work properly or the power voltage is not normal, Rs flip-flop circuit 26 is reset and thereby the measurement process is thereafter ceased in Step S62-2 or S62-8.

Figure 24:
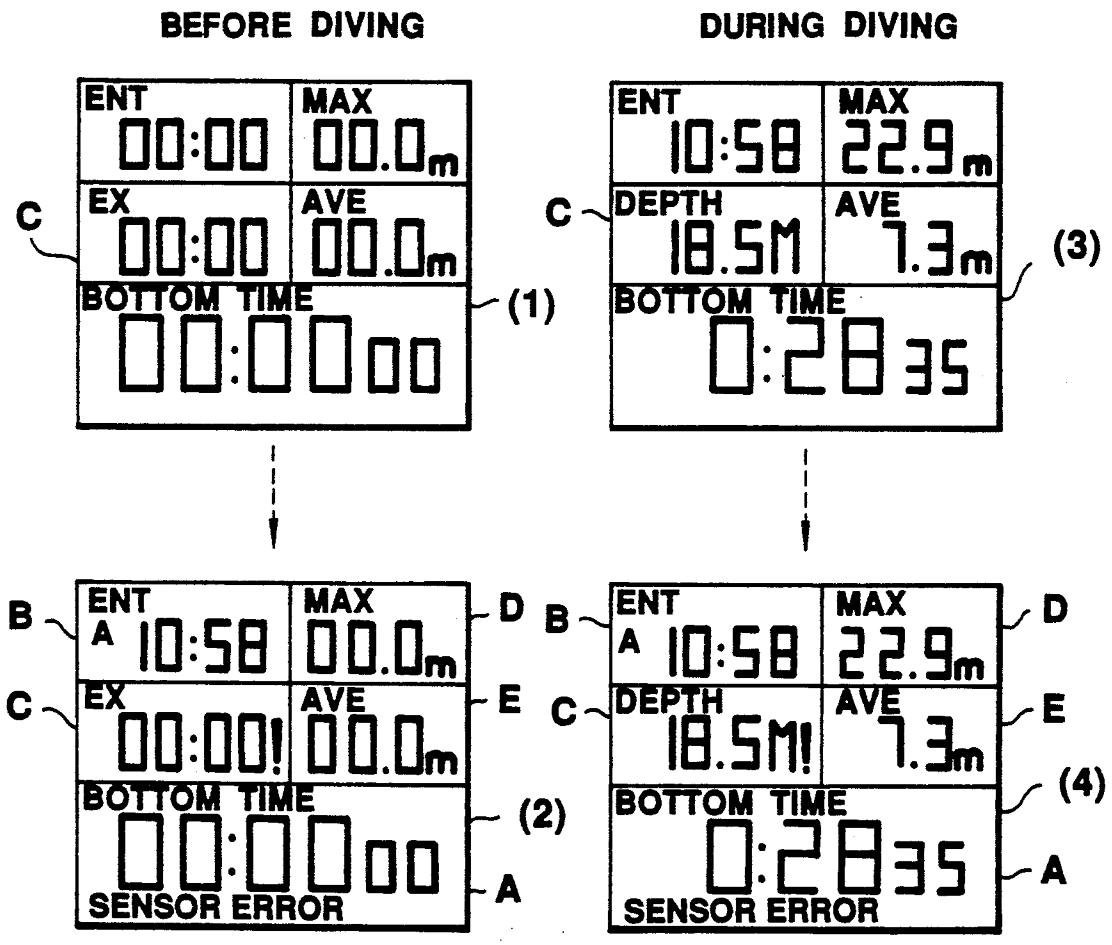
FIG. 24 is a view showing display states when the pressure sensor of the pressure instrument of FIG. 11 is defective.

The registers Fy, Fz are set to a value "1" in Step S62-3 or S62-9 and the process advances to Step S62-4 or S62-10, where it is judged that the diver has not yet started diving. In Step S62-5 or S62-11, the present time data with the digits of second removed, i.e., the present time data consisting of time and minute, is stored in the register ENT as a detection time. In the display process, after the time when the defective operation of the pressure sensor 34 has been detected or the abnormal power-voltage drop has been detected is displayed in Step S112 through S117, the registers Fy, Fz detect defective pressure sensor or abnormal voltage drop and the attention mark is displayed on the segment display section C in Step S119. In case that the pressure sensor 34 is defective, characters "SENSOR ERROR" are displayed on the display section A in Steps S120, S121 while in case that the power voltage drops abnormally, characters "BAT" are displayed on the display section A in Steps S122, S123. Accordingly, when the pressure sensor 34 is defective and the defective pressure sensor is detected at 58 minutes past 10 o'clock, the liquid crystal display panel 39*a* displays as shown in FIG. 24(2). As a consequence, the diver can easily learn that the pressure sensor 34 is defective and he can stop using the pressure instrument at once.

(b) Operation after the diver has started diving

When the diver starts diving, after setting the present embodiment to the water-depth measurement mode and confirming that the embodiment works normally, the pressure instrument according to the present embodiment works as follows: The process advances to the measurement process of Step S5 every time CPU 21 receives the measurement timing signal t. In Step S5, pressure is measured and the result of the measurement is stored in the register Pm and then water-depth calculation process is executed, where water-depth is calculated from pressure data stored in the register Pm and the reference pressure data stored in the register Po and the result of the calculation is stored in the register H (Steps S60, S61). After it has been judged in Step S62 that the pressure sensor 34 works normally and the power voltage is normal, the process advances through Step S63 to Step S64, where it is judged that the diver has not yet dived as deep as 1m.

The process advances through Steps S90, S94 and S98 to Step S112, where the display process is executed, displaying water-depth data on the segment display section C. For example, when the diver has dived as deep as 0.3 m, data are displayed on the liquid crystal display panel 39*a* as shown in FIG. 22(2).

When the diver has dived as deep as 1m (in the present embodiment, water depth of 1m and more is referred to as an effective water depth), i.e., when a point a1 is reached in the profile of dive 1 shown in FIG. 19, the process will be executed as follows: When CPU 21 receives the measurement timing signal t in Step S4 after execution of a series of processes, the process advances to Step S60, where pressure is measured and then to Step S61, where the water-depth calculation process is executed, obtaining water depth of 1m and the result of the calculation is stored in the register H. The process further advances through Steps S62, S63 to Step S64, where it is judged if water depth is 1m and more. In Step S65, it is judged if the register Fs has not been set to a value "1", then the process advances to Steps S66, S67, where the present time data T consisting of digits of time and minute (digits of second are removed) delivered from the time counting circuit 24 is stored in the register ENT as dive-start time data or data representing the time when the diver starts diving and the register Fs is set to a value "1". It is judged in Step S68 that the register Ft has been set to a value "0". Then the register Ft is set to a value "1" in Step S69 and RS flip-flop circuit 28 is set and 3-minute timer circuit 30 is cleared in Step S70.

Note that when RS flip-flop circuit 28 is set, then AND gate 29 is made open, allowing the 3-minute timer circuit 30 and the diving-time timer circuit 32 to start counting (refer to points b1, c1 in FIG. 19).

After above mentioned operation, the process advances to Step S71, where it is judged that the register Fr is left being set to a value "1". Then, the register Fr is set to a value "0" in Step S72, RS flip-flop circuit 40 is reset in Step S73, and the process goes to Step S74, where a value "1" is added to the register At. In this case, since the water-depth measurement is made for the first time after the diver has dived as deep as 1m and more, the register AT is set to a value "1".

In addition, last water-depth data stored in the register H is added to the register AH in Step S75 and an average water depth is calculated by dividing water-depth data stored in the register AH by data representing number of measurements stored in the register AT and the result of the calculation is stored in the register AV in Step S76. When it is judged in Step S77 that water-depth data stored in the register H is larger than the water-depth data (now, 0 m is stored) stored in the register MAX, the water-depth data stored in the register H is also stored in the register MAX in Step S78. Then the process goes to Step S79, where the dividing-time timer circuit 32 judges if diving time has reached 6 hours. In this case, since it is just after the diver has started diving and diving time does not reach 6 hours, the process goes to the display process. In the display process, water depth "1m" is displayed on the display section C, diving time "0" is displayed on the display section A, dive-start time is displayed on the display section B, maximum water depth is displayed on the display section D and an average water depth is displayed on the display section E and further it is confirmed that the pressure sensor 34 works normally in Steps S113, S114 through S118. Thereafter water depth is measured every time CPU 21 receives the measurement-timing signal t and if water depth becomes 1m and more, number of measurements stored in the register AT is added by "1" and accumulated water-depth data and the maximum water-depth data are renewed in Steps S60 through S64, S68, S71, and S74 through S79. Further, water depth and diving time are displayed in Steps S113, S114 through S118. For example, when it took 14 seconds measured by the diving-time timer circuit 32 for the diver to dive as deep as 8.2 m, and when the diver starts diving at 58 minutes past 10 o'clock, the diving time, "14 seconds" and the dive-start time, "58 minute past 10 o'clock" are displayed on the display device 39 as shown in FIG. 22(3).

When the diving time has reached 3 minutes, 3-minute timer circuit 30 counts 3 minutes and supplies a carry signal and the latch circuit 31 holds the signal until the operation mode is switched from the watch mode to the water-depth measurement mode and keeps supplying CPU 21 with output signal indicating an effective dive.

The above mentioned operation is performed when the diver set the pressure instrument to the water-depth measurement mode before he enters the water. Operation will be described hereafter, which will be performed when the diver switches the operation mode from the watch mode to the water-depth measurement mode while he is in the water.

At first, it is judged, depending whether the measured pressure is higher than the water-pressure, 1.24 $Kg/cm^2$, measured at water depth of 2 m, whether or not the diver switched the operation mode when he dived as deep as 2 m and more, and when it is judged that he dived as deep as 2 m and more, then the standard air pressure, 1.033 $kg/cm^2$, is stored in the register Po as the reference pressure data and when it is judged that he did not dive as deep as 2 m, the measured pressure data is stored in the register Po as the reference pressure data (Steps S31 through S34). Thereafter, similar operation is performed and the water-depth calculation is executed in Step S61 with these reference pressure data stored in the register Po.

Meanwhile, if something should go wrong with the pressure sensor 34, or if the power voltage drops abnormally while measured dive data are successively stored in appropriate registers, defective operation of the pressure sensor or abnormal voltage drop in the power battery is detected in the defective sensor/voltage drop process of Step S62-1 or S62-7 and RS flip-flop circuit 26 is reset, thereby ceasing the measurement process thereafter in Step S62-2 or S62-8. Further, the registers Fy, Fz are set to a value "1" in Step S62-3 or S62-9 and it is judged in Step S62-4 or S62-10 if the register Fs has been set to a value "0", or if the diver is diving. When it is judged that the register Fs is not set to "0" and the diver is diving, RS flip-flop circuit 28 is set and the diving-time timer circuit 32 is caused to continue counting dive time, in Step S62-6 or S62-12.

In the display process, a series of dive data are displayed in Steps S112 through S117 and then the process advances through Step S118 to Step S119, where the attention mark is displayed. In Steps S120 through S123, characters "SENSOR ERROR" or "BAT" are displayed. When the liquid crystal display panel 39*a* displays as shown in FIG. 24(3) just before the pressure sensor 34 is damaged, it displays as shown in FIG. 24(4) after the sensor 34 is damaged.

As described above, since the measurement process is not executed after defective operation of the pressure sensor 34 or abnormal voltage drop in the power battery is detected, RS flip-flop circuit 28 is not reset when the diver finishes diving (RS flip-flop circuit 28 is reset in Step S96, when the diver comes up as deep as 1m). Accordingly, even though the diver repeates diving and coming up in the water, the diving-time timer circuit 32 and 3-minute timer circuit 30 shall continue counting of time lapse after the defective operation of the pressure sensor 34 has been detected, unless the operation mode is switched.

(c) Operation with the pressure sensor 34 working normally, performed at the time when the diver come in the water Operation will be described hereafter which is performed at the time when the diver finished diving. It is judged in Step S64 that the diver has come up in the water as deep as 1m (as shown at a2 of the diving 1 in FIG. 19) and then the process goes to Step S90, it is judged that the register Fr has been set to a value "0". In Step S91 the register Fr is set to a value "1" and in Steps S92 and S93 a rest-time timer circuit 42 and the latch circuit 43 are cleared and RS flip-flop circuit 40 is set, thereby allowing the rest-time timer circuit 42 to start counting of rest time data. Since it is judged in the following Step S94 that the register Ft has been set to a value "1", the register Ft is set to a value "0" in Step S95 and RS flip-flop circuit 28 is reset, thereby allowing the 3-minute timer circuit 30 and the diving-time timer circuit 32 to cease counting operation (refer to c2 in FIG. 19). In Steps S96 and S97, the present time data T with digits of second raised to a unit is stored in the register EX as dive-finish time data i.e., data representing the time when the diver finishes diving. In the display process, dive data obtained during the present diving is displayed on the liquid crystal display panel 39*a* in Steps S112 through S117.

When the mode switch SM is operated to switch the water-depth measurement mode into the watch mode, the operation of the switch SM is detected in Step S10. Since it is judged in Steps S11, S12 that both the registers N, M have been set to a value "0", the register M is set to a value "0" in Step S13. Then the operation mode is switched from the water-depth measurement mode to the wath mode. In Step S14, RS flip-flop circuits 26, 28 are reset, thereby preventing the measurement-timing signal t from being transfered to CPU 21 and the register P is set to a value "1", thereby designating the memory M1 in Step S15. In Step S16 it is judged if the diver has dived for 3 minutes and more and further it is judged if the latch circuit 31 has been set to a value "1". When it is judged that the latch circuit 31 has been set to a value "1", the process advances through Steps S17, S18 to Step S19, where dive data stored in the memory M5 is deleted and dive data stored in the memories M1 through M4 are shifted and stored in the memories M2 through M5, respectively and as a result the memory M1 is ready for storing other data. Then diving time data with digits of second raised to a unit measured by the diving-time timer circuit 32 is stored in the register $M_{1ST}$ of the memory M1 in Step S20, the dive-start time data stored in the register ENT is set to the register $M_{1ENT}$ in Step S21, dive-finish time data stored in the register EX is set to the register $M_{1EX}$ in Step S22, maximum water-depth data stored in the register MAX is set to the register $M_{1MAX}$ and average water-depth data stored in the register AV is set to the register $M_{1AV}$ in Steps S23 to S25. The process further advances through Step S26 to the display process, where the time count mode is displayed (Step S126, S127).

The operation has been described above which is performed when the diver has finished diving within a normal diving time. When th diver has not come up within 6 hours, CPU 21 judges in Step S79 that there has been an accident and RS flip-flop circuits 26, 28 are reset in Step S80, thereby causing the 3-minute timer circuit 30 and the diving-time timer cirucit 32 to cease counting time lapse and also preventing the measurement-timing signal t from being transferred to CPU 21 and further the water-depth measurement mode is instantly switched to the watch mode, wherein the pressure sensor 34 stops operation to save power consumption. Note that, in such a case, when the latch circuit 31 has been set to a value "1" and the diving time is 3 minutes and more, dive data obtained during the present diving are stored in respective registers of the memory M1 in Steps S82 through S88.

When the diver has dived for 3 minutes an more as shown by the dive profile of FIG. 20 and has finished dive work but he does not switch the water-depth measurement mode to the watch mode, that is, when dive data obtained during the present effective diving are not stored in the memory M1, operation will be performed as follows. As described above, the rest-time timer circuit 42 starts counting time-lapse after the diver has finished diving. Counting 60 minutes, the timer ciruit 42 supplies a carry signal to the latch circuit 43, thereby setting a value "1" to said latch circuit 43. It is judged in Step S98 that the latch circuit 43 has been set to a value "1" and RS flip-flop circuits 26, 40 are reset, thereby causing the 3-minute timer cirucit 30, dive-time timer circuit 32, and rest-time timer circuit 42 to stop counting time in Step S99. Then the water-depth measurement mode, which consumes much electric power, is forced into the watch mode in Step S81 and dive data obtained during the present diving are set to respective registers of the memory M1 in Steps S82 through S88.

When the diver has not dived for 3 minutes and more or when the diver has repeated divings of not more than 3 minutes for several times but he does not switch the water-depth measurement mode into the watch mode, operation almost similar to that descrdibed above will be performed. In such a case, since the latch circuit 31 has not been set to a value "1", dive data are not stored in the memory M1 in Step S82.

The above mentioned operation is performed, when the water-depth is less than −1m (for example, at −1.8 m) which is calculated while the diver is coming up in the water. When th reference pressure data set in the register Po is not poper, water depth becomes −1m and less, which is detected in Step S63. Then the register Fx is set to a value "1" in Step S100 and an error display is performed for 3 seconds to indicate that the present dive data are not correct in Steps S101, S102. Then the process advances to Step S103, where initialization is executed. The initialization process is limilar to the process of Steps S31 through S34 in FIG. 15. When pressure measured at the spot is higher than the pressure measured at more than 2 m deep, the standard air pressure 1.033 $Kg/cm^2$ is set in the register Po as the reference pressure data. When the pressure measured at the spot is lower than the pressure measured at more than 2 m deep, the pressure measured at the spot is set in the register Po as the reference pressure data.

Figure 23:
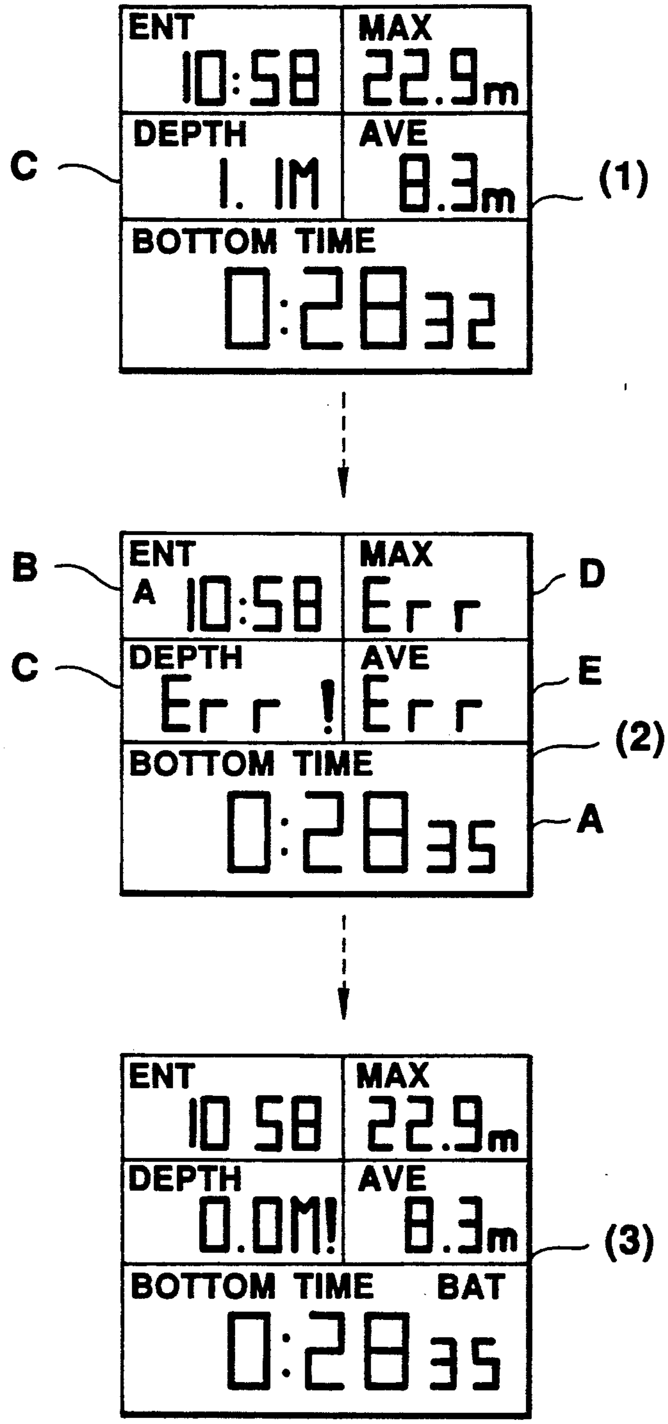
FIG. 23 is a view showing display states when a battery voltage of the pressure instrument of FIG. 11 is decreased.

Then the process goes to the display process, where dive data as well as the attention mark are displayed on the liquid crystal display panel 19*a* in Steps S112 through S119. For example, when the diver dived as deep as 22.9 m and came up as deep as 1.1m and data were shown on the liquid crystal display panel 39*a* as shown in FIG. 23(1), and after 3 seconds the diver came up as deep as −1m, then an arror display is displayed only for 3 seconds as shown in FIG. 23(2), and the display changes, indicating that water depth is 0 m and in addition the attention mark is displayed as shown in FIG. 23(3). Note that when the reference pressure data has been automatically selected and thereafter the operation mode is changed to the watch mode after diver's diving, or when the diver has repeated diving and coming up and thereafter the operation mode is changed to the watch mode after diver's diving, dive data similar to those described above are stored in the memory M1 and the register $M_{1E}$ is set to a value "1" in Step S27.

(d) Operation performed at the time when the pressure sensor 34 gets defective and thereafter the diver comes up As described above, after abnormal operation of the pressure sensor 34 has been detected, the measurement process is not executed and only time lapse data is counted by the diving-time timer circuit 32 and 3-minute timer circuit 30. Hence the reference pressure data is not automatically selected. When the operation mode has been switched to the watch mode and the latch circuit 31 has been set to a value "1", the present data with digits of second raised to a unit, i.e., time-minute data is set to the register EX in Step S18, since after a series of processes it is judged in Step S17 that the register Fy or Fz has been set to a value "1". Then data stored in the memory are shifted in Step S19. Diving time data obtained by the diving-time timer circuit 32 is set to the register $M_{1ST}$ in Step S20, detection time data such as indicating the time at which the pressure sensor 34 gets defective, set in the register ENT is set to the register $M_{1ENT}$ in Step S31. The present time data set in the register EX in Step S18 is set to the register $M_{1EX}$, and it is judged that the register Fy or Fz has been set to a value "1" and then the register $M_{1E}$ is set to a value "1" in Steps S36, S27. Then the display state changes to that in the watch mode.

In case that the pressure sensor 34 gets defective while the diver is taking a rest on the land after finishing diving but the operation mode has not yet been switched to the watch mode, RS flip-flop circuit 26 is reset and RS flip-flop circuit 28 is set in the above described sensor-defect/voltage drop process and thereby the measurement process is not effected but the diving-time timer circuit 32 and 3-minute timer circuit 30 continue counting. When the operation mode has been switched to the watch mode while the latch circuit 31 has been set to value "1", the operpation is performed which is similar to that performed when the pressure sensor 34 got defective, and the attention mark is displayed in Steps S10 through S17, S114 through S123.

(e) Operation performed when the diver has repeated diving of not more than 3 minutes Operation will be described which is performed when the diver has repeated not typical divings such as a skin-diving of not more than 3 minutes for several times as shown at the dive profil of diving II in FIG. 19 (hereafter, not-typical diving of not more than 3 minutes is referred to as a skin diving).

In such a case, similar to described above, the watch mode is switched to the water-depth measurement mode by operation of the mode switch SM, the initialization process is executed to clear the registers after a series of processes in Steps S10 through S12, S30 through S33, S35 and S36. Then the diver will starts diving. After the diver has started diving, water-depth measurement is made every time when CPU 21 receives the measurement timing signal t and measured water depth data are set to the register H and are displayed on the liquid crystal display panel 39*a* in Step S112. When water depth becomes 1m and more (as shown at a3 of a of the dive profile of diving II in FIG. 19), this is detected in Step S64 and dive-start time data is memorized and the register Fs is set to a value "1".

Since the register Ft has been set to a value "0", the register Ft is set to a value "1", the 3-minute timer circuit 30 is cleared, RS flip-flop circuit 28 is set and thereby the 3-minute timer circuit 30 and diving-time timer circuit 32 start counting of time-lapse data in Steps S66 through S70. In Step S71, it is judged that the register Fr has been set to a value "1", and then the register Fr is set to a value "0", RS flip-flop circuit 40 is reset, the register AT is added by "1" and thereby it is memorized that the first measurement has been made, the measured dive data are set to the register AH, an average water-depth data is calculated by dividing the value of the register AH by the value of the register AT and the result of the calculation is set to the register AV in Steps S71 through S76.

If the wate depth data set in the register H is larger than the maximum water depth data set in the register MAX, which is 0 m at this time, the water depth data set to the register H is also set to the register MAX in Steps S77, S78. The process further advances through Step S79 to the display process, where dive data are displayed on the liquid crystal display panel 39*a* in Steps S113, S114 through S115 and when the pressure sensor 34 is working normally, which is confirmed in Step S118, the process returns to Step S1.

Thereafter, the following operation is repeated every time CPU 21 receives the measurement-timing signal t. Measurement of pressure and water depth is made and the results of the measurement are set to the registers in Steps S60, S61, the process advances through S62, S63, S64, S65, S68 and S71 to Step S74, where it is set to the register AT how many times the measurement has been made and accumulated water-depth data of the register AH is renewed by adding measured water depth data in Step S75. Then an average water depth data is calculated by diving the accumulated water-depth data set in the register AH by data of the register AT and the result of the calculation is stored in the register AV in Step S76. If the water depth data measured this time is larger than the maximum water depth data of the register MAX, then the water depth data measured this time is set to the register MAX in Steps, S77, S78. Then the process advances through Step S79 to the display process. In the display process, dive data measured this time are displayed on the liquid crystal display panel 39*a* in Steps S113, S114 through S117.

When the diver comes up in the water as deep as less than 1m before 3 minutes lapse or before the 3-minute timer circuit 30 generates a carry signal, the following operation is performed. It is judged in Step S64 that the diver has come up in the water as deep as less than 1m and further it is confirmed that the register Fr has been set to a value "0", then the register Fr is set to a value "1" in Steps S90, S91. The rest-time timer circuit 42 and latch circuit 43 are cleared and then RS flip-flop circuit 40 is set in Steps S92, S93, thereby allowing the rest-time timer circuit 42 to start counting of rest time data. In Step S94, it is judged that the register Ft has been set to a value "1" and the register Ft is set to a value "0" in Step S95. Further, RS flip-flop circuit 28 is reset, causing the 3-minute timer circuit 30 and diving-time timer circuit 32 to stop counting of time-lapse data and thereby dive-finish time data is set to the register EX in Steps S96, S97. Then, dive data of the diving of less than 3 minutes are displayed on the liquid crystal display panel 39*a* in Steps S112 through S117.

Thereafter, while the diver is taking a rest on the land or while he is staying at a position as deep as not more than 1m, the 3-minute timer circuit 30, and diving-time timer circuit 32 stop counting of time lapse but they memorize diving time of not more than 3 minutes and the latch circuit 31 stores a value "0" and the rest-time timer circuit 42 continues measuring of time lapse after the diver has come up in the water.

When the operation mode is not switched to the watch mode and the diver starts diving again, operation is performed which is almost similar to that performed during the first diving. But the diver has reached as deep as 1m and more (as shown at a1 of a of the diving profile for diving II in FIG. 19), the following operation will be performed at receipt of the measurement-timing signal t. Pressure and water depth are measured and are set to the registers in Steps S60, S61. It is judged in Step S64 that the diver has dived as deep as 1m and more and it is also judged in Step S65 that the register SFs has been set to a value "1" and further it is judged that the register Ft has been set to a value "0". Then the register Ft is set to a value "0" (Steps S68, S69). The 3-minute timer circuit 30 is cleared and RS flip-flop circuit 28 is set, thereby causing the 3-minute timer circuit 30 and diving-time timer circuit 32 to start counting of time lapse again in Step S70. More specifically, the 3-minute timer circuit 30 clears time lapse (diving time) of not more than 3 minutes measured during the first skin diving and starts counting from "0" again while the diving-time timer circuit 32 does not clear diving time of the first skin diving but accumulates diving time by adding later diving time to the first diving time.

Thereafter, in a similar manner to that in the first skin diving, the register Fr is set to a value "0" and RS flip-flop circuit 40 is reset, thereby causing the rest-time timer circuit 42 to stop counting of rest time data in Steps S71 through S73. Respective registers storing dive data of the first skin diving are renewed with dive data measured this time in Steps S74 through S78 and the renewed dive data are displayed on the liquid crystal display panel 39*a* in Steps S113, S114 through S117. After finishing measurement at the first measurement-timing for the second skin diving, pressure and water depth are measured every measurement timing and are set to the registers Pm and H, respectively and further respective dive data are renewed with the above measured pressure and water depth.

When the diver has finished a skin diving within 3 minutes, the 3-minute timer circuit 30 does not count 3 minutes and the latch circuit 31 is not set to a value "1".

Thereafter, operation similar to the above mentioned will be repeated, even though how many times the diver repeats skin diving of not more than 3 minutes as shown at the diving profile of diving II in FIG. 19. More specifically, the 3-minute timer circuit 30 counts diving time of not more than 3 minutes every time starting from "0" while the diving-time timer circuit 32 accumulates diving time of not more than 3 minutes. Since the 3-minute timer circuit 30 does not count 3 minutes, the latch circuit 31 is by no means set to a value "1". Accordingly, when the diver has repeated skin diving of not more than 3 minutes for several times and then h operates the mode switch SM to switch the water-depth measurement mode to the watch mode, the process goes to Step S10. In Step S10, the operation of the mode switch SM is detected and the process goes to Steps S11 through S15. In Step S15 dive data are not set to respective registers of the memory M1, since it is judged in Step S16 that the latch circuit has not been set to a value "1" and the process advances to the display process. More specifically, even though the diver has repeated skin diving such as diving II shown in FIG. 19 for several times, dive data of which skin diving are not required to be recorded, the dive data which must be recorded, i.e., which are stored in the memory M5, may be prevented from being erased.

When the diver has repeated skin diving for several times and diving of not less than 3 minutes such as shown at diving III in FIG. 19, the 3-minute timer circuit 31 counts 3 minutes during diving of not less than 3 minutes and the latch circuit 32 is set to a value "1". Accordingly, when the operation mode is switched from the water-depth measurement mode to the watch mode, dive data, i.e., dive data of several times of skin divings an dive data of diving of not less than 3 minutes are stored in respective registers of the memory M1 in Steps S10 through S17, S19 through S22.

(f) Operation for confirming dive data stored in memories M1 through M5

When dive data which have been stored in respective memories M1 through M5 as described above are confirmed, a switch SN is operated to switch the watch mode to the read mode as shown in FIG. 21. The operation of the switch SN is detected in Step S40 and it is confirmed in Steps S41, S42 that the operation mode has been switched to the watch mode. Then the register N is set to a value "1", thereby setting the read mode in Step S43. In the display mode, it is confirmed in Steps S110, S125 that the operation mode is set to the read mode. The dive data of the latest diving, which are stored in the memory M1 designated by the register P (refer to Step S15 of FIG. 15) are displayed on the liquid crystal display panel 39*a*. More specifically dive-finish time data stored in the register $M_{1EX}$ is displayed on the display section C in Step S130 and diving time data stored in the register $M_{1st}$ and the value of the register P, i.e., a memory number of the memory M1 "1" are displayed on the display section A in Step S131. The dive-start time data stored in the register $M_{1ENT}$ is displayed on the display section B in Step S132, the maximum water-depth data stored in the register $M_{1MAX}$ is displayed on the display section D in Step S133, and the average water-depth data stored in the register $M_{1AV}$ is displayed on the display section E in Step S134. Note that, when dive data stored in the memory M1 are not correct due to defective operation of the pressure sensor 34 or abnormal voltage drop in the power battery, the detection-time when the defective operation of the pressure sensor 34 is detected is displayed on the display on the display section B and the time lapse data from the above detection-time to the time when the operation mode is switched to the watch mode and the memory number "1" are displayed on the display section A. On the display section D, E is displayed nothing.

In Step S135, it is judged if the register $M_{1E}$ has been set to a value "1", which indicates that dive data stored in the register M1 are not correct due to defective pressure sensor, abnormal voltage drop in the power battery or improper reference pressure data. When the register $M_{1E}$ has been set to a value "1", the attention mark is displayed on the display section C in Step S136.

For example, when the pressure sensor 34 works normally and he dive-start time is 5 minutes past 3 o'clock, the maximum water-depth is 18.7 m, the diver-finish time is 11 minutes past 3 o'clock, the average water-depth is 8.8 m and diving time is 10 minutes, then the liquid crystal display panel 39*a* displays as shown in FIG. 21(3) or 25(1).

Figure 25:
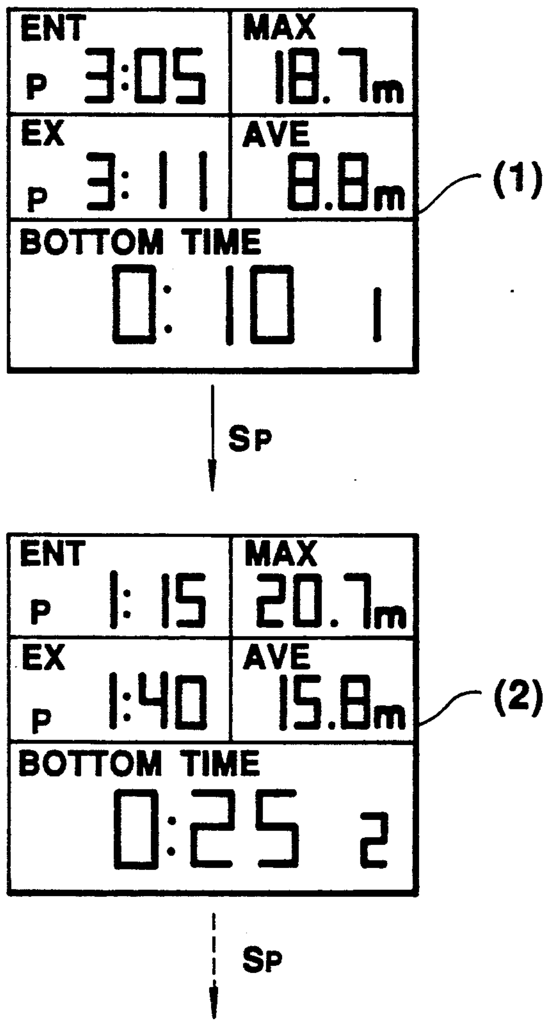
FIG. 25 is a view showing display states in a reading mode of the pressure instrument of FIG. 11.

To confirm dive data stored in memories M2, M3, M4 and M5 by displaying them on the liquid crystal display panel 39*a*, switch Sp is operated as shown in FIG. 25. In such a case, in Step S50 it is judged every operation of the switch Sp that the register N has been set to a value "1", and the register P successively takes a value from "1" through "5" in Steps S51 through S54. In the display process, dive data stored in the memory successively designated by the register P are displayed on the liquid crystal display panel 39*a* in Steps S130 through S136. For example, when the register P takes a value "2", thereby designating the memory M2, dive data stored in the memory M2 as well as number the memory, "2", are displayed on the liquid crystal display panel 39*a* as shown in FIG. 25(2).

The second embodiment has been described in which the pressure instrument according to the present invention is applied to a water-depth meter, but it will be apparent to those skilled in the art that the pressure instrument may be applied to an altimeter, which may be constructed such that altitude data is calculated from pressure data detected by the pressure sensor and an externally-operated switch is provided to be operated to start and/or finish measurement and time when the externally-operated switch is operated is stored in memory in place of the dive-start time data and/or dive-finish time data.

(2-3) Features of the second embodiment

In the second embodiment, measured data are stored in the memory, only when time duration between the time when measurement is started and the time when the measurement is finished is longer than a predetermined time duration, and data obtained during the above predetermined time duration are not stored in the memory and therefore measured data which are not required to be memorized are not stored in the memory, so that important measured data previously stored in the memory are prevented from being erased.

(3) Third Embodiment (3-1) Construction of the third embodiment

FIGS. 26 through 34 are views showing the third embodiment of the pressure instrument according to the present invention. The third embodiment is capable of precisely counting rest time after the diver's diving.

Figure 26:
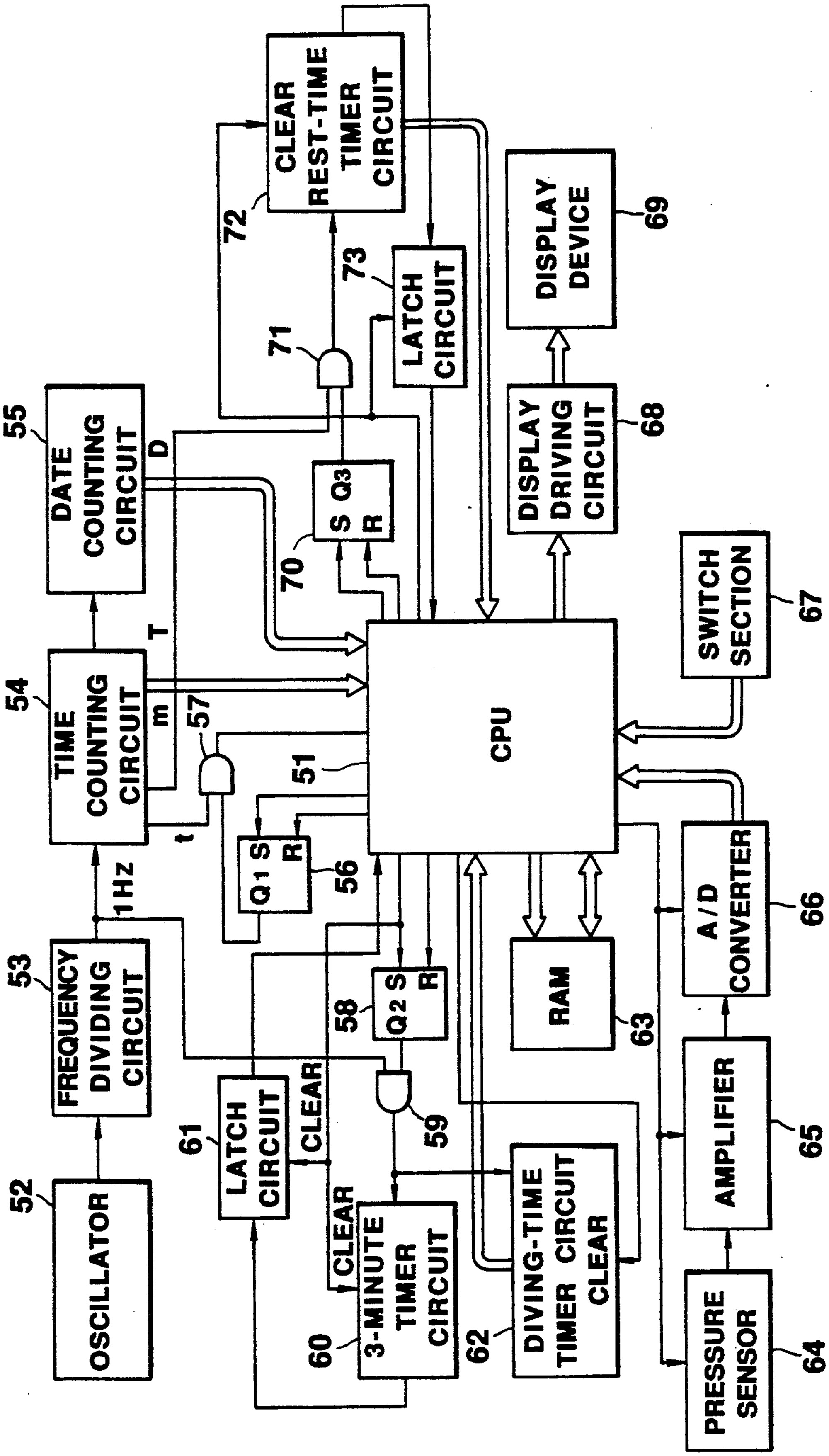
FIG. 26 is a block diagram showing a third embodiment of a pressure instrument according to the present invention.

FIG. 26 is a block diagram of the third embodiment. Various peripheral circuits are connected to CPU 51. CPU 51 receives signals and/or data from these circuits and supplies these circuits with control signals and/or data which are generated on the basis of the received signals and/or data.

An oscillator 52 serves to supply a signal of a certain frequency at all time. A frequency dividing circuit 53 serves to divide the signal of a certain frequency delivered from the oscillator 52 into a signal of 1 Hz and to supply the signal of 1 Hz to a time counting circuit 54 and AND gate 59. The time counting circuit 54 counts the signal of 1 Hz delivered from the frequency dividing circuit 53 to obtain present time data T and supplies the same to CPU 51. The time counting circuit 54 serves to supply a day-carry signal to a date counting circuit 55 when 12 o'clock, the midnight is reached and to supply a measurement-timing signal t to AND gate 57 and further to supply a signal of 1 minutes m to AND gate 71. The date counting circuit 55 serves to count the day carry signal from the time counting circuit 54 to obtain date data D and to supply date data D to CPU 51.

RS flip-flop circuit 56 is brought to a set state and/or reset state at receipt of a set signal and/or reset signal delivered from CPU 51 and supplies an output signal Q1 when in the set state. AND gate 57 is made open by the output signal Q1 of RS flip-flop circuit 56, allowing the measurement-timing signal t delivered from the time counting circuit 54 to be transferred to CPU 51. RS flip-flop circuit 58 is brought to a set state and/or reset state at receipt of a set signal and/or reset signal from CPU 51 and supplies an output signal Q2 when in the set state. AND gate 59 is made open by the output signal Q2 of RS flip-flop circuit 58, allowing the signal of 1 Hz from the frequency dividing circuit 53 to be transferred to a 3-minute timer circuit 60 and diving-time timer circuit 62. The 3-minute timer circuit 60 serves to count the 1-Hz signal delivered through AND gate 59 to measure 3 minutes and to supply a carry signal to a latch circuit 61 when it receives a signal from CPU 51 and further serves to clear measured time at receipt of a signal from CPU 51. The latch circuit 61 serves to memorize the carry signal from the 3-minute timer circuit 60 and to supply the output signal to CPU 51 and further to clear the memorized signal at receipt of the signal form CPU 51.

The diving-time timer circuit 62 counts the 1-Hz signal delivered through AND gate 59 and supplies counted time to CPU 51 and is further cleared at receipt of the signal from CPU 51. RAM 63 is a memory circuit, having a construction described later, which stores data delivered from CPU 51 and supplies stored data to CPU 51.

A pressure sensor 64 is a semi-conductor sensor which generates an analog electric signal representing pressure at surroundings at receipt of the control signal from CPU 51. An amplifier 65 serves to amplify the analog electric signal from the pressure sensor 64 at receipt of the control signal from CPU 51. A/D converter 66 serves to convert the analog electric signal amplified by the amplifier 65 into a digital electric signal at receipt of the control signal from CPU 51 and to supply the digital signal to CPU 51.

Switch section 67 is a circuit which comprises a mode switch SM and other switches and supplies an appropriate switch-input signal, when any one of the switches is operated.

A display driving circuit 68 serves to receive data from CPU 51 and to drive a display device 69 to display the data in a digital fashion. The display device comprises a liquid crysal display panel as will be described later and displays water depth, the present time and the like.

RS flip-flop circuit 70 is set and/or reset at receipt of a set signal and/or reset signal delivered from CPU 51 and serves to supply an output signal Q3 when it is set. AND gate 71 is made open by the output signal Q3 of RS flip-flop circuit 70, thereby allowing the 1-minute signal m from the time counting circuit 54 to be transferred to the rest-time timer circuit 72. The rest-time timer circuit 72 serves to count the 1-minute signal m to supply the same to CPU 51 and to supply a carry signal to the latch circuit 73 when it counts 12 hours and further to clear the counted time at receipt of the signal from CPU 51. The latch circuit 73 seves to memorize the carry signal from the rest-time timer circuit 72 and to supply the memorized signal to CPU 51 and further serves to clear the memorized signal at receipt of the signal from CPU 51.

Figure 27:
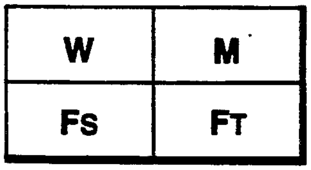
FIG. 27 is a view showing a detailed construction of RAM of FIG. 26.

FIG. 27 is a view showing a construction of RAM 63. Water-depth register W is a register to which water depth data is set. Mode register M serves to designate operation mode. More specifically, the mode register designates watch mode when a value "0" is set and designates water-depth measurement mode when a value "1" is set. A rest-time counting flag Fs is raised while the rest-time timer circuit 72 is counting rest time between divings and a diving-time counting flag Ft is raised while the diving-time timer circuit 62 is counting diving time.

Figure 28:
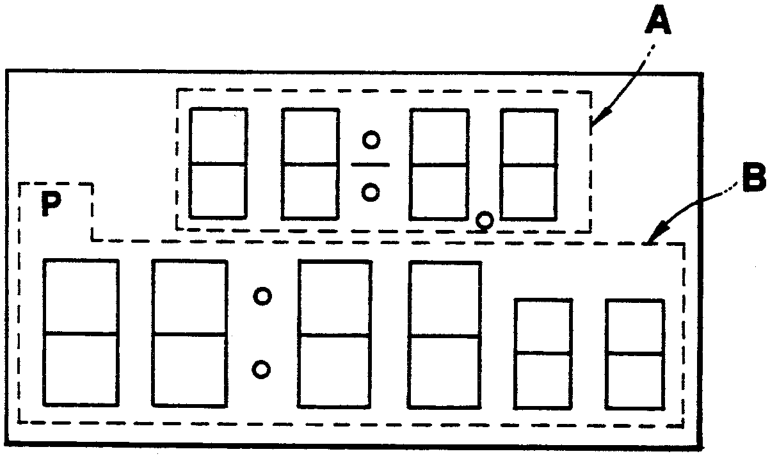
FIG. 28 is a view showing a detailed construction of a display section of FIG. 26.

FIG. 28 is a view showing an arrangement of display elements of the liquid crystal display panel of the display device 69. A display section A for displaying date and rest time is provided with 7-segment display elements. A display section B for displaying time or diving time is provided with 7-segment display elements for 6 digits.

(3-2) Operation of the third embodiment

Operation of the third embodiment constructed as mentioned above will be described hereafter.

Figure 29:
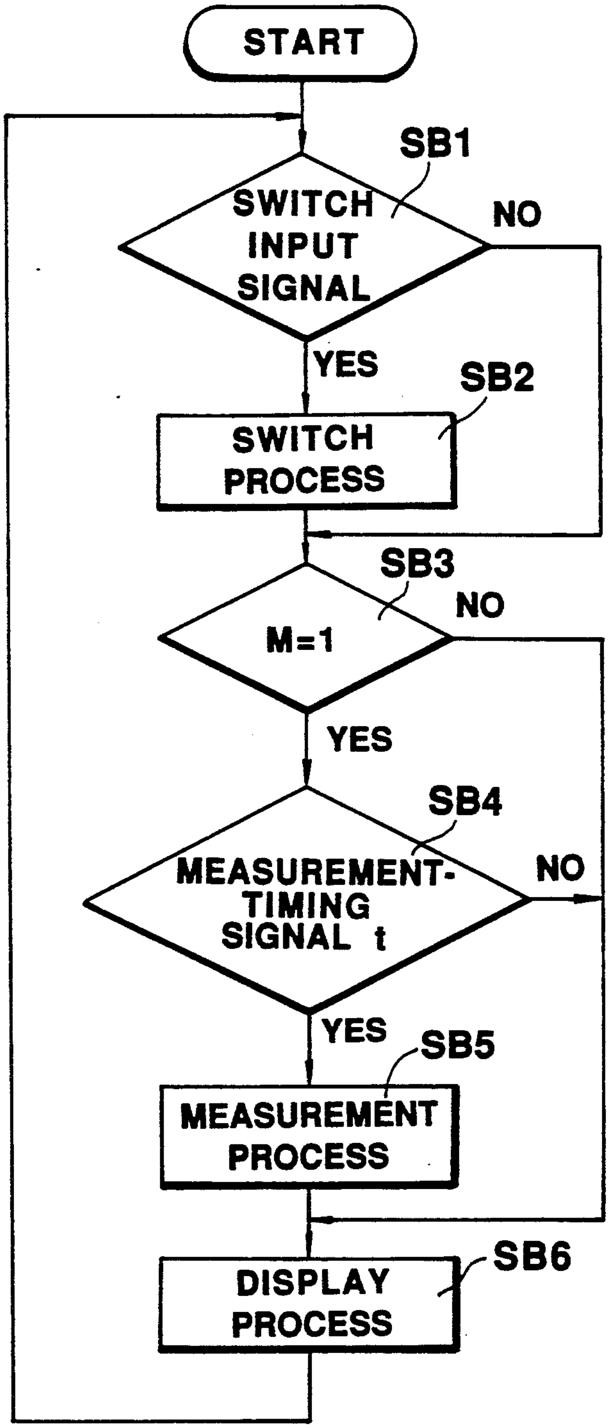
FIG. 29 is a brief flow chart showing an overall operation of the pressure instrument of FIG. 26.

FIG. 29 is a general flow chart showing brief operation of the embodiment. It is judged in Step SB1 if any one of the switches has been operated. When a switch has been operated, an appropriate process is executed in Step SB2 and it is further judged if the operation has been set to the water-depth measurement mode. When the water-depth measurement mode has been set, it is judged in Step SB4 if measurement-timing signal t has been supplied to CPU 51. When the mesurement-timing signal t has been supplied to CPU 51, the measurement process is executed in Step SB5 to measure water depth and then in Step SB6 the display process is executed to display water depth and the present time on the display device 69. Then the process returns to Step SB1 again.

Figure 30:
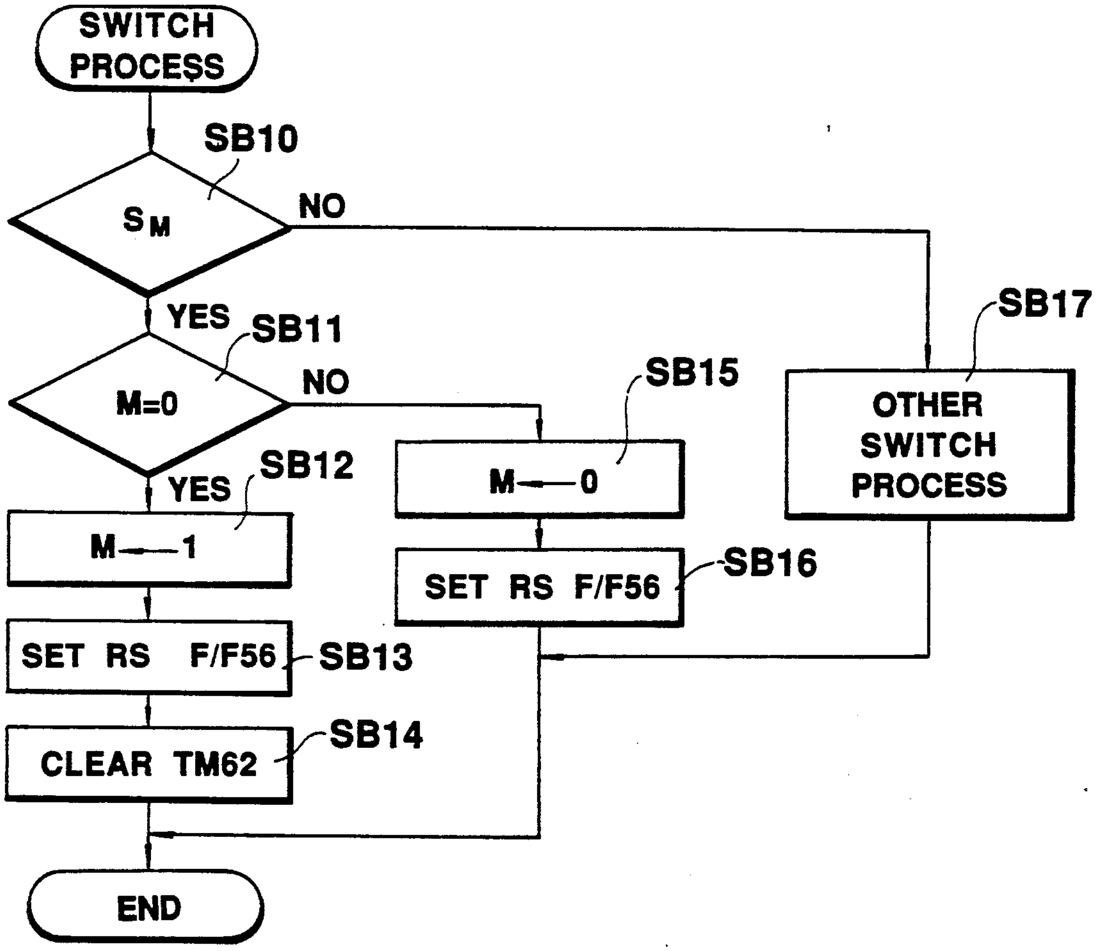
FIG. 30 is a flow chart showing a switching process of FIG. 29.
Figure 31:
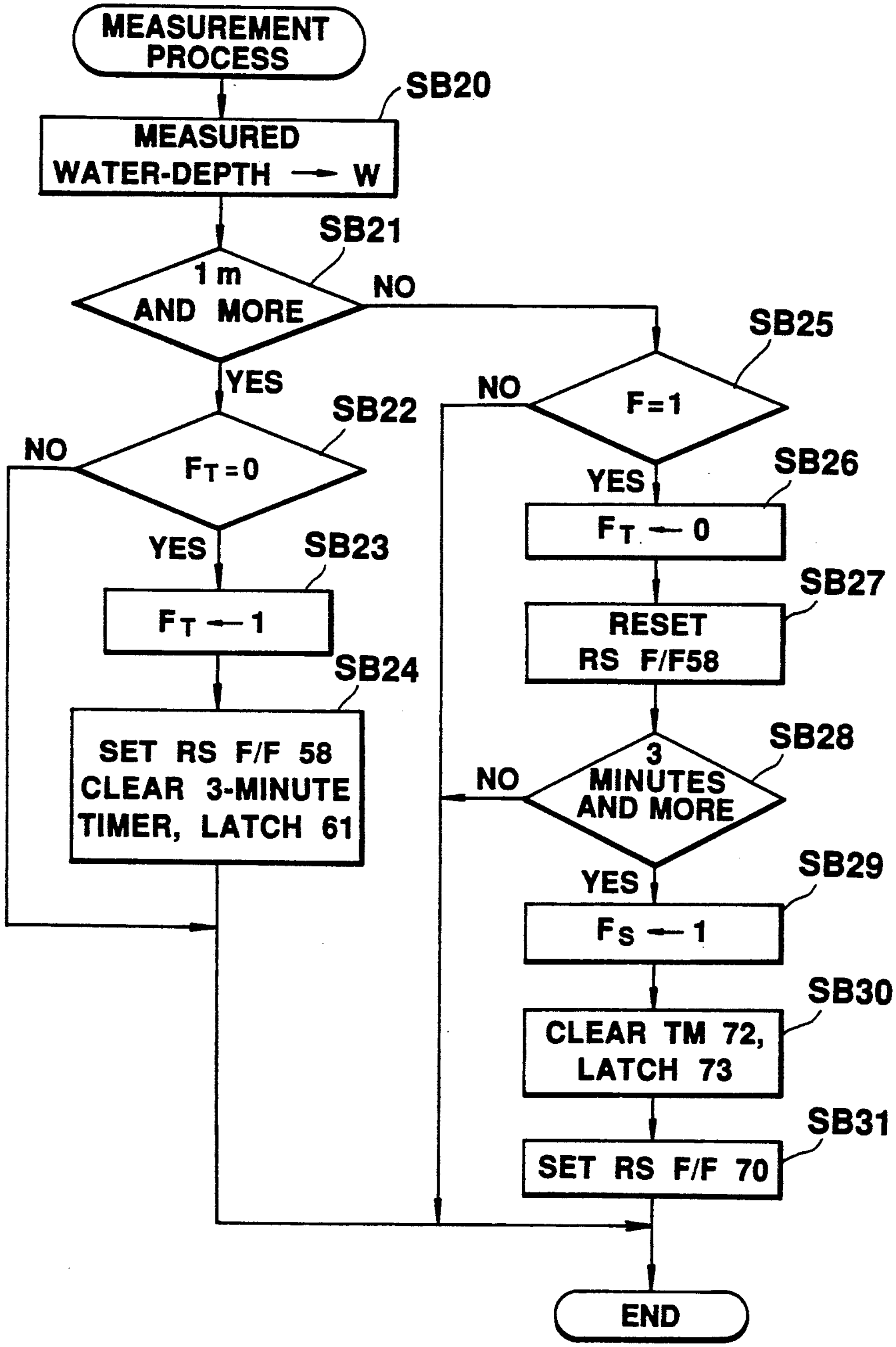
FIG. 31 is a flow chart showing a measurement process of FIG. 29.
Figure 32:
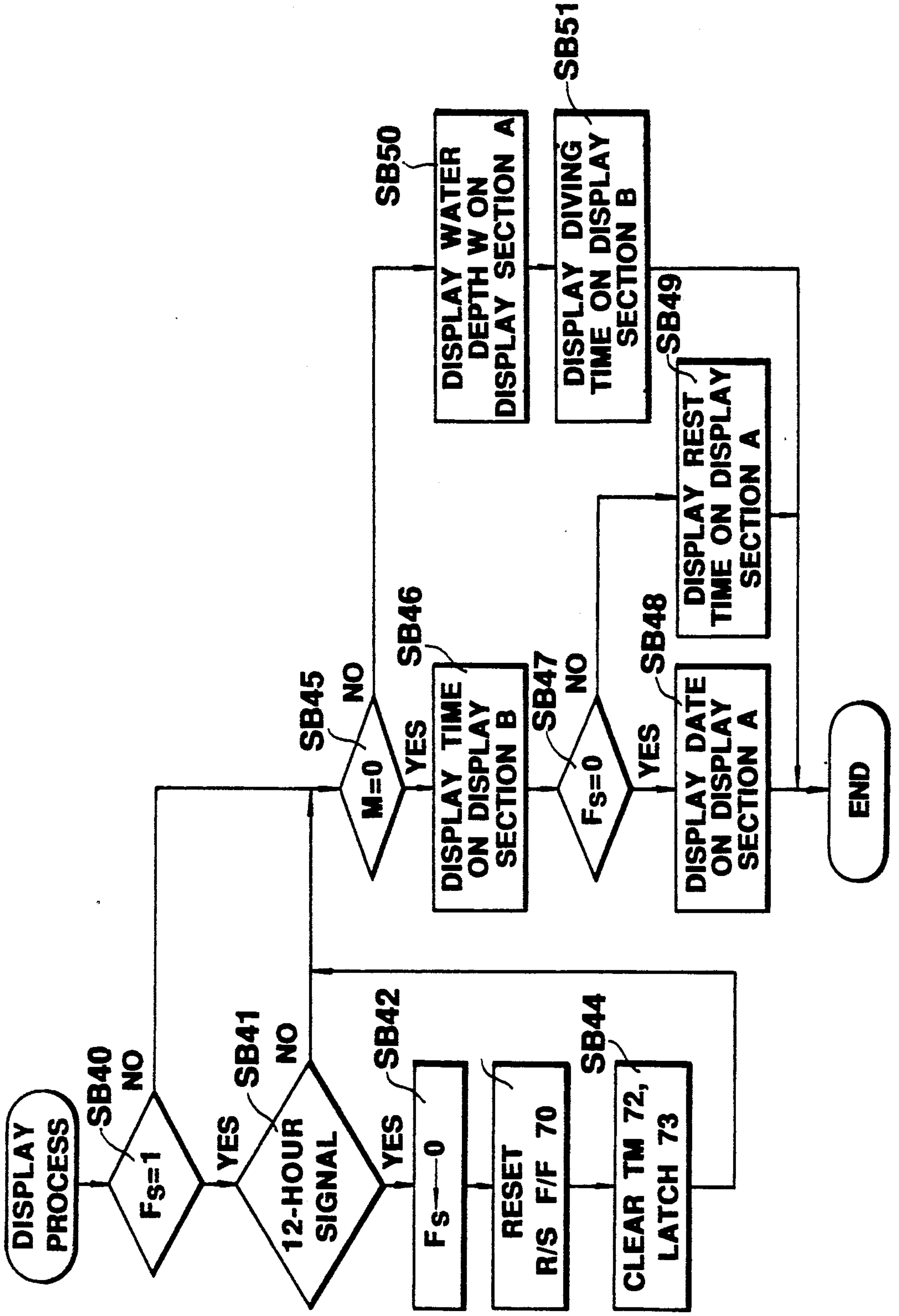
FIG. 32 is a flow chart showing a display process of FIG. 29.
Figure 33:
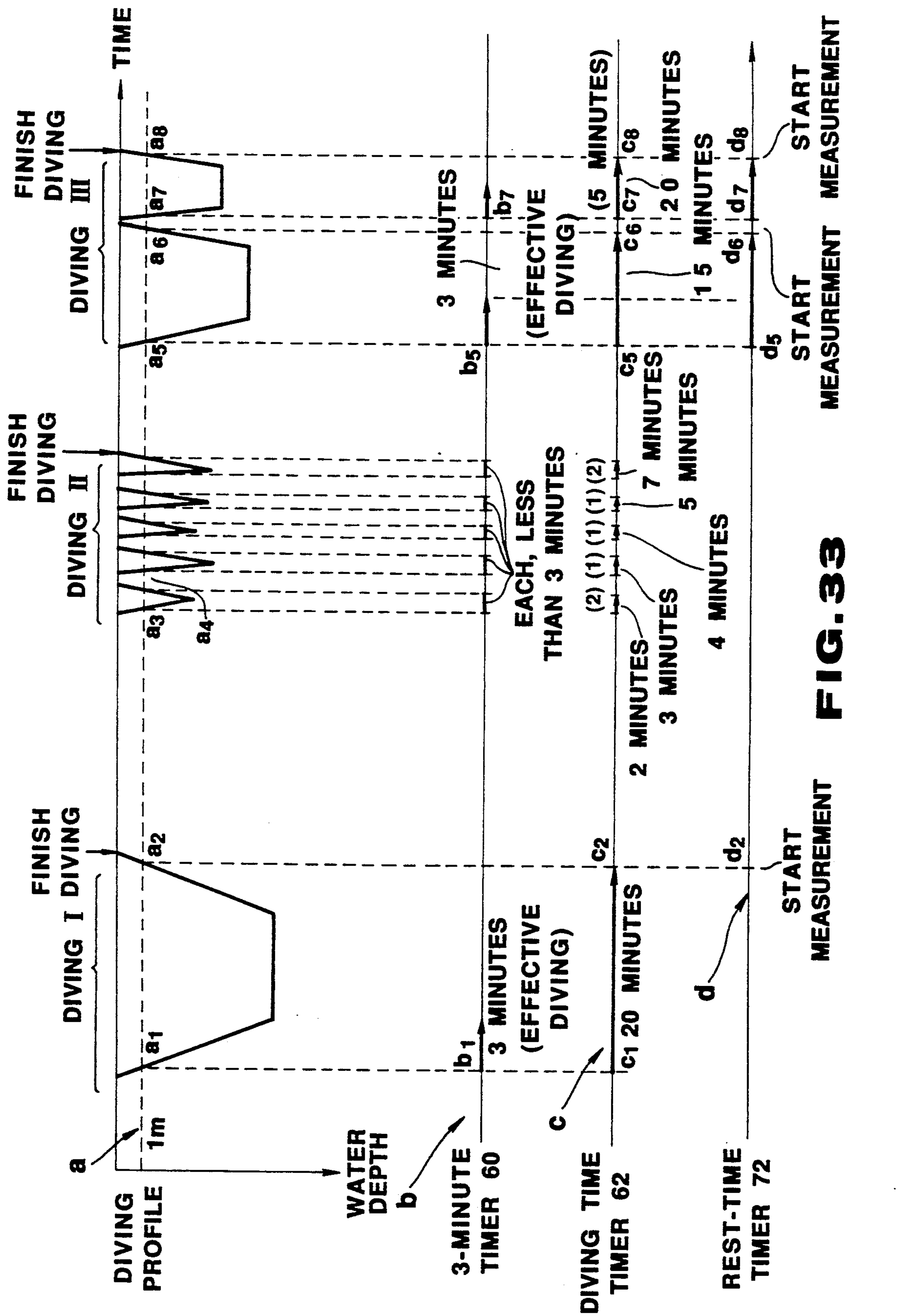
FIG. 33 is a dive profile for explaining an effective dive.
Figure 34:
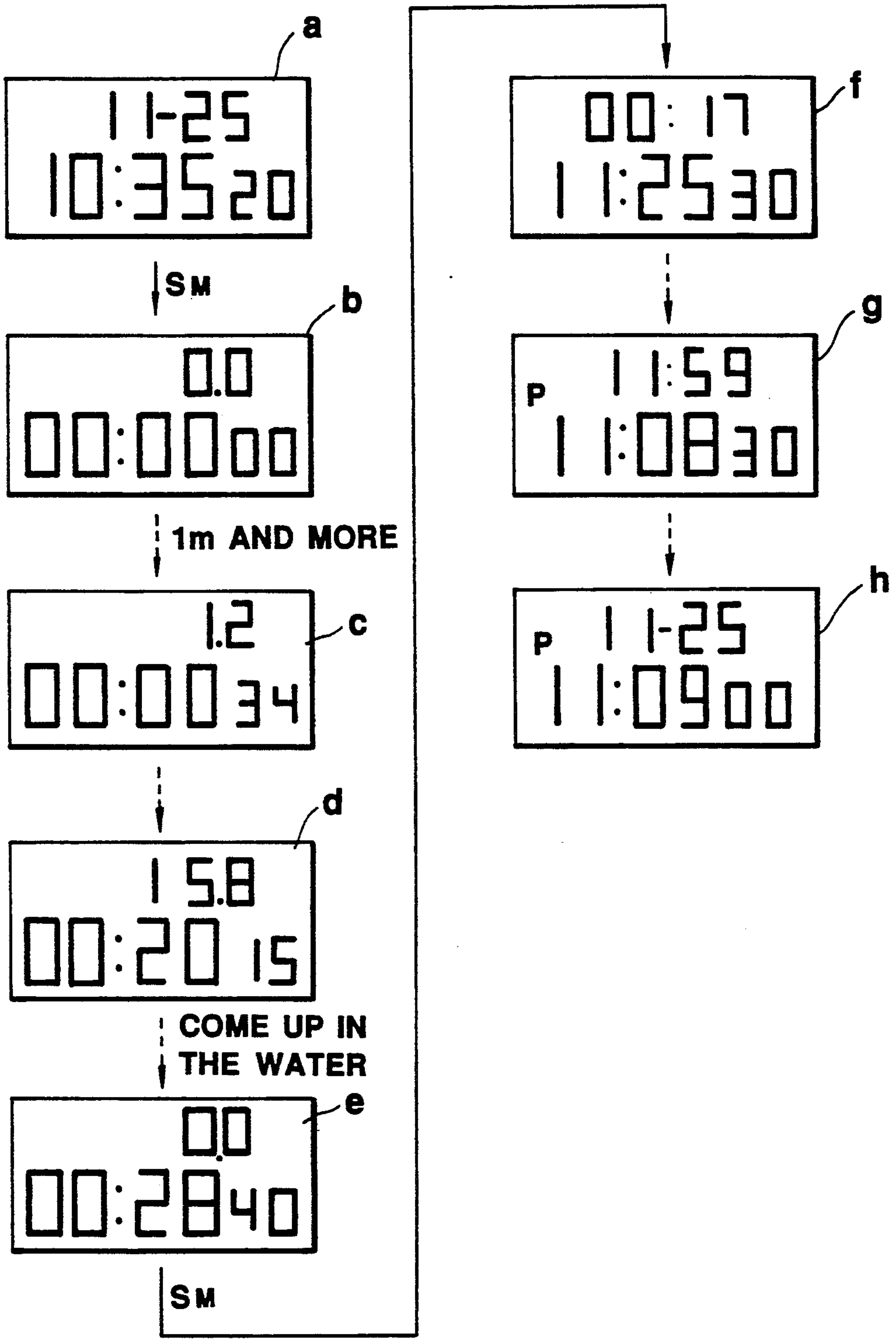
FIG. 34 is a view showing display states of the pressure instrument of FIG. 26.

FIG. 30 is a flow chart showing a detailed switch process in Step SB2 of the general flow chart. FIG. 31 is a flow chart showing a detailed measurement process in Step SB5 of the general flow chart. FIG. 32 is a flow chart showing a detailed display process in Step SB6 of the general flow chart. FIG. 33 is a view showing an example of diving profile and showing measurement operation of each timer circuit during the diving. FIG. 34 is a view showing an example of transition of the display states on the display device 69. Referring to these Figures, operation of the third embodiment will be described hereafter which is performed when the diver dives in accordance with the diving profile of FIG. 33.

(a) Operation for switching the operation mode from watch mode to water-depth measurement mode In the watch mode, the display process in Step SB6 of the general flow chart, i.e., the processes in accordance with the flow chart of FIG. 32, will be repeated unless CPU 51 receives a switch input signal. More specifically, the process advances through Steps SB40, SB45 to Step SB46, where CPU 51 receives the present time data D from the time counting circuit 54 and displays the same on the display section B. The process goes through Step SB47 to Step SB48, where CPU 51 reads date data D from the date counting-circuit 55 and displays the same on the display section A. The above mentioned processes will be repeated in the watch mode, unless CPU 51 receives the switch input signal. For example, when date and time is 35 minutes and 20 seconds past 10 o'clock, November 25, data as shown at a in FIG. 34 are displayed on the display device 69.

To use the pressure instrument as a water depth meter, the mode switch SM is operated to switch the operation mode into the water-depth measurement mode as shown in FIG. 34. In this case, the process goes through Step SB1 to the switch process of Step SB2 in the general flow chart, i.e., the process goes to processes in the flow chart of FIG. 30. Operation of the mode switch is detected in Step SB10, and it is confirmed in Step SB11 that the operation mode is still in the watch mode. Then a value "1" is set to the mode register M, thereby switching the operation mode into the water-depth measurement mode in Step SB12 and RS flip-flop circuit 56 is brought to the set state in Step SB13, allowing the measurement-timing signal t to be transferred through AND gate 57 to CPU 51. Then the initialization process is executed in Step SB14 to clear the diving-time timer circuit 62. Thereafter, the process goes to Step SB3 of the general flow chart and when CPU 51 has received the measurement-timing signal t, the process further goes to Steps SB4 and SB4, i.e., the measurement process of FIG. 31. In the measurement process, CPU 51 supplies signal to the pressure sensor 64, causing the same to make pressure-measurement operation. The water-depth measurement process is executed in Step SB20 for obtaining water depth data from the measured pressure data and storing the obtained water depth data in the water-depth register W. If the diver does not start diving yet, water depth data is "0" and the value "0" is set to the water-depth register W.

Therefore, it is judged in Step SB21 that water depth data is still not more than 1m and the process advances to Step SB25, where it is judged that the diving-time counting flag Ft has been set to a value "0" and diving time has not been counted. Then the process advances to the display process of Step SB6, i.e., the process shown in the flow chart of FIG. 32. The process further advances through Steps SB40, SB45 to Step SB50, SB51, where water depth data "0" of the water-depth register W is displayed on the display section A and diving time data ("0", as the diver has not started diving) of the diving-time timer circuit 62 is displayed on the display section B. As a consequence, the display device 69 displays data as shown at b in FIG. 34.

(b) Operation after the diver has started diving

When the diver has started wearing the present embodiment of the pressure instrument, which embodiment has been set to the water-depth measurement mode, the process advances to Step SB4 every time when CPU 51 has received the measurement-timing signal t and then the process further advances to the measurement process of Step SB5, where water-depth measurement is executed and the result of the measurement is stored in the water-depth register W in Step SB20 and is displayed on the display section B in Step SB50.

When the diver has dived as deep as 1m (in the present embodiment, water depth of 1m and more is referred to as "effective diving") as shown at al of a in FIG. 33, operation of the present embodiment will be performed as follows. More specifically, when it is judged in Step SB4 that CPU 51 has received the measurement-timing signal t, water-depth measurement process is executed. When water-depth of 1m is obtained, then the same is set in the water-depth register W in Step SB20. Accordingly, in Step SB21 it is judged that the diver has dived as deep as 1m and more and the process advances to Step SB22, where it is confirmed that the counting of diving time has not yet been started. In Step SB23, a value "1" is set to the diving-time counting flag Ft and initialization process is executed in Step SB24, wherein Rs flip-flop circuit 58 is set and 3-minute timer circuit 60 and latch circuit 61 are cleared.

When RS flip-flop circuit 58 is set, thereby causing the AND gate to be open, the 3-minute timer circuit 60 and diving-time timer circuit 62 start counting (refer to b1 and c1 in FIG. 33). In the display process, water depth of "1m" and diving time of "0" are displayed on the display sections A and B in Steps SB50 and SB51, respectively. Thereafter, water depth is measured every time when CPU 51 received the measurement-timing signal t, and it is confirmed that water depth is 1m and more and further it is confirmed that counting of diving time has been started and then measured water depth and diving time are displayed in Steps SB4, SB20 through SB22, SB40, SB45, SB50 and SB51. For example, when the diving time is 34 seconds which is measured by the diving-time timer circuit 62 at the time when the diver has dived as deep as 1.2 m, the display device 69 displays data as shown at c in FIG. 34.

When the diving time has reached 3 minutes, the 3-minute timer 60 counts 3 minutes and supplies a carry signal, and the latch circuit 61 memorizes the carry signal and keeps supplying CPU 51 with an output signal indicating the effective diving.

Thereafter, when the diver has dived in accordance with the diving profile of diving I of a shown in FIG. 33 and the diving time has reached 20 minutes and 15 seconds at the time when the diver has dived as deep as 1.5 m, the display device 69 displays data shown at d in FIG. 34.

(c) Operation after the diver has finished diving

When the diver finished diving and has come up in water as deep as 1m as shown at a2 of a in FIG. 33, it is judged in Step SB21 of the measurement process that the diver has come up as deep as 1m and the process goes to Step SB25, where it is judged that the diving-time counting flag Ft has been set to a value "1". Then the process advances to Step SB26, where the diving-time counting flag Ft is set to a value "0" and in Step SB27, RS flip-flop circuit 58 is reset, causing the 3-minute timer counting circuit and diving-time timer counting circuit to stop counting operation (refer to c2 in FIG. 33). The process further goes to Step SB28, where it is judged if the output of the latch circuit 61 is of "1", i.e., if the time under water is 3 minutes and more. When it is judged that the time under water was 3 minutes and more, the rest-time counting flag Fs is set to a value "1" in Step SB29 and then the initialization process is executed in Step SB30, wherein the rest-time timer circuit 72 and latch circuit 73 dare cleared. Then RS flip-flop circuit 70 is set, allowing the 1-minute signal m to be transferred to the rest-time timer circuit 72. The rest-time timer 72 starts counting rest time in Step SB31, as shown at d2 in FIG. 33.

When the diver has finished diving as described above, every time when CPU 51 receives the measurement-timing signal t the process advances through SB20, SB21, SB25, SB40, SB41 and SB45 to Steps SB50, SB51, where water depth and the latest diving time are displayed on the display device 69. For example, when the latest diving time is 28 minutes and 40 seconds, the display device 69 displays data as shown at e in FIG. 34.

When the mode switch SM has been operated in the water-depth measurement mode, the operation of the mode switch SM is detected in Step SB10 and the operation mode is switched to the watch mode in Steps SB11, SB15.

RS flip-flop circuit 56 is reset, preventing the measurement-timing signal t to be transferred to CPU 51 in Step SB16 and the process advances through Step SB3 to Step SB40, where it is judged that the rest-time counting flag Fs has been set to a value "1". Then the process advances through Step SB41 to Step SB45, where it is confirmed that the register M1 has been set to a value "0" and the operation mode has been already switched to the watch mode. In Step SB46, the present time data T is displayed on the display section B. In Step SB47, it is judged that the rest-time counting flag Fs has been set to a value "1" and rest-time data obtained by the rest-time timer circuit 72 is displayed on the display section A in Step SB49. For example, when the present time is 25 minutes and 30 seconds past 11 o'clock and rest time is 17 minutes, then the display device 69 displays data as shown at f in FIG. 34.

(d) Operation while the diver is taking a rest

Operation will be described when the diver has switched the watch mode to the water-depth measurement mode again after he switched the operation mode to the watch mode at the time when he finished diving and he has repeated skin divings of less than 3 minutes for several times as shown in the diving profile of dive II of FIG. 33.

In such a case, operation of the mode switch SM in the water-depth measurement mode sets "1" to the mode register M and thereby RS flip-flop circuit 56 is set, allowing the measurement-timing signal t to be supplied to CPU 51. Then the diving time data in the diving-time timer circuit 62 is cleared (Steps SB10 through SB14 in FIG. 30). In other words, when the operation mode is switched to the water-depth measurement mode, the previous diving time is cleared and is not accumulated.

When the diver by skin diving has gone under water as deep as 1 m and more as shown at a3 in FIG. 33, the diving-time counting flag Ft is set to a value "1" and RS flip-flop circuit 58 is set, causing the latch circuit 61 and 3-minute timer circuit 60 to be cleared. Then, 1-Hz signal is transferred through AND gate 59 to the diving-time timer cirucit 62 and 3-minute timer circuit 60, causing these circuits to count diving time and 3 minutes, respectively (Steps SB21 through SB24 in FIG. 31). When the diver has finished skin diving and has come up in water as deep as less than 1 m as shown at a4 in FIG. 33, the diving-time counting flag Ft is set to a value "0" and RS flip-flop circuit 58 is reset, causing the diving-time timer circuit 62 and 3-minute timer circuit 60 to stop counting in Steps SB25 through SB27. The process advances to Step SB28, where it is judged if output to the latch circuit 61 is "1" and if continuous diving time is 3 minutes and more but since the output of the latch circuit 61 is 0" and continuous diving time is less than 3 minute, the measurement process is finished (Steps SB25 through SB28).

Thereafter, when the diver repeated skin divings as described above, every time when the diver has gone underwater as deep as 1 m and more the diving-time counting flag Ft is set to a value "1" and RS flip-flop circuit 58 is set, causing the latch circuit 61 and 3-minute timer circuit 60 to be cleared in Steps SB22 through SB24. More specifically, unless diving time for skin diving is not more than 3 minutes, since 3-minute timer 60 and latch circuit 61 are cleared and start counting every time the diver has reached as deep as 1 m and more, the 3-minute timer cirucit 60 does not count 3 minutes (not "effective diving"). Accordingly, when the diver has come up in water as deep as 1 m and less after skin diving, the process does not advance through Steps SB28 through SB30 to Step SB31 of FIG. 31 and the rest-time counting circuit 27 is not cleared to start counting from "0" again. The rest-time timer circuit 72 continues measuring rest-time data (from d2 of FIG. 33) after diving of diving I of FIG. 33, even through the diver repeats skin divings while he is taking a rest in water. The diving-time timer circuit 62 stops operation every time when the diver comes up in water but its measured data is not cleared so that data measured by the diving-time timer circuit 62 is accumulated (refer to c in FIG. 33). More specifically, the diving-time timer circuit 62 is cleared only when the operation mode is once switched to the watch mode and is switched back to the water-depth measurement mode again so that diving-time data is accumulated every time the diver goes under water in case other than the above case.

(e) Operation when the diver dives again

Operation will be described which is performed when the diver goes under water again in accordance with the diving III as shown in FIG. 33 after he finished diving of diving II shown in FIG. 33 and the operation mode was switched from the watch mode to the water-depth measurement mode in order to clear accumulated diving time (7 minutes in the above diving II).

In such a case, operation will be performed in a similar way as in the start of the diving I in Steps SB6 of FIG. 29 and in Steps SB20 through SB24 of FIG. 31. More specifically, when the diver has gone under water as deep as 1 m and more, the diving-time counting flag Ft is set to a value "1" and the 3-minute timer circuit 60 and latch circuit 61 are cleared and further RS flip-flop circuit 58 is set, causing the 3-minute timer circuit 60 and diving-time timer circuit 62 to start counting operation (refer to b5, c5 of FIG. 33). Note that the rest-time timer is still counting time lapse after finishing of diving.

When 3 minutes have lapsed after the diver reached as deep as 1 md and more, the 3-minute time circuit 60 supplies a carry signal to the latch circuit 61 as in the case of the diving I and the latch circuit 61 memories the carry signal and keeps supplying CPU 51 with output data notifying that the carry signal was received.

When the diver has come up in water as deep as 1 m after the diving III as shown at a6 in FIG. 33, the diving-time counting flag Ft is set to a value "0" and RS flip-flop circuit 58 is set, causing the 3-minute timer circuit 60 and diving-time timer circuit 62 to stop counting operation. In such a case, "effective diving" is detected and the rest-time counting flar to Fs is set to a value "1" and further the rest-time timer circuit 72 and latch circuit 73 are cleared. Then the rest-time timer circuit 72 starts counting of rest time (in Steps SB21, SB25 through SB31 in FIG. 31. Refer to d6 in FIG. 33). But at this time, since it is not necessary to measure the rest time, there may be no problems (when the diver came up in water, rest-time data from d2 to d5 in FIG. 33 was necessary).

When the diver has come up in water and has dived as deep as 1 m again as shown at a7 in FIG. 33, the diving-time counting timer Flag Ft is set to a value "1" and the 3-minutes timer circuit 60 and latch circuit 61 are cleared and further the RS flip-flop circuit 58 is set, causing the diving-time timer circuit 72 to start counting operation again in Steps SB21 to SB24 of FIG. 31. More specifically, the 3-minute timer circuit 60 starts 3-minute counting from the beginning and the diving-time timer circuit 62 accumulates diving time for the second half of the diving III during the first half of the diving III (refer to b7, c7 in FIG. 33).

When it is confirmed that 3 minutes have passed from time b7 of FIG. 33, an "effective diving" is detected, which is memorised in the latch circuit 61.

When the diver has come up as deep as 1 m after the diving III as shown at a8 in FIG. 33, the diving-time counting flag Ft is set to a value "0" and RS flip-flop circuit 58 is reset, causing the diving-time timer circuit 62 to stop counting of diving time. When it is confirmed that an "effective diving" has been detected, the rest-time counting flag Fs is set to a value "1", causing the rest-time time circuit 72 to start counting of rest time from "0" again (in Steps SB2 through SB31, refer to c8, d8 in FIG. 33). After the diver has finished diving, operation will be performed which is similar to that after the diving I.

When the diver goes under water for several times after and/or before skin diving, operation similar to the above described will be performed repeatedly.

(f) Operation when 12 hours have passed after the final diving

When the operation mode has been switched to the watch mode after the diving III in FIG. 33, as described in the operation after the diving of I, reset time after the final diving is displayed on the display section A of the display device 69 and the present time is also displayed in steps SB40, SB41, SB45 through SB47 and SB49. For example, when rest time of the rest-time timer circuit 72 is 11 hours and 59 minutes and the present time is 8 minutes and 30 seconds past 11 o'clock, then display device 69 displays data as shown at g in FIG. 34.

When the rest-time timer circuit 72 has counted 12 hours as rest time, the rest-time timer circuit 72 supplies a carry signal to the latch circuit 73, which memories the same signal and keeps supplying CPU 51 with output signal indicating that the carry signal has been received. In the display process after the above described operation, it is confirmed in Step SB40 of FIG. 32 that the rest-time counting flag Fs has been set to a value "1" and the rest-time timer circuit 72 is still counting rest time and further it is confirmed in Step SB41 that rest time of the rest-time timer circuit 72 is 12 hours and more and the process advances to Step SB42, where the rest-time counting flag Fs is set to a value "0". The RS flip-flop circuit 70 is rest and the rest-time timer circuit 72 stops counting operation in Step SB43 and further the rest-time timer circuit 72 and latch circuit 73 are cleared in Step SB44. Thereafter, it is confirmed in Step SB45 that the operation mode has been set to the watch mode and the present time is displayed on the display section B in Step SB46. In Step SB47, it is confirmed that the rest-time counting flag Fs has been set to a value "0" and the display section A indicates date of the day. Then data displayed on the display device 69 are for example as shown at h in FIG. 34.

(3-3) Features of the third embodiment

As have been described above, the third embodiment relates to an electronic water-depth meter, which is provided with means for judging every time when the diver goes under water if he stays under water for more than a predetermined time and is also provided with rest-time counting means for counting how long he is taking a rest in water after he stayed continuously under water for more than the predetermined time. Hence an electronic water-depth meter is available which is capable of automatically measuring precise rest-time between divings.

What is claimed is:

1. A pressure instrument comprising:

pressure detecting means for detecting external pressure outside of the pressure instrument;

measured data generating means for generating measured data corresponding to the external pressure detected by said pressure detecting means;

start/stop signal generating means for generating a measurement start signal and a measurement stop signal;

measurement-time counting means for obtaining measurement-time data representative of a time period between the time when the measurement start signal is generated by said start/stop signal generating means and the time when the measurement stop signal is generated by said start/stop signal generating means;

time detecting means for detecting whether or not the measurement-time data obtained by said measurement-time counting means is longer than a predetermined time period;

memory means for storing the measured data which are generated by said measured data generating means during the time period between the time when the start signal is generated and the time when the stop signal is generated with such storing of the measured data occurring only when said start/stop signal generating means has generated the measurement stop signal and said time detecting means has detected that the measurement-time data is longer than said predetermined time period; and measured data display means for displaying the measured data stored in said memory means.

2. A pressure instrument according to claim 1, wherein said memory means comprises a plurality of memory areas for storing said measured data.

3. A pressure instrument according to claim 2, further comprising:

memory control means for deleting oldest data stored in said memory means and for storing newly obtained measured data therein, when all of the plurality of memory areas of said memory means are full of stored measured data.

4. A pressure instrument according to claim 1, wherein said measured data generating means comprises:

water-depth data calculating means for calculating water-depth data from pressure detected by said pressure detecting means; and water-depth data comparing means for comparing water-depth data calculated by said water-depth data calculating means to detect and output the maximum water-depth data.

5. A pressure instrument according to claim 1, wherein said measured data generating means comprises:

water-depth data calculating means for calculating water-depth data from pressure detected by said pressure detecting means; and average water-depth data generating means for obtaining and outputting an average water-depth data of water-depth data calculated by said water-depth data calculating means.

6. A pressure instrument according to claim 1, wherein said measured data generating means comprises:

altitude data calculating means for calculating altitude data from pressure detected by said pressure detecting means; and altitude data comparing means for comparing altitude data calculated by said altitude data calculating means to detect and output the maximum altitude data.

7. A pressure instrument according to claim 1, wherein said measured data generating means comprises:

altitude data calculating means for calculating altitude data from pressure detected by said pressure detecting means; and average altitude data generating means for obtaining and outputting an average altitude data of altitude data calculated by said altitude data calculating means.

8. A pressure instrument according to claim 1, wherein said memory means comprises measurement-time data storing means for storing measurement-time data which are obtained by said measurement-time counting means during time period between the time when said measurement start signal is generated and the time when said measurement stop signal is generated.

9. A pressure instrument according to claim 1, further comprising time counting means for counting reference clock signal to obtain present time data and date data, and wherein said memory means comprises time-data storing means and date-data storing means for storing time data and date data respectively, both of which data have been counted by said time counting means.

10. A pressure instrument according to claim 1, further comprising time counting means for counting reference clock signal to obtain present time data and date data, and wherein said memory means comprises time-data storing means and date-data storing means for storing time data and date data respectively, both of which data have been counted by said time counting means at the time when said start/stop signal generating means generates at least one of the measurement start signal and measurement stop signal.

11. A pressure instrument according to claim 1, wherein said start/stop signal generating means comprises:

means for generating a start signal when pressure detected by said pressure detecting means exceeds a predetermined value; and means for generating a stop signal when pressure detected by said pressure detecting means decreases to a predetermined value and less.

12. A pressure instrument comprising:

pressure detecting means for detecting external pressure outside of the pressure instrument;

switch means for providing a drive-start instruction and a drive-stop instruction for actuation of said pressure detecting means;

water-depth data generating means for generating water-depth data corresponding to the external pressure detected by said pressure detecting means, when said pressure detecting means is being driven under control of said drive-start instruction of said switch means;

detecting means for detecting the water-depth data generated by said water-depth data generating means being equal to, or smaller than a predetermined water-depth value;

time counting means for counting time data while said detection means detects said water-depth data being equal to or smaller than said predetermined water-depth value;

time detecting means responsive to said time data counted by said time counting means;

memory means for storing water-depth data generated by said water-depth data generating means during a time period between the drive-start and drive-stop instructions only when the time detecting means detects that said time data has reached said predetermined time period;

means for stopping driving of said pressure detecting means when the time detecting means has detected said time data which reaches said predetermined time period; and water-depth data display means for displaying the water-depth data stored in said memory means.

13. A pressure instrument according to claim 12, wherein said memory means comprises a plurality of memory areas for storing said water-depth data.

14. A pressure instrument according to claim 13, further comprising:

memory control means for deleting oldest data stored in said memory means and for storing newly obtained water-depth data therein, when all of the plurality of memory areas of said memory means are full of stored water-depth data.

15. A pressure instrument according to claim 12, wherein said water-depth data generating means comprises:

maximum water-depth data outputting means for detecting and outputting a maximum water-depth data.

16. A pressure instrument according to claim 12, wherein said water-depth data generating means comprises:

average water-depth data outputting means for obtaining and outputting an average water-depth data.

17. A pressure instrument according to claim 12, further comprising time counting means for counting reference clock signal to obtain present time data and date data, and start/stop signal generating means for generating measurement-start signal and measurement-stop signal, and wherein said memory means comprises memory for storing time data and date data which have been obtained by said time counting means at the time when said start/stop signal generating means generates at least one of the measurement-start signal and measurement-stop signal.

18. A pressure instrument comprising:

pressure detecting means for detecting external pressure outside of the pressure instrument;

water-depth data generating means for generating water-depth data corresponding to the external pressure detected by said pressure detecting means;

water-depth data display means for displaying water-depth data generated by said water-depth data generating means;

diving operation detecting means for detecting both dive-start and dive-stop operations;

diving time data counting means for counting diving time data, with a counting operation by the diving time data counting means being commenced when the dive-start operation is detected by said diving operation detecting means, and the counting operation by the diving time data counting means being stopped when the dive-stop operation is detected by said diving operation detecting means;

long time diving detecting means to carry out an operation for detecting whether or not the diving time data counted by said diving time data counting means exceed a predetermined time period, such operation being carried out every time when said diving operation detecting means detects the dive-stop operation;

rest time counting means for counting rest time data, with a counting operation by said rest time data counting means being commenced from 0 when said long time detecting means detects that said diving time data is longer than said predetermined time period upon detection of the dive-stop operation by said diving operation detecting means, with the counting operation by said rest time data counting means being commenced from a value held in said rest time data counting means when said long time detecting means detects that the diving time data is not longer than said predetermined time period, and also the counting operation by said rest time counting means is stopped to produce the rest time data when said diving operation detecting means detects said dive-stop operation; and rest time data display means for displaying the rest time data counted by said rest time counting means.

19. A pressure instrument according to claim 18, wherein said rest time counting means is a 12-hour timer.

20. A pressure instrument according to claim 18, wherein said diving operation detecting means comprises judging means for judging whether or not water-depth data generated by said water-depth data generating means exceeds a predetermined value so as to detect dive-start and dive-stop operations.

21. A pressure instrument according to claim 18, further comprising time counting means for counting a reference clock signal to obtain present time data and date data, and memory means for storing said water-depth data, time data and date data which have been obtained by said time counting means when said diving operation detecting means has detected at least one of the dive-start and dive-stop operations.

22. A pressure instrument comprising:

pressure detecting means for detecting external pressure outside of the pressure instrument;

externally operated switch means operated to set a reference pressure;

pressure judging means for judging whether or not an initial external pressure is higher than a predetermined value, which pressure is detected by said pressure detecting means when said externally operated switch is operated;

reference pressure selecting means for (a) selecting as the reference pressure said initial external pressure detected by said pressure detecting means, when said pressure judging means judges that said initial external pressure is lower than the predetermined value, and (b) selecting as the reference pressure a pre-set particular pressure, when said pressure judging means judges that said initial external pressure is higher than the predetermined value;

water-depth data generating means for generating water-depth data corresponding to a difference between the external pressure detected by said pressure detecting means and pressure selected by said reference pressure selecting means, after the reference pressure has been selected by said reference pressure selecting means; and water-depth data displaying means for displaying water-depth data generated by said water-depth data generating means.

23. A pressure instrument according to claim 22, wherein said particular pressure is a standard air pressure.

24. A pressure instrument according to claim 22, further comprising:

time counting means for counting a reference clock signal to obtain present time data and date data;

start/stop signal generating means for generating dive-start signal and dive-stop signal;

memory means for storing said water-depth data and time data and date data which are obtained by said time counting means when said start/stop signal generating means generates at least one of the dive-start signal and dive-stop signal; and data display means for displaying the time data, date data and water-depth data stored in said memory means.

25. A pressure instrument comprising:

pressure detecting means for detecting external pressure outside of the pressure instrument;

externally operated switch means for setting a reference pressure;

reference pressure storing means for storing the reference pressure which is detected by said pressure detecting means when said switch means is operated;

water-depth data generating means for generating water-depth data corresponding to a difference between the external pressure detected by said pressure detecting means and said reference pressure;

abnormal water-depth data judging means for judging whether or not water-depth data generated by said water-depth data generating means falls into a predetermined range; and reference pressure changing means for changing the reference pressure on the basis of pressure detected by said pressure detecting means when said abnormal water-depth data judging means judges that the water-depth data does not fall into the predetermined range.

26. A pressure instrument according to claim 25, wherein said reference pressure changing means comprises:

pressure judging means for judging whether or not pressure detected by said pressure detecting means is higher than a predetermined value; and reference pressure re-setting means for changing the reference pressure to pressure detected by said pressure detecting means when said pressure judging means judges that pressure detected by said pressure detecting means is lower than the predetermined value and changing the reference pressure to the pre-set particular value when said pressure judging means judges that said detected pressure higher than the predetermined value.

27. A pressure instrument according to claim 25, further comprising abnormal operation display means for displaying abnormal operation when said abnormal water-depth data detecting means has judged that water-depth data does not fall into the predetermined range.

28. A pressure instrument according to claim 26, wherein said particular pressure is a standard air pressure.

29. A pressure instrument according to claim 25, further comprising:

time counting means for counting a reference clock signal to obtain present time data and date data;

start/stop signal generating means for generating dive-start signal and dive-stop signal;

memory means for storing said water-depth data, and time data and date data which have been obtained by said time counting means when said start/stop signal generating means generates at least one of the dive-start signal and dive-stop signal; and data display means for displaying said water-depth data, time data and date data stored in said memory means.

30. A pressure instrument comprising:

pressure detecting means for detecting external pressure outside of the pressure instrument;

switch means for providing drive-start and drive-stop instructions for actuation of said pressure detecting means;

altitude data generating means for generating altitude data corresponding to the external pressure detected by said pressure detecting means, when said pressure detecting means is being driven by said drive-start instruction of said switch means;

detection means for detecting the altitude data generated by said altitude data generating means being equal to, or smaller than a predetermined altitude value;

time counting means for counting time data while said detection means detects said altitude data equal to, or smaller than said predetermined altitude value;

time detecting means responsive to said time data counted by said time counting means;

memory means for storing altitude data generated by said altitude data generating means during a time period between the drive-start and drive-stop instructions only when the time detecting means detects that said time data has reached said predetermined time period;

means for stopping driving of said pressure detecting means when the time detecting means detects that said time data has reached said predetermined time period; and altitude data display means for displaying the altitude data stored in said memory means.

31. A pressure instrument according to claim 30, wherein said memory means comprises a plurality of memory areas for storing said altitude data.

32. A pressure instrument according to claim 30, further comprising memory control means for deleting oldest data stored in said memory means and for storing newly obtained altitude data therein, when all of the plurality of memory areas of said memory means are full of stored altitude data.

33. A pressure instrument according to claim 30, wherein said altitude data generating means comprises maximum altitude data outputting means for detecting and outputting a maximum altitude data.

34. A pressure instrument according to claim 30, wherein said altitude data generating means comprises average data outputting means for obtaining and outputting an average altitude data of said altitude data.

35. A pressure instrument according to claim 30, further comprising time counting means for counting a reference clock signal to obtain present time data and date data, and start/stop signal generating means for generating a measurement-start signal and a measurement-stop signal, and wherein said memory means stores time data and date data which have been obtained by said time counting means when said start/stop signal generating means generates at least one of the measurement-start signal and measurement-stop signal.

* * * * *